US012583178B2

(12) United States Patent
Lin et al.

(10) Patent No.: US 12,583,178 B2
(45) Date of Patent: Mar. 24, 2026

(54) SYSTEMS AND METHODS FOR STEREOLITHOGRAPHY THREE-DIMENSIONAL PRINTING

(71) Applicant: Holo, Inc., Newark, CA (US)

(72) Inventors: Pierre Pascal Anatole Lin, London (GB); Darin Birtwhistle, San Francisco, CA (US); Daniel Christiansen, San Francisco, CA (US); Patrick Hendry, San Jose, CA (US); Aldo Suseno, Hayward, CA (US); Hany Basam Eitouni, Lafayette, CA (US)

(73) Assignee: SOUTHWEST GREENE INTERNATIONAL, INC., Oceanside, CA (US)

( * ) Notice: Subject to any disclaimer, the term of this patent is extended or adjusted under 35 U.S.C. 154(b) by 140 days.

(21) Appl. No.: 18/485,683

(22) Filed: Oct. 12, 2023

(65) Prior Publication Data

US 2024/0140030 A1      May 2, 2024

Related U.S. Application Data

(63) Continuation of application No. PCT/US2022/025229, filed on Apr. 18, 2022.
(Continued)

(51) Int. Cl.
    *B29C 64/245*      (2017.01)
    *B29C 64/209*      (2017.01)
    (Continued)

(52) U.S. Cl.
    CPC .......... *B29C 64/245* (2017.08); *B29C 64/209* (2017.08); *B29C 64/227* (2017.08);
    (Continued)

(58) Field of Classification Search
    CPC ........................... B29C 64/227; B29C 64/236
    See application file for complete search history.

(56) References Cited

U.S. PATENT DOCUMENTS

| | | | |
|---|---|---|---|
| 4,252,887 | A | 2/1981 | Dessauer |
| 4,269,933 | A | 5/1981 | Pazos |

(Continued)

FOREIGN PATENT DOCUMENTS

| | | | |
|---|---|---|---|
| CN | 1418974 A | 5/2003 | |
| CN | 1916034 A | 2/2007 | |

(Continued)

OTHER PUBLICATIONS

Amine photochemical coinitiators, [online] [Retrieved on Aug. 4, 2014]; Retrieved from the Internet URL: httQ://www.sigmaaldrich. com/materials-science/material-scienceproducts. htrnl ?TablePage= 20204246; 2 pages.

(Continued)

*Primary Examiner* — Timothy Kennedy
(74) *Attorney, Agent, or Firm* — Cermak & McGowan LLP; Malcolm K. McGowan

(57) ABSTRACT

The present disclosure provides systems and methods for printing three-dimensional (3D) objects. A system for printing a 3D object may comprise at least one platform configured to hold a film of at least one mixture, a deposition unit for providing the film of the at least one mixture, and a building unit for forming at least a portion of the 3D object from the film of the at least one mixture. The system may further comprise a controller operatively coupled to the at least one platform. The controller may be configured to direct the at least one platform to move from the deposition unit to the building unit, or vice versa, along a plurality of non-overlapping paths.

14 Claims, 20 Drawing Sheets

Related U.S. Application Data

(60) Provisional application No. 63/176,664, filed on Apr. 19, 2021.

(51) Int. Cl.
| | | |
|---|---|---|
| *B29C 64/227* | (2017.01) | |
| *B29C 64/236* | (2017.01) | |
| *B29C 64/264* | (2017.01) | |
| *B33Y 10/00* | (2015.01) | |
| *B33Y 30/00* | (2015.01) | |

(52) U.S. Cl.
CPC .......... *B29C 64/236* (2017.08); *B29C 64/264* (2017.08); *B33Y 10/00* (2014.12); *B33Y 30/00* (2014.12)

(56) References Cited

U.S. PATENT DOCUMENTS

| | | | |
|---|---|---|---|
| 4,801,477 | A | 1/1989 | Fudim |
| 4,814,370 | A | 3/1989 | Kramer et al. |
| 4,961,154 | A | 10/1990 | Pomerantz et al. |
| 5,006,364 | A | 4/1991 | Fan |
| 5,096,530 | A | 3/1992 | Cohen |
| 5,137,662 | A | 8/1992 | Hull et al. |
| 5,143,668 | A | 9/1992 | Hida et al. |
| 5,182,056 | A | 1/1993 | Spence et al. |
| 5,184,307 | A | 2/1993 | Hull et al. |
| 5,236,326 | A | 8/1993 | Grossa |
| 5,248,456 | A | 9/1993 | Evans, Jr. et al. |
| 5,330,701 | A | 7/1994 | Shaw et al. |
| 5,474,719 | A | 12/1995 | Fan et al. |
| 5,510,162 | A | 4/1996 | Brown |
| 5,531,958 | A | 7/1996 | Krueger |
| 5,545,367 | A | 8/1996 | Bae et al. |
| 5,656,297 | A | 8/1997 | Bernstein et al. |
| 5,676,745 | A | 10/1997 | Kelly et al. |
| 5,877,270 | A | 3/1999 | Takayama et al. |
| 5,902,537 | A | 5/1999 | Almquist et al. |
| 5,922,507 | A | 7/1999 | Van Damme et al. |
| 5,998,496 | A | 12/1999 | Hassoon et al. |
| 6,089,149 | A * | 7/2000 | Zelko ..................... B41F 15/20 |
| | | | 101/115 |
| 6,090,865 | A | 7/2000 | Dudman et al. |
| 6,093,761 | A | 7/2000 | Schofalvi et al. |
| 6,100,007 | A | 8/2000 | Pang et al. |
| 6,204,316 | B1 | 3/2001 | Schofalvi et al. |
| 6,259,962 | B1 | 7/2001 | Gothait |
| 6,376,585 | B1 | 4/2002 | Schofalvi et al. |
| 6,399,010 | B1 | 6/2002 | Guertin et al. |
| 6,572,702 | B1 * | 6/2003 | Freeman ............ H05K 13/0069 |
| | | | 118/313 |
| 6,658,314 | B1 | 12/2003 | Gothait |
| 6,664,354 | B2 | 12/2003 | Savu et al. |
| 6,780,472 | B2 | 8/2004 | Hamrock et al. |
| 6,833,043 | B1 | 12/2004 | Parsonage et al. |
| 6,846,862 | B2 | 1/2005 | Schofalvi et al. |
| 6,850,334 | B1 | 2/2005 | Gothait |
| 6,852,781 | B2 | 2/2005 | Savu et al. |
| 7,022,410 | B2 | 4/2006 | Tonapi et al. |
| 7,079,915 | B2 | 7/2006 | Huang et al. |
| 7,101,618 | B2 | 9/2006 | Coggio et al. |
| 7,173,778 | B2 | 2/2007 | Jing et al. |
| 7,195,472 | B2 | 3/2007 | John |
| 7,209,797 | B2 | 4/2007 | Kritchman et al. |
| 7,223,826 | B2 | 5/2007 | Ali et al. |
| 7,267,850 | B2 | 9/2007 | Coggio et al. |
| 7,288,469 | B2 | 10/2007 | Sharma et al. |
| 7,288,514 | B2 | 10/2007 | Scheuing et al. |
| 7,332,217 | B2 | 2/2008 | Coggio et al. |
| 7,417,099 | B2 | 8/2008 | Savu et al. |
| 7,433,627 | B2 | 10/2008 | German et al. |
| 7,434,675 | B1 * | 10/2008 | Rohm ................ H05K 13/0061 |
| | | | 29/430 |
| 7,438,846 | B2 | 10/2008 | John |

| | | | |
|---|---|---|---|
| 7,491,441 | B2 | 2/2009 | Pokorny et al. |
| 7,511,008 | B2 | 3/2009 | Scheuing et al. |
| 7,575,847 | B2 | 8/2009 | Jing et al. |
| 7,632,560 | B2 | 12/2009 | Filippini et al. |
| 7,662,896 | B2 | 2/2010 | Savu et al. |
| 7,718,264 | B2 | 5/2010 | Klun et al. |
| 7,845,930 | B2 | 12/2010 | Shkolnik et al. |
| 7,907,878 | B2 | 3/2011 | Takagi et al. |
| 7,912,411 | B2 | 3/2011 | Takagi et al. |
| 7,961,154 | B2 | 6/2011 | Qi et al. |
| 8,110,135 | B2 | 2/2012 | El-Siblani |
| 8,133,551 | B2 | 3/2012 | Claes |
| 8,147,966 | B2 | 4/2012 | Klun et al. |
| 8,205,736 | B2 * | 6/2012 | Ando .................... B41F 17/005 |
| | | | 198/346.2 |
| 8,372,330 | B2 | 2/2013 | El-Siblani et al. |
| 8,372,913 | B2 | 2/2013 | Claes |
| 8,394,313 | B2 | 3/2013 | Shkolnik et al. |
| 8,476,398 | B2 | 7/2013 | Klun et al. |
| 8,551,285 | B2 | 10/2013 | Ho et al. |
| 8,623,264 | B2 | 1/2014 | Rohner et al. |
| 8,696,971 | B2 | 4/2014 | Boot et al. |
| 8,716,377 | B2 | 5/2014 | Taden et al. |
| 8,729,211 | B2 | 5/2014 | Klun et al. |
| 8,734,715 | B2 | 5/2014 | Miller et al. |
| 8,741,203 | B2 | 6/2014 | Liska et al. |
| 8,753,464 | B2 | 6/2014 | Khanna |
| 8,753,714 | B2 | 6/2014 | Cheung et al. |
| 8,801,418 | B2 | 8/2014 | El-Siblani et al. |
| 8,829,070 | B2 | 9/2014 | Morita et al. |
| 8,859,642 | B2 | 10/2014 | Miyamoto |
| 8,916,335 | B2 | 12/2014 | Kitano et al. |
| 9,108,358 | B1 | 8/2015 | Herloski et al. |
| 9,120,270 | B2 | 9/2015 | Chen et al. |
| 9,126,446 | B1 | 9/2015 | Bonino |
| 9,205,601 | B2 | 12/2015 | DeSimone et al. |
| 9,211,678 | B2 | 12/2015 | DeSimone et al. |
| 9,216,546 | B2 | 12/2015 | DeSimone et al. |
| 9,306,218 | B2 | 4/2016 | Pyun et al. |
| 9,360,757 | B2 | 6/2016 | Desimone et al. |
| 9,367,049 | B2 | 6/2016 | Jariwala et al. |
| 9,415,418 | B2 | 8/2016 | Sreenivasan et al. |
| 9,452,567 | B2 | 9/2016 | Syao et al. |
| 9,453,142 | B2 | 9/2016 | Rolland et al. |
| 9,486,944 | B2 | 11/2016 | El-Siblani et al. |
| 9,492,969 | B2 | 11/2016 | Spadaccini et al. |
| 9,498,920 | B2 | 11/2016 | Desimone et al. |
| 9,527,244 | B2 | 12/2016 | El-Siblani et al. |
| 9,533,450 | B2 | 1/2017 | El-Siblani et al. |
| 9,561,623 | B2 | 2/2017 | El-Siblani et al. |
| 9,567,439 | B1 | 2/2017 | Pyun et al. |
| 9,598,606 | B2 | 3/2017 | Rolland et al. |
| 9,676,963 | B2 | 6/2017 | Rolland et al. |
| 9,718,096 | B2 | 8/2017 | Sreenivasan et al. |
| 9,782,934 | B2 | 10/2017 | Willis et al. |
| 9,796,138 | B2 | 10/2017 | Liska et al. |
| 9,833,839 | B2 | 12/2017 | Gibson et al. |
| 9,975,295 | B2 | 5/2018 | Rolland et al. |
| 9,975,296 | B2 | 5/2018 | El-Siblani et al. |
| 9,982,164 | B2 | 5/2018 | Rolland et al. |
| 9,987,653 | B2 | 6/2018 | Sreenivasan et al. |
| 9,987,804 | B2 | 6/2018 | El-Siblani et al. |
| 9,993,974 | B2 | 6/2018 | DeSimone et al. |
| 10,011,076 | B2 | 7/2018 | El-Siblani et al. |
| 10,016,938 | B2 | 7/2018 | DeSimone et al. |
| 10,072,921 | B2 | 9/2018 | Fu et al. |
| 10,073,424 | B2 | 9/2018 | Lin et al. |
| 10,150,280 | B2 | 12/2018 | Aghababaie et al. |
| 10,166,725 | B2 | 1/2019 | Willis et al. |
| 10,213,956 | B2 | 2/2019 | Willis et al. |
| 10,245,785 | B2 | 4/2019 | Adzima |
| 10,354,445 | B2 | 7/2019 | Greene et al. |
| 10,421,233 | B2 | 9/2019 | Lin et al. |
| 10,464,259 | B2 | 11/2019 | Lin et al. |
| 10,882,251 | B2 | 1/2021 | Lin et al. |
| 10,935,891 | B2 | 3/2021 | Lin et al. |
| 11,141,919 | B2 | 10/2021 | Lin et al. |
| 11,161,301 | B2 | 11/2021 | Lin et al. |
| 11,351,735 | B2 | 6/2022 | Greene et al. |

(56)                References Cited

U.S. PATENT DOCUMENTS

| | | |
|---|---|---|
| 11,400,650 B2 | 8/2022 | Adzima |
| 2001/0035597 A1 | 11/2001 | Grigg et al. |
| 2002/0195746 A1 | 12/2002 | Hull et al. |
| 2003/0043360 A1 | 3/2003 | Farnworth |
| 2003/0114936 A1 | 6/2003 | Sherwood et al. |
| 2003/0173713 A1 | 9/2003 | Huang |
| 2004/0138049 A1 | 7/2004 | Yasrebi et al. |
| 2004/0187714 A1 | 9/2004 | Napadensky et al. |
| 2005/0274661 A1* | 12/2005 | Jackson .................... B08B 3/00 |
| | | 55/385.1 |
| 2006/0054039 A1 | 3/2006 | Kritchman et al. |
| 2006/0127153 A1 | 6/2006 | Menchik et al. |
| 2006/0163774 A1 | 7/2006 | Abels et al. |
| 2006/0257785 A1 | 11/2006 | Johnson |
| 2007/0077323 A1 | 4/2007 | Stonesmith et al. |
| 2007/0264481 A1 | 11/2007 | DeSimone et al. |
| 2008/0169586 A1 | 7/2008 | Hull et al. |
| 2008/0181977 A1 | 7/2008 | Sperry et al. |
| 2008/0252682 A1 | 10/2008 | Hernandez et al. |
| 2009/0020901 A1 | 1/2009 | Schillen et al. |
| 2009/0130449 A1 | 5/2009 | El-Siblani |
| 2009/0196946 A1 | 8/2009 | Kihara et al. |
| 2009/0304952 A1 | 12/2009 | Kritchman |
| 2010/0028994 A1 | 2/2010 | DeSimone et al. |
| 2010/0029801 A1 | 2/2010 | Moszner et al. |
| 2010/0122634 A1 | 5/2010 | Doyle |
| 2010/0125356 A1 | 5/2010 | Shkolnik et al. |
| 2010/0173096 A1 | 7/2010 | Kritchman et al. |
| 2011/0089610 A1 | 4/2011 | El-Siblani et al. |
| 2011/0181941 A1 | 7/2011 | Henningsen |
| 2011/0182805 A1 | 7/2011 | Desimone et al. |
| 2011/0287185 A1 | 11/2011 | Felstead et al. |
| 2011/0310370 A1 | 12/2011 | Rohner et al. |
| 2011/0318595 A1 | 12/2011 | Breiner et al. |
| 2012/0046376 A1 | 2/2012 | Loccufier et al. |
| 2012/0107625 A1 | 5/2012 | Smith et al. |
| 2012/0195994 A1 | 8/2012 | El-Siblani et al. |
| 2013/0000553 A1 | 1/2013 | Hoechsmann et al. |
| 2013/0001834 A1 | 1/2013 | El-Siblani et al. |
| 2013/0056910 A1 | 3/2013 | Houbertz-Krauss et al. |
| 2013/0123988 A1 | 5/2013 | Jariwala et al. |
| 2013/0252178 A1 | 9/2013 | Mcleod et al. |
| 2013/0336884 A1 | 12/2013 | Desimone et al. |
| 2014/0084517 A1 | 3/2014 | Sperry et al. |
| 2014/0265032 A1 | 9/2014 | Teicher et al. |
| 2014/0339741 A1 | 11/2014 | Aghababaie et al. |
| 2014/0361463 A1 | 12/2014 | Desimone et al. |
| 2015/0019000 A1 | 1/2015 | Nakamura |
| 2015/0064298 A1 | 3/2015 | Syao |
| 2015/0072293 A1 | 3/2015 | DeSimone et al. |
| 2015/0077215 A1 | 3/2015 | Ranky et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0137426 A1 | 5/2015 | Van Esbroeck et al. |
| 2015/0139608 A1 | 5/2015 | Theobalt et al. |
| 2015/0183168 A1 | 7/2015 | Liverman et al. |
| 2015/0202805 A1 | 7/2015 | Saruhashi et al. |
| 2015/0210007 A1 | 7/2015 | Durand et al. |
| 2015/0224710 A1 | 8/2015 | El-Siblani et al. |
| 2015/0231828 A1 | 8/2015 | El-Siblani et al. |
| 2015/0231831 A1 | 8/2015 | El-Siblani |
| 2015/0266241 A1 | 9/2015 | Batchelder |
| 2015/0273632 A1 | 10/2015 | Chen |
| 2015/0287169 A1 | 10/2015 | Ueda et al. |
| 2015/0290881 A1 | 10/2015 | Ederer et al. |
| 2015/0328839 A1 | 11/2015 | Willis et al. |
| 2015/0331402 A1 | 11/2015 | Lin et al. |
| 2015/0343745 A1 | 12/2015 | Pesek et al. |
| 2015/0344682 A1 | 12/2015 | Ganapathiappan et al. |
| 2015/0360419 A1 | 12/2015 | Willis et al. |
| 2016/0023403 A1 | 1/2016 | Ramos et al. |
| 2016/0023467 A1 | 1/2016 | Din et al. |
| 2016/0046075 A1 | 2/2016 | DeSimone et al. |
| 2016/0059484 A1 | 3/2016 | Desimone et al. |
| 2016/0059486 A1 | 3/2016 | Desimone et al. |
| 2016/0059487 A1 | 3/2016 | Desimone et al. |
| 2016/0067921 A1 | 3/2016 | Willis et al. |
| 2016/0121547 A1 | 5/2016 | Kobayashi |
| 2016/0122539 A1 | 5/2016 | Okamoto et al. |
| 2016/0131974 A1 | 5/2016 | Abe et al. |
| 2016/0136889 A1 | 5/2016 | Rolland et al. |
| 2016/0141535 A1 | 5/2016 | Snaith et al. |
| 2016/0158889 A1 | 6/2016 | Carter et al. |
| 2016/0160077 A1 | 6/2016 | Rolland et al. |
| 2016/0164031 A1 | 6/2016 | Pieper et al. |
| 2016/0167301 A1 | 6/2016 | Cole et al. |
| 2016/0170218 A1 | 6/2016 | Johnson et al. |
| 2016/0193786 A1 | 7/2016 | Moore et al. |
| 2016/0200052 A1 | 7/2016 | Moore et al. |
| 2016/0214321 A1 | 7/2016 | Tow et al. |
| 2016/0271870 A1 | 9/2016 | Brown, Jr. |
| 2016/0271875 A1 | 9/2016 | Brown, Jr. |
| 2016/0303793 A1 | 10/2016 | Ermoshkin et al. |
| 2016/0303795 A1 | 10/2016 | Liu et al. |
| 2016/0311167 A1 | 10/2016 | Günther et al. |
| 2016/0325493 A1 | 11/2016 | DeSIMONE et al. |
| 2016/0332366 A1 | 11/2016 | Donovan |
| 2016/0332386 A1 | 11/2016 | Kuijpers |
| 2016/0368054 A1 | 12/2016 | Ng et al. |
| 2016/0368210 A1 | 12/2016 | Chen et al. |
| 2016/0368221 A1 | 12/2016 | Ueda et al. |
| 2017/0015058 A1 | 1/2017 | Ueda et al. |
| 2017/0021562 A1 | 1/2017 | El-Siblani et al. |
| 2017/0022312 A1 | 1/2017 | Liu et al. |
| 2017/0028644 A1 | 2/2017 | Evans et al. |
| 2017/0057177 A1 | 3/2017 | Ferguson et al. |
| 2017/0080641 A1 | 3/2017 | El-Siblani |
| 2017/0087765 A1 | 3/2017 | Rundlett et al. |
| 2017/0087769 A1 | 3/2017 | Lancaster-Larocque et al. |
| 2017/0106399 A1 | 4/2017 | Sreenivasan et al. |
| 2017/0106603 A1 | 4/2017 | Pobihun |
| 2017/0113406 A1 | 4/2017 | Chen et al. |
| 2017/0113416 A1 | 4/2017 | DeSimone et al. |
| 2017/0120326 A1 | 5/2017 | Heikkila et al. |
| 2017/0120515 A1 | 5/2017 | Rolland et al. |
| 2017/0151718 A1 | 6/2017 | Rolland et al. |
| 2017/0173881 A1 | 6/2017 | Dachs, II et al. |
| 2017/0182708 A1 | 6/2017 | Lin et al. |
| 2017/0210077 A1 | 7/2017 | Ermoshkin et al. |
| 2017/0239887 A1 | 8/2017 | Rolland et al. |
| 2017/0246660 A1 | 8/2017 | Thompson et al. |
| 2017/0246804 A1 | 8/2017 | El-Siblani et al. |
| 2017/0266876 A1 | 9/2017 | Hocker |
| 2017/0291356 A1 | 10/2017 | Adachi et al. |
| 2017/0297099 A1 | 10/2017 | Gibson et al. |
| 2017/0334129 A1 | 11/2017 | Ebert et al. |
| 2017/0342182 A1 | 11/2017 | Pesek et al. |
| 2017/0369633 A1 | 12/2017 | Caruso et al. |
| 2018/0001552 A1 | 1/2018 | Dachs, II et al. |
| 2018/0001581 A1 | 1/2018 | Patel et al. |
| 2018/0015669 A1 | 1/2018 | Moore et al. |
| 2018/0044448 A1 | 2/2018 | Moser et al. |
| 2018/0071977 A1 | 3/2018 | Tumbleston et al. |
| 2018/0079865 A1 | 3/2018 | Pyun et al. |
| 2018/0086003 A1 | 3/2018 | Greene et al. |
| 2018/0100037 A1 | 4/2018 | Pyun |
| 2018/0105649 A1 | 4/2018 | Pyun et al. |
| 2018/0126630 A1 | 5/2018 | Panzer et al. |
| 2018/0126631 A1 | 5/2018 | Nauka et al. |
| 2018/0133959 A1 | 5/2018 | Moore et al. |
| 2018/0162047 A1 | 6/2018 | Gibson et al. |
| 2018/0162048 A1 | 6/2018 | Gibson et al. |
| 2018/0194066 A1 | 7/2018 | Ramos et al. |
| 2018/0200948 A1 | 7/2018 | Kuijpers et al. |
| 2018/0208686 A1 | 7/2018 | Pyun et al. |
| 2018/0264724 A1 | 9/2018 | Feller et al. |
| 2018/0333912 A1 | 11/2018 | Lin et al. |
| 2018/0333913 A1 | 11/2018 | Lin et al. |
| 2018/0348646 A1 | 12/2018 | Lin et al. |
| 2018/0361666 A1 | 12/2018 | Adzima |
| 2019/0023917 A1 | 1/2019 | Drazba et al. |
| 2019/0126533 A1 | 5/2019 | Thompson |
| 2019/0134886 A1 | 5/2019 | Willis et al. |

(56) References Cited

U.S. PATENT DOCUMENTS

| | | |
|---|---|---|
| 2019/0134899 A1 | 5/2019 | Mueller et al. |
| 2019/0176398 A1 | 6/2019 | Adzima |
| 2019/0210285 A1 | 7/2019 | Tomioka et al. |
| 2019/0212572 A1 | 7/2019 | Tomioka |
| 2019/0224918 A1 | 7/2019 | Zheng |
| 2019/0224919 A1 | 7/2019 | Houben et al. |
| 2019/0291342 A1 | 9/2019 | Chen et al. |
| 2019/0299283 A1 | 10/2019 | Sheinman |
| 2019/0322033 A1 | 10/2019 | Willis et al. |
| 2020/0172748 A1 | 6/2020 | Moussa |
| 2020/0290275 A1* | 9/2020 | Dubelman ........... B29C 64/236 |
| 2020/0362157 A1 | 11/2020 | Parkar et al. |
| 2021/0171701 A1 | 6/2021 | Klun et al. |
| 2021/0186820 A1 | 6/2021 | Chakraborty et al. |
| 2021/0238328 A1 | 8/2021 | Wu et al. |
| 2021/0361389 A1 | 11/2021 | Mac Murray et al. |
| 2022/0176622 A1 | 6/2022 | Lin et al. |
| 2022/0242043 A1 | 8/2022 | Lin et al. |
| 2023/0082164 A1 | 3/2023 | Greene et al. |

FOREIGN PATENT DOCUMENTS

| | | |
|---|---|---|
| CN | 101956091 A | 1/2011 |
| CN | 102171305 B | 7/2013 |
| CN | 103317140 A | 9/2013 |
| CN | 203945693 U | 11/2014 |
| CN | 104609859 A | 5/2015 |
| CN | 104890245 A | 9/2015 |
| CN | 105081325 A | 11/2015 |
| CN | 105111380 A | 12/2015 |
| CN | 105122135 A | 12/2015 |
| CN | 105593004 A | 5/2016 |
| CN | 105729812 A | 7/2016 |
| CN | 105922587 A | 9/2016 |
| CN | 105924571 A | 9/2016 |
| CN | 105946237 A | 9/2016 |
| CN | 104725050 B | 1/2017 |
| CN | 205889910 U | 1/2017 |
| CN | 104923781 B | 3/2017 |
| CN | 107573058 A | 1/2018 |
| CN | 109664507 A | 4/2019 |
| CN | 110914058 A | 3/2020 |
| DE | 3926869 A1 | 2/1991 |
| EP | 0450762 A1 | 10/1991 |
| EP | 3194145 A2 | 7/2017 |
| JP | H05169549 A | 7/1993 |
| JP | H0760844 A | 3/1995 |
| JP | H0910967 A | 1/1997 |
| JP | H09201877 A | 8/1997 |
| JP | 2005028845 A | 2/2005 |
| JP | 2006168123 A | 6/2006 |
| JP | 2010030322 A | 2/2010 |
| JP | 5806773 B1 | 11/2015 |
| JP | 2015229349 A | 12/2015 |
| JP | 2016190381 A | 11/2016 |
| JP | 2017210620 A | 11/2017 |
| JP | 6241944 B2 | 12/2017 |
| KR | 20170005209 A | 1/2017 |
| WO | WO-0140866 A2 | 6/2001 |
| WO | WO-0200569 A2 | 1/2002 |
| WO | WO-2007020634 A2 | 2/2007 |
| WO | WO-2014126830 A2 | 8/2014 |
| WO | WO-2015031227 A1 | 3/2015 |
| WO | WO-2015107066 A1 | 7/2015 |
| WO | WO-2016022336 A2 | 2/2016 |
| WO | WO-2016094827 A1 | 6/2016 |
| WO | WO-2016123499 A1 | 8/2016 |
| WO | WO-2016146095 A1 | 9/2016 |
| WO | WO-2017009368 A1 | 1/2017 |
| WO | WO-2017011533 A1 | 1/2017 |
| WO | WO-2017051084 A1 | 3/2017 |
| WO | WO-2017053783 A1 | 3/2017 |
| WO | WO-2017066546 A1 | 4/2017 |
| WO | WO-2017112483 A2 | 6/2017 |
| WO | WO-2017112682 A1 | 6/2017 |
| WO | WO-2017112751 A1 | 6/2017 |
| WO | WO-2017210298 A1 | 12/2017 |
| WO | WO-2017214007 A1 | 12/2017 |
| WO | WO-2018006018 A1 | 1/2018 |
| WO | WO-2018006029 A1 | 1/2018 |
| WO | WO-2018047479 A1 | 3/2018 |
| WO | WO-2018081053 A1 | 5/2018 |
| WO | WO-2018094131 A1 | 5/2018 |
| WO | WO-2018102341 A1 | 6/2018 |
| WO | WO-2018106472 A1 | 6/2018 |
| WO | WO-2018125596 A1 | 7/2018 |
| WO | WO-2018213356 A1 | 11/2018 |
| WO | WO-2018232175 A1 | 12/2018 |
| WO | WO-2019104072 A1 | 5/2019 |
| WO | WO-2020139858 A1 | 7/2020 |
| WO | WO-2020149831 A1 | 7/2020 |
| WO | WO-2020236657 A1 | 11/2020 |
| WO | WO-2022225854 A1 | 10/2022 |

OTHER PUBLICATIONS

"Anilox." Wikipedia, Wikimedia Foundation, May 16, 2018, en.wikipedia.org/wiki/Anilox.

Benoit, et al. Development of a universal alkoxyamine for 'living' free radical polymerizations. J. Am. Chern. Soc., 121 (1999): 3904-3920.

Berg, et al. A dual-cure, solid-state photoresist combining a thermoreversible Diels-Alder network and a chain growth acrylate network. Macromolecules, 47.10 (2014): 3473-3482.

"Capabilities." Technical Coatings International Capabilities, Mar. 14, 2017, www.tciinc.com/capabilities/.

Chen, et al. Novel multifunctional hyperbranched polymeric photoinitiators with built-in amine coinitiators for UV curing. J. Mater. Chern., 17 (2007): 3389-3392.

Coenen. Industry trends are boosting Jet Printing. 2015.

Corrales, et al. Free radical macrophotoinitiators: an overview on recent advances. Journal of Photochemistry and Photobiology A: Chemistry, 159 (2003): 103-114.

"Screen Printing." Wikipedia, Wikimedia Foundation, May 17, 2018, en.wikipedia.org/wiki/Screen_printing#1960s_to_present.

Deckers, et al. Additive Manufacturing of Ceramics: A Review, J. Ceram. Sci. Tech., 05 [04] 245-260 (2014).

Dendukuri, et al. Continuous-Flow Lithography For High-Throughput Microparticle Synthesis. Nature Materials, 5 (May 2006): 365-369.

EP18801929.3 Extended European Search Report dated Feb. 17, 2021.

EP18816953.6 European Search Report dated May 18, 2021.

EP19903340.8 European Search Report dated Aug. 9, 2022.

EP20809676.8 European Search Report dated Dec. 22, 2022.

EP22165568.1 Extended European Search Report dated Jan. 23, 2023.

EP22165568.1 Partial European Search Report dated Oct. 14, 2022.

Essemtec AG. Essemtec—Spider—Compact High Speed Jetter and Dispenser. YouTube Web Video. Published on Jul. 5, 2016. 2 pages. URL https://www.youtube.com/watch?v=NpgBurid2wU.

Essemtec AG. Essemtec Scorpion—Versatile High Speed Jetting of Solder Paste and Glue. YouTube Web Video. Published on Nov. 13, 2014. 2 pages. URL https://www.youtube.com/watch?v=SZ-Kq2Gkm5Y.

Fairbanks, et al. Photoinitiated polymerization of PEG-diacrylate with lithium phenyl-2,4,6-trimethylbenzoylphosphinate: polymerization rate and cytocompatibility. Biomaterials, 30 (2009): 6702-6707.

"Flexography." Wikipedia, Wikimedia Foundation, May 23, 2018, en.wikipedia.org/wiki/Flexography.

GB1809886.3 Office Action dated May 16, 2019.

German, et al. Injection Molding of Metals and Ceramics. Metal Powder Industries Federation, 1997.

Gonsalvi, et al. Novel synthetic pathways for bis(acyl)phosphine oxide photoinitiators. Angew. Chern. Int. Ed., 51 (2012): 7895-7897.

Green, Industrial photoinitiators-a technical guide, CRC Press, © 2010 Taylor and Francis Group, LLC, 191 pages.

(56)          References Cited

OTHER PUBLICATIONS

Houben. Equipment for printing of high viscosity liquids and molten metals. Universiteit Twente. Sep. 27, 2012.

Ikemura, et al. Design of a new dental adhesive-effect of a water-soluble sodium acyl phosphine oxide with crown ether on adhesion to dental hard tissues. Dental Materials Journal, 28.3 (2009): 267-276.

Kloxin, et al. Photodegradable hydro gels for dynamic tuning of physical and chemical properties. Science, 324 (2009): 59-63.

Kyzen. Stencil Cleaning & Misprinted PCB Cleaners. 2018. http://www.kyzen.com/electronics-manufacturing-cleaning/stencils-and-misprints/.

Lambert, et al. Design considerations for mask projection microstereolithography systems. (Jun. 22, 2016) [online] (retrieved from https://sffsymposium.engr.utexas.edu/Manuscripts/2013/2013-09-Lambert.pdf), 20 pages.

Lee, et al. Solvent Compatibility of Poly(dimethylsiloxane)-Based Microfluidic Devices, Anal. Chem. 75 (2003): 6544-6554.

Massey, L. Permeability Properties of Plastics and Elastomers—A Guide to Packaging and Barrier Materials. Published Jan. 1, 2003. pp. 1-5, 19-29.

Matyjaszewski, et al. Atom transfer radical polymerization. Chern. Rev., 101 (2001): 2921-2990.

Mcdonald, et al. Fabrication ofmicrofluidic systems in poly(dimethylsiloxane). Electrophoresis, 21(2000): 27-40.

Miller. Slot Die Coating Technology. Aug. 3, 2009.

Moad, et al. Living radical polymerization by the RAFT process. Aust. J. Chern., 58 (2005): 379-410.

Murata, et al. Photopolymerization-induced phase separation in binary blends of photocurable/linear polymers. Polymer. vol. 43, Issue 9, Apr. 2002, pp. 2845-2859.

Myiconnect007. Taiyo's Inkjet Solder Mask Applied with Meyer Burger's PIXDRO IP410 Printer. YouTube Web Video. Published on Feb. 13, 2015. 2 pages. URL https://www.youtube.com/watch?v=jm_JteEkQWE.

Organic photoinitiators, [online] [Retrieved on Aug. 4, 2014]; Retrieved from the Internet URL: httQ://www.sigmaaldrich.com/materials-science/material-scienceproducts.html?TablePage=16374997; 1 page.

Otsu, et al. Polymer design by iniferter technique in radical polymerization: synthesis of AB and ABA block copolymers containing random and alternating copolymer se_guences. Polymer Journal, 17.1 (1985): 97-104.

Pan, et al. Rapid manufacturing in minutes: the development of a mask projection stereolithography process for high-speed fabrication. Proceedings of the ASME 2012 International Manufacturing Science and Engineering Conferences, Jun. 4-8, 2012, Notre Dame, Indiana, US, 10 pages.

PCT/US2018/032837 International Search Report and Written Opinion dated Sep. 24, 2018.

PCT/US2018/037630 International Search Report and Written Opinion dated Oct. 3, 2018.

PCT/US2019/068413 Search Report & Written Opinion dated Apr. 23, 2020.

PCT/US2022/025229 International Search Report and Written Opinion dated Aug. 24, 2022.

PCT/US20/33279 International Search Report & Written Opinion dated Oct. 9, 2020.

"Spin Coating." Wikipedia, Wikimedia Foundation, Apr. 10, 2018, en.wikipedia.org/wiki/Spin_coating.

Pinnau, et al. Gas and vapor properties of amorphous perfluorinated copolymer membranes based on 2,2-bistrifluoromethyl-4,5-difluoro-1 ,3-dioxole/tetrafluoroethylene. Journal of Membrane Science, 109: 125-133 (1996).

RAFT agents, [online] [Retrieved on Aug. 4, 2014]; Retrieved from the Internet URL: h!!Q ://www. sigmaaldrich.com/materials-science/material-sc ienceproducts. htrnl?TablePage=I03936134; 4 pages.

"Reverse Roll Coating." Wikipedia, Wikimedia Foundation, Apr. 10, 2018, en.wikipedia.org/wiki/Reverse_roll_coating.

Scott, et al. Two-color single-photon photoinitiation and photoinhibition for subdiffraction photolithography. Science, 324 (2009): 913-917.

Szczepanski, et al. A new approach to network heterogeneity: Polymerization Induced Phase Separation in photo-initiated, free-radical methacrylic systems. Polymer (Guildf). Sep. 28, 2012;53(21):4694-4701.

Temel, et al. Synthesis of main chain polymeric benzophenone photoinitiator via thiol-ene click chemistry and its use in free radical polymerization. J. Polym. Sci. A: Polym. Chern., 48 (2010): 5306-5312.

Unknown author, "DuPont™ Teflon® AF amorphous fluoroplastic resin," (Jun. 22, 2016) [online] (retrieved from http://www2.dupont.com/Teflon_Industrial/en_us/assets/downloads/h44587.pdf), 4 pages.

Unknown author, "Teflon™ AF amorphous fluoroplastic resins," (Jun. 22, 2016) [online] (retrieved from https://www.chemours.com/Teflon_Industrial/en_us/assets/downloads/teflon-af-product-information.pdf), 3 pages.

U.S. Appl. No. 15/983,962 Notice of Allowance dated Dec. 20, 2018.

U.S. Appl. No. 16/016,253 Notice of Allowance dated Oct. 2, 2020.

U.S. Appl. No. 15/374,734 Notice of Allowance dated Aug. 4, 2021.

U.S. Appl. No. 14/711,703 Notice of Allowance dated Jun. 8, 2017.

U.S. Appl. No. 14/711,703 Office Action dated Apr. 22, 2016.

U.S. Appl. No. 14/711,703 Office Action dated Dec. 1, 2016.

U.S. Appl. No. 14/848,162 Notice of Allowance dated Oct. 3, 2018.

U.S. Appl. No. 14/848,162 Office Action dated Jun. 5, 2018.

U.S. Appl. No. 14/848,162 Office Action dated Sep. 18, 2017.

U.S. Appl. No. 14/967,055 Office Action dated May 19, 2017.

U.S. Appl. No. 14/967,055 Office Action dated Jan. 7, 2019.

U.S. Appl. No. 14/967,055 Office Action dated Jul. 12, 2018.

U.S. Appl. No. 14/967,055 Office Action dated Nov. 1, 2017.

U.S. Appl. No. 15/374,734 Office Action dated Feb. 26, 2020.

U.S. Appl. No. 15/374,734 Office Action dated Sep. 4, 2020.

U.S. Appl. No. 15/919,124 Notice of Allowance dated Nov. 27, 2020.

U.S. Appl. No. 15/919,124 Office Action dated Jun. 25, 2020.

U.S. Appl. No. 15/983,962 Notice of Allowance dated Oct. 12, 2018.

U.S. Appl. No. 16/016,253 Office Action dated Feb. 21, 2019.

U.S. Appl. No. 16/016,253 Office Action dated Oct. 16, 2018.

U.S. Appl. No. 16/016,253 Office Action dated Oct. 21, 2019.

U.S. Appl. No. 16/016,257 Notice of Allowance dated Jul. 17, 2019.

U.S. Appl. No. 16/016,257 Office Action dated Mar. 21, 2019.

U.S. Appl. No. 16/016,257 Office Action dated Sep. 27, 2018.

U.S. Appl. No. 16/016,262 Notice of Allowance dated Jul. 5, 2019.

U.S. Appl. No. 16/016,262 Office Action dated Mar. 21, 2019.

U.S. Appl. No. 16/016,262 Office Action dated Sep. 28, 2018.

U.S. Appl. No. 16/049,288 Notice of Allowance dated Jan. 3, 2019.

U.S. Appl. No. 16/049,288 Office Action dated Oct. 11, 2018.

U.S. Appl. No. 16/202,039 Office Action dated Apr. 15, 2020.

U.S. Appl. No. 16/202,039 Office Action dated Aug. 27, 2020.

U.S. Appl. No. 16/202,039 Office Action dated Jul. 7, 2022.

U.S. Appl. No. 16/202,039 Office action dated Nov. 1, 2021.

U.S. Appl. No. 16/276,148 Office Action dated May 20, 2019.

U.S. Appl. No. 16/276,148 Office Action dated Nov. 29, 2019.

U.S. Appl. No. 16/457,380 Office Action dated Jan. 21, 2022.

U.S. Appl. No. 16/539,333 Notice of Allowance dated Sep. 9, 2021.

U.S. Appl. No. 16/539,333 Office Action dated Jan. 7, 2021.

U.S. Appl. No. 16/539,333 Office Action dated Jul. 20, 2021.

U.S. Appl. No. 16/842,082 Notice of Allowance dated Apr. 28, 2022.

U.S. Appl. No. 16/842,082 Notice of Allowance dated May 24, 2022.

U.S. Appl. No. 16/842,082 Office Action dated Jul. 22, 2021.

U.S. Appl. No. 17/355,394 Notice of Allowance dated Feb. 2, 2022.

U.S. Appl. No. 17/470,648 Notice of Allowance dated Jun. 14, 2023.

U.S. Appl. No. 16/016,253 Notice of Allowance dated Aug. 18, 2020.

U.S. Appl. No. 15/374,734 Office Action dated Sep. 6, 2019.

Varma et al. Solution Combustion Synthesis of Nanoscale Materials. Chem Rev. Dec. 14, 2016;116(23):14493-14586.

(56)     References Cited

OTHER PUBLICATIONS

Wei, et al. A highly efficient polyurethane-type polymeric photoinitiator containing in-chain benzophenone and coinitiator amine for photopolymerization of PU prepolymers. Macromol. Chern. Phys., 207 (2006): 2321-2328.

Yang, et al. Synthesis of 1,6-hexanediol diacrylate, 2010.

Yang, H. et al. "High Viscosity Jetting System for 3d Reactive Inkjet Printing." (2013).

Zhang, Teflon AF composite materials in membrane separation and molecular recognition in fluorous media. Ph.D. dissertation, University of Pittsburgh, 2013, 207 pages.

* cited by examiner

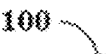
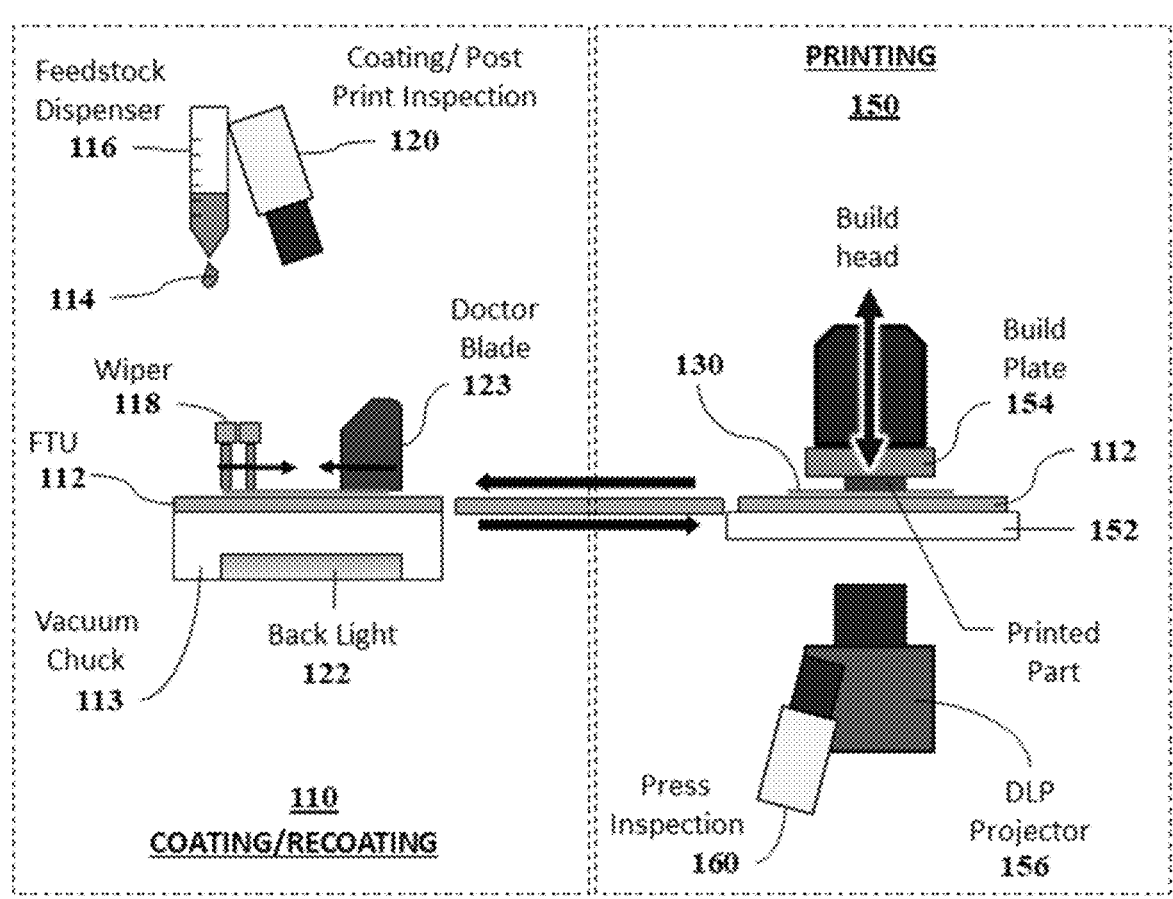
*FIG. 1D*

Figure 2:
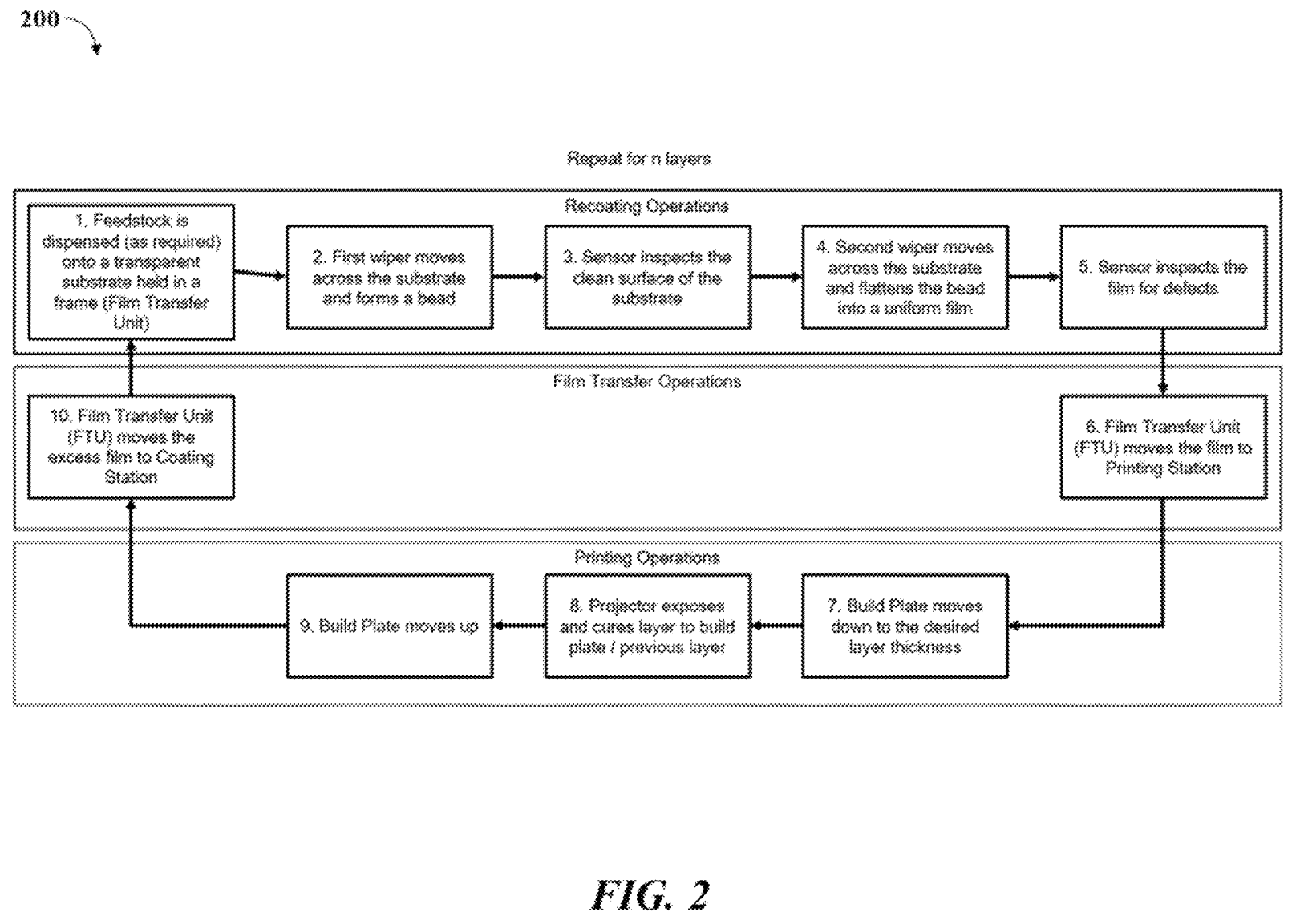

Repeat for n layers

Recoating Operations

1. Feedstock is dispensed (as required) onto a transparent substrate held in a frame (Film Transfer Unit)

2. First wiper moves across the substrate and forms a bead

3. Sensor inspects the clean surface of the substrate

4. Second wiper moves across the substrate and flattens the bead into a uniform film 5. Sensor inspects the film for defects

Film Transfer Operations

6. Film Transfer Unit (FTU) moves the film to Printing Station

10. Film Transfer Unit (FTU) moves the excess film to Coating Station

Printing Operations

7. Build Plate moves down to the desired layer thickness

8. Projector exposes and cures layer to build plate / previous layer

9. Build Plate moves up

Coating/recoating station
710

Printing station
750

Post Print
Inspection

780

Press

714

Wiper

712

782

Press
Inspection

DLP Projector

1000

SYSTEMS AND METHODS FOR STEREOLITHOGRAPHY THREE-DIMENSIONAL PRINTING

CROSS-REFERENCE

This application is a continuation of International Patent Application No. PCT/US22/25229, filed Apr. 18, 2022, which claims the benefit of U.S. Provisional Patent Application No. 63/176,664, filed Apr. 19, 2021, each of which is entirely incorporated herein by reference.

BACKGROUND

Additive manufacturing techniques, such as three-dimensional (3D) printing, are rapidly being adopted as useful techniques for a number of different applications, including rapid prototyping and fabrication of specialty components. Examples of 3D printing include powder-based printing, fused deposition modeling (FDM), and stereolithography (SLA).

Photopolymer-based 3D printing technology (e.g., SLA) may produce a 3D structure in a layer-by-layer fashion by using light to selectively cure polymeric precursors into a polymeric material within a photoactive resin. Photopolymer-based 3D printers that use bottom up illumination may project light upwards through an optically transparent window of a vat containing photoactive resin to cure at least a portion of the resin. Such printers may build a 3D structure by forming one layer at a time, where a subsequent layer adheres to the previous layer.

SUMMARY

The present disclosure describes technologies relating to three-dimensional (3D) printing. In some aspects, the systems and methods of the present disclosure for 3D printing may enhance print efficiency or speed by, for example, (i) performing or executing a plurality of processes (e.g., mixture deposition, mixture curing, etc.) of the 3D printing in parallel, (ii) utilizing one or more sensors for sensing one or more properties of the mixture, or (iii) utilizing one or more wipers to mix (e.g., reduce heterogeneity) the mixture during printing.

In an aspect, the present disclosure provides a system for printing a three-dimensional (3D) object, comprising: (i) at least one platform configured to hold a film of at least one mixture; (ii) a deposition unit comprising a nozzle in fluid communication with a source of the at least one mixture, wherein the deposition unit is configured to deposit the film onto the at least one platform; (iii) a building unit comprising a light source configured to provide a light sufficient for curing at least a portion of the film, to form at least a portion of the 3D object; and (iv) a controller operatively coupled to the at least one platform, wherein the controller is configured to direct the at least one platform to move from the deposition unit to the building unit, or vice versa, along a plurality of non-overlapping paths.

In some embodiments, the at least one platform comprises a plurality of platforms.

In some embodiments of any one of the systems disclosed herein, (i) a first platform of the plurality of platforms is configured to move from the deposition unit to the building unit, or vice versa, along a first path of the plurality of non-overlapping paths, and (ii) a second platform of the plurality of platforms is configured to move from the deposition unit to the building unit, or vice versa, along a second path of the plurality of non-overlapping paths. In some embodiments, the movement of the first platform in (i) and the movement of the second platform in (ii) occur substantially simultaneously. In some embodiments, (i) the first platform is configured to move from the deposition unit to the building unit, and vice versa, along the first path, and (ii) the second platform is configured to move from the deposition unit to the building unit, and vice versa, along the second path. In some embodiments, one of the first platform and the second form is configured to move (i) from the deposition unit to the building unit along the first path, and (ii) from the building unit to the deposition unit along the second path.

In some embodiments of any one of the systems disclosed herein, the at least one mixture comprises a plurality of mixtures, and the deposition unit is configured to deposit (i) a film of a first mixture of the plurality of mixtures onto a first platform of the plurality of platforms, and (ii) a film of a second mixture of the plurality of mixtures onto a second platform of the plurality of platforms.

In some embodiments of any one of the systems disclosed herein, the plurality of non-overlapping paths are disposed at different heights relative to each other. In some embodiments, a spacing between the plurality of non-overlapping paths is greater than a thickness of the film of the mixture.

In some embodiments of any one of the systems disclosed herein, the plurality of non-overlapping paths are disposed on a sample plane. In some embodiments, the plurality of non-overlapping paths are disposed around a central point.

In some embodiments of any one of the systems disclosed herein, at least one path of the plurality of non-overlapping paths is linear.

In some embodiments of any one of the systems disclosed herein, at least one path of the plurality of non-overlapping paths is non-linear.

In some embodiments of any one of the systems disclosed herein, the system further comprises at least one actuator configured to direct the at least one platform to move between the plurality of non-overlapping paths. In some embodiments, the at least one actuator is not configured to move along the plurality of non-overlapping paths. In some embodiments, the at least one actuator is fixed adjacent to the deposition unit or the building unit. In some embodiments, the at least one actuator is configured to move along at least one path of the plurality of non-overlapping paths. In some embodiments, the at least one actuator comprises a vertical actuator configured to adjust a vertical position of the at least one platform.

In some embodiments of any one of the systems disclosed herein, the system further comprises at least one sensor configured to (i) determine a profile of the film on the at least one platform, or (ii) subsequent to the curing, detect any excess mixture on the at least one platform. In some embodiments, in (i), the profile comprises a shape or a thickness of the film. In some embodiments, the at least one sensor is disposed along at least one path of the plurality of non-overlapping paths.

In some embodiments of any one of the systems disclosed herein, the system further comprises a build head configured to hold the at least a portion of the 3D object.

In some embodiments of any one of the systems disclosed herein, the deposition unit further comprises at least one wiper configured to move across the at least one platform to (i) spread the at least one mixture over the at least one platform to provide the film, or (ii) remove at least a portion of the film from the at least one platform.

In some embodiments of any one of the systems disclosed herein, the at least one mixture comprises a polymeric precursor and a photoinitiator. In some embodiments, the at least one mixture further comprises a photoinhibitor.

In another aspect, the present disclosure provides a method for printing a three-dimensional (3D) object, comprising: (a) providing: (i) at least one platform for holding a film of at least one mixture; (ii) a deposition unit comprising a nozzle in fluid communication with a source of the at least one mixture, wherein the deposition unit is for depositing the film onto the at least one platform; and (iii) a building unit comprising a light source for providing a light sufficient for curing at least a portion of the film, to form at least a portion of the 3D object; and (b) moving the at least one platform from the deposition unit to the building unit, or vice versa, along a plurality of non-overlapping paths.

In some embodiments, the at least one platform comprises a plurality of platforms.

In some embodiments of any one of the methods disclosed herein, the method further comprises, in (b), (i) moving a first platform of the plurality of platforms from the deposition unit to the building unit, or vice versa, along a first path of the plurality of non-overlapping paths, and (ii) moving a second platform of the plurality of platforms from the deposition unit to the building unit, or vice versa, along a second path of the plurality of non-overlapping paths. In some embodiments, the movement of the first platform in (i) and the movement of the second platform in (ii) occur substantially simultaneously. In some embodiments, the method further comprises (i) moving the first platform is from the deposition unit to the building unit, and vice versa, along the first path, and (ii) moving the second platform from the deposition unit to the building unit, and vice versa, along the second path. In some embodiments, the method further comprises moving one of the first platform and the second form (i) from the deposition unit to the building unit along the first path, and (ii) from the building unit to the deposition unit along the second path.

In some embodiments of any one of the methods disclosed herein, the at least one mixture comprises a plurality of mixtures, and the method further comprises directing the deposition unit to deposit (i) a film of a first mixture of the plurality of mixtures onto a first platform of the plurality of platforms, and (ii) a film of a second mixture of the plurality of mixtures onto a second platform of the plurality of platforms.

In some embodiments of any one of the methods disclosed herein, the plurality of non-overlapping paths are disposed at different heights relative to each other. In some embodiments, a spacing between the plurality of non-overlapping paths is greater than a thickness of the film of the mixture.

In some embodiments of any one of the methods disclosed herein, the plurality of non-overlapping paths are disposed on a sample plane. In some embodiments, the plurality of non-overlapping paths are disposed around a central point.

In some embodiments of any one of the methods disclosed herein, at least one path of the plurality of non-overlapping paths is linear.

In some embodiments of any one of the methods disclosed herein, at least one path of the plurality of non-overlapping paths is non-linear.

In some embodiments of any one of the methods disclosed herein, the method further comprises directing at least one actuator to move the at least one platform between the plurality of non-overlapping paths. In some embodiments, the at least one actuator is not configured to move along the plurality of non-overlapping paths. In some embodiments, the at least one actuator is fixed adjacent to the deposition unit or the building unit. In some embodiments, the at least one actuator is configured to move along at least one path of the plurality of non-overlapping paths. In some embodiments, the at least one actuator comprises a vertical actuator for adjusting a vertical position of the at least one platform.

In some embodiments of any one of the methods disclosed herein, the method further comprises directing at least one sensor to (i) determine a profile of the film on the at least one platform, or (ii) subsequent to the curing, detect any excess mixture on the at least one platform. In some embodiments, in (i), the profile comprises a shape or a thickness of the film. In some embodiments, the at least one sensor is disposed along at least one path of the plurality of non-overlapping paths.

In some embodiments of any one of the methods disclosed herein, the method further comprises proving a build head configured to hold the at least a portion of the 3D object.

In some embodiments of any one of the methods disclosed herein, the deposition unit further comprises at least one wiper configured to move across the at least one platform to (i) spread the at least one mixture over the at least one platform to provide the film, or (ii) remove at least a portion of the film from the at least one platform.

In some embodiments of any one of the methods disclosed herein, the at least one mixture comprises a polymeric precursor and a photoinitiator. In some embodiments, the at least one mixture further comprises a photoinhibitor.

In another aspect, the present disclosure provides a system for printing a three-dimensional (3D) object, comprising: (i) at least a first wiper configured to mix at least a portion of a mixture disposed over the platform; and (ii) at least a second wiper configured to remove the at least the portion of the mixture from at least a portion of the platform; and (iii) a controller configured to direct (i) the at least the first wiper to move relative to the platform, to mix the at least the portion of the mixture, and (ii) the at least the second wiper to move relative to the platform, to remove the at least the portion of the mixture from the platform.

In some embodiments, the at least the first wiper is angled with respect to a plane of the at least the second wiper.

In some embodiments of any one of the systems disclosed herein, the at least the first wiper comprises one or more gaps configured to direct the at least the portion of the mixture to flow through the one or more gaps. In some embodiments, the relative movement of the at least the first wiper directs the at least the portion of the mixture to flow through the one or more gaps and towards the at least the second wiper. In some embodiments, the at least the first wiper comprises a plurality of first wipers, wherein the plurality of first wipers are separated by the one or more gaps. In some embodiments, the plurality of first wipers are disposed at an angle relative to each other. In some embodiments, the one or more gaps comprise one or more openings.

In some embodiments of any one of the systems disclosed herein, the mixing occurs while the at least the wiper is moving relative to the platform.

In some embodiments of any one of the systems disclosed herein, the at least the second wiper is a single second wiper.

In some embodiments of any one of the systems disclosed herein, the at least the second wiper comprises a plurality of second wipers.

In some embodiments of any one of the systems disclosed herein, the at least the first wiper or the at least the second wiper comprises a flexible wiper.

In some embodiments of any one of the systems disclosed herein, the at least the first wiper or the at least the second wiper comprises polyurethane, rubber, or silicone.

In some embodiments of any one of the systems disclosed herein, the controller is configured to direct (i) prior to (ii), such that the at least the portion of the mixture is contacted by the at least the first wiper prior to the at least the second wiper.

In some embodiments of any one of the systems disclosed herein, the controller is configured to direct (i) and (ii) substantially simultaneously.

In some embodiments of any one of the systems disclosed herein, a direction of the relative movement in (i) and a direction of the relative movement in (ii) are the same.

In some embodiments of any one of the systems disclosed herein, the relative movement, in (i) or (ii), is a rotational movement or a lateral movement.

In some embodiments of any one of the systems disclosed herein, the mixing is characterized by reducing heterogeneity within the at least the portion of the mixture as compared to a control mixture without the mixing. In some embodiments, the heterogeneity is measure by an optical density of the at least the portion of the mixture.

In some embodiments of any one of the systems disclosed herein, the system further comprises the platform.

In some embodiments of any one of the systems disclosed herein, the system further comprises a nozzle in fluid communication with a source of the mixture, wherein the processor is further configured to direct dispensing of the mixture from the source and onto the platform. In some embodiments, the dispensing occurs subsequent to, simultaneously with, or prior to the mixing.

In some embodiments of any one of the systems disclosed herein, the controller is configured to direct (i) the at least the first wiper to move across the platform, and (ii) the at least the second wiper to move across the platform.

In some embodiments of any one of the systems disclosed herein, the system further comprises a build head configured to hold the at least a portion of the 3D object.

In some embodiments of any one of the systems disclosed herein, the at least one mixture comprises a polymeric precursor and a photoinitiator. In some embodiments, the at least one mixture further comprises a photoinhibitor.

In some embodiments of any one of the systems disclosed herein, the at least the first wiper or the at least the second wiper is substantially straight.

In some embodiments of any one of the systems disclosed herein, the at least the first wiper or the at least the second wiper is curved.

In another aspect, the present disclosure provides a method for printing a three-dimensional (3D) object, comprising: (a) providing: (i) at least a first wiper configured to mix at least a portion of a mixture disposed over the platform; and (ii) at least a second wiper configured to remove the at least the portion of the mixture from at least a portion of the platform; and d(b) (1) moving the at least the first wiper relative to the platform, to mix the at least the portion of the mixture, and (2) moving the at least the second wiper relative to the platform, to remove the at least the portion of the mixture from the platform.

In some embodiments, the at least the first wiper is angled with respect to a plane of the at least the second wiper.

In some embodiments of any one of the methods disclosed herein, the at least the first wiper comprises one or more gaps configured to direct the at least the portion of the mixture to flow through the one or more gaps. In some embodiments, the relative movement of the at least the first wiper directs the at least the portion of the mixture to flow through the one or more gaps and towards the at least the second wiper. In some embodiments, the at least the first wiper comprises a plurality of first wipers, wherein the plurality of first wipers are separated by the one or more gaps. In some embodiments, the plurality of first wipers are disposed at an angle relative to each other. In some embodiments, the one or more gaps comprise one or more openings.

In some embodiments of any one of the methods disclosed herein, the mixing occurs while the at least the wiper is moving relative to the platform.

In some embodiments of any one of the methods disclosed herein, the at least the second wiper is a single second wiper.

In some embodiments of any one of the methods disclosed herein, the at least the second wiper comprises a plurality of second wipers.

In some embodiments of any one of the methods disclosed herein, the at least the first wiper or the at least the second wiper comprises a flexible wiper.

In some embodiments of any one of the methods disclosed herein, the at least the first wiper or the at least the second wiper comprises polyurethane, rubber, or silicone.

In some embodiments of any one of the methods disclosed herein, the method further comprises performing (1) prior to (2), such that the at least the portion of the mixture is contacted by the at least the first wiper prior to the at least the second wiper.

In some embodiments of any one of the methods disclosed herein, the method further comprises performing (1) and (2) substantially simultaneously.

In some embodiments of any one of the methods disclosed herein, a direction of the relative movement in (1) and a direction of the relative movement in (2) are the same.

In some embodiments of any one of the methods disclosed herein, the relative movement, in (1) or (2), is a rotational movement or a lateral movement.

In some embodiments of any one of the methods disclosed herein, the mixing is characterized by reducing heterogeneity within the at least the portion of the mixture as compared to a control mixture without the mixing. In some embodiments, the heterogeneity is measure by an optical density of the at least the portion of the mixture.

In some embodiments of any one of the methods disclosed herein, the method further comprises providing the platform.

In some embodiments of any one of the methods disclosed herein, the method further comprises dispensing the mixture from a source of the mixture, through a nozzle, and onto the platform. In some embodiments, the dispensing occurs subsequent to, simultaneously with, or prior to the mixing.

In some embodiments of any one of the methods disclosed herein, the method comprises (1) moving the at least the first wiper across the platform, and (ii) moving the at least the second wiper across the platform.

In some embodiments of any one of the methods disclosed herein, the method further comprises providing a build head for holding the at least a portion of the 3D object.

In some embodiments of any one of the methods disclosed herein, the at least one mixture comprises a polymeric precursor and a photoinitiator. In some embodiments, the at least one mixture further comprises a photoinhibitor.

In some embodiments of any one of the methods disclosed herein, the at least the first wiper or the at least the second wiper is substantially straight.

In some embodiments of any one of the methods disclosed herein, the at least the first wiper or the at least the second wiper is curved.

In another aspect, the present disclosure provides a system for printing a three-dimensional (3D) object, comprising: (i) at least one belt, wherein a surface of the at least one belt comprises at least one platform configured to hold a film of a mixture; (ii) a deposition unit comprising a nozzle in fluid communication with a source of the mixture, wherein the deposition unit is configured to deposit the film onto the at least one platform; (iii) a building unit comprising a light source configured to provide a light sufficient for curing at least a portion of the film, to form at least a portion of the 3D object; (iv) a sensor disposed along a path of the at least one platform from the deposition unit to the building unit, or vice versa, wherein the sensor is configured to (i) determine a profile of the film disposed on the at least one platform prior to the curing, or (ii) detect any excess mixture on the at least one platform subsequent to the curing; and (v) a controller operatively coupled to the at least one platform, wherein the controller is configured to direct movement of the at least one platform along the path.

In some embodiments, the sensor is disposed within the path.

In some embodiments of any one of the systems disclosed herein, the path is from the deposition unit to the building unit, and wherein the sensor is configured to determine the profile of the film.

In some embodiments of any one of the systems disclosed herein, the path is from the building unit to the deposition unit, and wherein the sensor is configured to detect the excess mixture on the at least one platform.

In some embodiments of any one of the systems disclosed herein, the deposition unit further comprises an additional sensor configured to determine a different profile of the film prior to the curing.

In some embodiments of any one of the systems disclosed herein, the sensor comprises a camera or a laser displacement sensor.

In some embodiments of any one of the systems disclosed herein, the system further comprises a wiper configured to remove the excess mixture from the at least one platform. In some embodiments, the wiper is a part of the deposition unit. In some embodiments, the wiper is a part of a cleaning unit that is disposed between the path from the building unit to the deposition unit.

In some embodiments of any one of the systems disclosed herein, the at least one platform comprises a plurality of platforms. In some embodiments, (i) a first belt of the at least one belt comprises a first platform of the plurality of platforms and (ii) a second belt of the at least one belt comprises a second platform of the plurality of platforms.

In some embodiments of any one of the systems disclosed herein, the at least one belt comprises a continuous belt or a roll-to-roll belt.

In some embodiments of any one of the systems disclosed herein, at least a portion of the surface is the at least one platform.

In some embodiments of any one of the systems disclosed herein, the controller is configured to direct the sensor to perform (i) or (ii) while the at least one platform is moving along the path.

In some embodiments of any one of the systems disclosed herein, the system further comprises a build head configured to hold the at least a portion of the 3D object.

In some embodiments of any one of the systems disclosed herein, the mixture comprises a polymeric precursor and a photoinitiator.

In some embodiments of any one of the systems disclosed herein, the at least one mixture further comprises a photoinhibitor.

In another aspect, the present disclosure provides a method for printing a three-dimensional (3D) object, comprising: (a) providing: (i) at least one belt, wherein a surface of the at least one belt comprises at least one platform for holding a film of a mixture; (ii) a deposition unit comprising a nozzle in fluid communication with a source of the mixture, wherein the deposition unit is for depositing the film onto the at least one platform; (iii) a building unit comprising a light source for providing a light sufficient for curing at least a portion of the film, to form at least a portion of the 3D object; and (iv) a sensor disposed along a path of the at least one platform from the deposition unit to the building unit, or vice versa, wherein the sensor is for (1) determining a profile of the film disposed on the at least one platform prior to the curing, or (2) detecting any excess mixture on the at least one platform subsequent to the curing; and (b) moving the at least one platform along the path.

In some embodiments, the sensor is disposed within the path.

In some embodiments of any one of the methods disclosed herein, the path is from the deposition unit to the building unit, and wherein the sensor is for determining the profile of the film.

In some embodiments of any one of the methods disclosed herein, the path is from the building unit to the deposition unit, and wherein the sensor is for detecting the excess mixture on the at least one platform.

In some embodiments of any one of the methods disclosed herein, the deposition unit further comprises an additional sensor configured to determine a different profile of the film prior to the curing.

In some embodiments of any one of the methods disclosed herein, the sensor comprises a camera or a laser displacement sensor.

In some embodiments of any one of the methods disclosed herein, the method further comprises a wiper configured to remove the excess mixture from the at least one platform.

In some embodiments of any one of the methods disclosed herein, the wiper is a part of the deposition unit.

In some embodiments of any one of the methods disclosed herein, the wiper is a part of a cleaning unit that is disposed between the path from the building unit to the deposition unit.

In some embodiments of any one of the methods disclosed herein, the at least one platform comprises a plurality of platforms. In some embodiments, (i) a first continuous belt of the at least one continuous belt comprises a first platform of the plurality of platforms and (ii) a second continuous belt of the at least one continuous belt comprises a second platform of the plurality of platforms.

In some embodiments of any one of the methods disclosed herein, the at least one belt comprises a continuous belt or a roll-to-roll belt.

In some embodiments of any one of the methods disclosed herein, least a portion of the surface is the at least one platform.

In some embodiments of any one of the methods disclosed herein, the method further comprises directing the sensor to perform (1) or (2) while the at least one platform is moving along the path.

In some embodiments of any one of the methods disclosed herein, the method further comprises a build head configured to hold the at least a portion of the 3D object.

In some embodiments of any one of the methods disclosed herein, the mixture comprises a polymeric precursor and a photoinitiator.

In some embodiments of any one of the methods disclosed herein, the at least one mixture further comprises a photoinhibitor.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 1D is a schematic illustration showing a side view of an example of a serial 3D printing system;

FIG. 2 shows a flow chart of an example method for a serial 3D printing system;

DETAILED DESCRIPTION

Figure 1A:
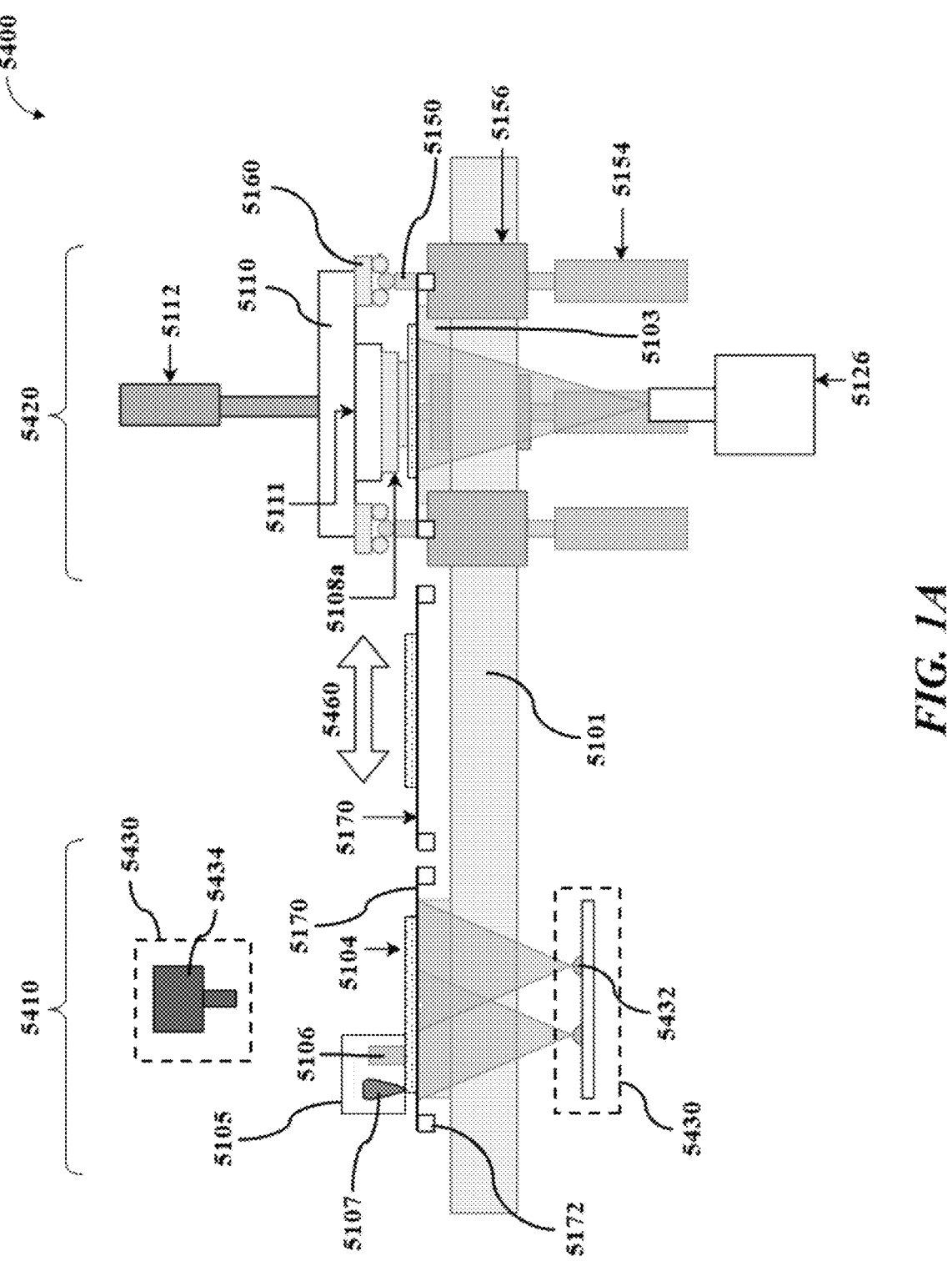
FIGS. 1A-1C show an example of a three-dimensional (3D) printing system comprising a deposition zone and a printing zone.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "three-dimensional object" (also "3D object"), as used herein, generally refers to an object or a part that is printed by three-dimensional ("3D") printing. The 3D object may be at least a portion of a larger 3D object or an entirety of the 3D object. The 3D object may be fabricated (e.g., printed) in accordance with a computer model of the 3D object.

The term "platform," as used herein, generally refers to a structure that supports a mixture (e.g., a liquid) or a film of the mixture during 3D printing. The mixture may have a viscosity that is sufficient to permit the mixture to remain on or adjacent to the platform during 3D printing. The platform may be flat. The platform may include an optically transparent or semi-transparent print window (e.g., glass or a polymer) to direct light (e.g., one or more lights) through the window and to the mixture or the film of the mixture. Alternatively or in addition to, the light may be directed from above and/or one or more sides of the platform. The platform may have various shapes. The platform may be a rectangle or a ring, for example.

The platform may comprise one or more walls adjacent to the platform, such as at least 1, 2, 3, or 4 walls. The walls may enclose the platform. During printing, a property (e.g., viscosity) of a mixture used for printing may be sufficient to keep the mixture adjacent to the platform without sufficient flow of the mixture towards the one or more walls. In some examples, the walls prevent flow of the mixture out of the open platform. In some examples, the platform may be part (e.g., a bottom portion) of a container or a vat.

The platform may be an "open platform" that is not bounded by any wall. The he open platform may not be vat or a container. The open platform may not be part of a vat or a container. The open platform may be a substrate or slab that does not have a depression (e.g., vat or container) for retaining a liquid. In such situations, the mixture may be sufficiently viscous such that the mixture remains on the open platform. The open platform may include one or more sides that are not bounded.

The platform may comprise an area configured to hold the mixture. The area may be at least a portion of the platform (e.g., at least a portion of a surface of the platform). The area may be an additional object (e.g., a sheet, plaster, film, glass, window, etc.) disposed on or adjacent to the platform. The area may be stationary relative to the platform. Alternatively or in addition to, the area may be movable relative to the platform.

At least a portion of the platform may be flexible. Alternatively or in addition to, at least a portion of the platform may be rigid. The platform may be movable between two or more locations. The platform may be positioned over or adjacent to a base. At least a portion of the base may be transparent or semi-transparent to direct light (e.g., sensor light or photoinitiation light) through the base and towards the platform. The base may be flexible. Alternatively or in addition to, at least a portion of the base may be rigid. Such base may be a slab, which slab may be transparent, semi-transparent, opaque, or not transparent.

In an example, the base may comprise at least one window (e.g., at least 1, 2, 3, 4, 5, or more windows), each window having a thickness that is thinner than, substantially equivalent to, or thicker than the platform as disclosed herein. In another example, the base may comprise at least one belt (e.g., at least 1, 2, 3, 4, 5, or more belt(s)), each belt having a thickness that is thinner than, substantially equivalent to, or thicker than the platform as disclosed herein. In a different example, a platform as disclosed herein (e.g., a transparent or semi-transparent polymer sheet) may be a part of a belt. The belt as disclosed herein may be a roll-to-roll belt system comprised of a transparent or semi-transparent sheet (e.g., polymer sheet), wherein the sheet is provided from a payout roll and ultimately collected by a separate take-up roll. Alternatively, the belt as disclosed herein may be a single continuous belt (or a continuous roll) operatively coupled to a plurality of actuators (e.g., wheels) to control movement and/or configuration of the single roll during printing. Yet in a different example, a platform as disclosed herein may be disposed over a surface of such belt system. In some cases, a belt may configured to direct movement of one or more different platforms. Alternatively, the 3D printing system may comprise a plurality of different platforms, and each belt may be configured to direct movement of at least one platform. For example, a first belt may be configured to direct movement of a platform from point A to point B, and the platform may be transferred from the first belt to a second and subsequent belt to direct movement of the platform from point B to point C. Point B may be a location where the first and second belts come in proximity to each other. One or more belts as disclosed herein may be operatively coupled to one or more rotational actuators for direct rotation of the one or more belts.

The term "print surface," as used herein, generally refers to at least a portion of the platform (e.g., a print area or print window) or at least a portion of an object disposed on or adjacent to the platform (e.g., a film) that is configured to hold a film of the mixture or any excess thereof during the 3D printing.

The term "build head," as used herein, generally refers to a structure that supports at least a portion of a printed 3D object (or another object onto which a 3D object may be printed). During the 3D printing, the build head or the at least the portion of the printed 3D object that is disposed on the build head may be in contact with a mixture (e.g., a film of a mixture), and at least a portion of the mixture may be formed into a new portion (e.g., layer) of the 3D object.

A relative distance between the platform (e.g., a print window of the platform, a film disposed on or adjacent to the platform) and the build head may be adjustable (e.g., by one or more actuators coupled to the platform and/or the build head). A relative position of the build head with respect to the platform may be adjustable. The build head may be movable relative to the platform. Hence, the moving piece may be the build head, the platform, or both. A distance between a surface of the build head and a surface of the platform may be adjustable by the one or more actuators. A relative movement between the build head and at least a portion of the platform (e.g., a print window of the platform, a film disposed on or adjacent to the platform) may comprise one or more motions, such as, for example, sliding, rotating, and/or twisting motions. Such relative movement may take place in one or more coordinate directions (e.g., x-, y-, and/or z-axis).

The term "sensor," as used herein, generally refers to a device, system, or a subsystem that provides a feedback (e.g., electromagnetic radiation absorbance and/or reflectance, image, video, distance, pressure, force, electrical current, electrical potential, magnetic field, position, angle, displacement, distance, speed, acceleration, etc.). Such feedback may correspond to or be correlated with one or more components of the 3D printing system (e.g., a mixture of a film of a mixture, the build head, the platform, etc.) or the 3D printing process (e.g., deposition of a film of a mixture over an area of the platform, etc.). Examples of the sensor can include, but are not limited to, light sensor, speed sensor, pressure sensor, tactile sensor, chemical sensor, current sensor, electroscope, galvanometer, hall effect sensor, hall probe, magnetic anomaly detector, magnetometer, magnetoresistance, magnetic field sensor (e.g., microelectromechanical systems (MEMS) magnetic field sensor), metal detector, planar hall sensor, voltage detector, etc. Additional examples of the sensor can include, but are not limited to, capacitive displacement sensor, flex sensor, free fall sensor, gyroscopic sensor, impact sensor, inclinometer, piezoelectric sensor, linear encoder, liquid capacitive inclinometers, odometer, photoelectric sensor, piezoelectric sensor, position sensor, angular rate sensor, rotary encoder, shock detector (i.e., impact monitor), tilt sensor, ultrasonic thickness gauge, variable reluctance sensor, velocity receiver, a colorimeter, infrared sensor, photodetector, phototransistor, force sensor, tactile sensor, strain gauge, temperature sensor, Doppler radar, motion detector, proximity sensor, speed sensor, etc. In some cases, the sensor may be a switch, comprising, for example, a contact switch (e.g., a high precision contact switch), a limit switch, a reed switch. In some cases, the sensor may be a level.

The term "mixture," as used herein, generally refers to a material that is usable to print a 3D object. The mixture may be referred to as a resin. The mixture may be dispensed from a nozzle and over an area. Such area can be an area of a platform (e.g., a print window) or a film (e.g., an opaque, transparent, and/or a semi-transparent film). The mixture may be a liquid, semi-liquid, or solid. The mixture may have a viscosity sufficient to be self-supporting on the print window without flowing or sufficient flowing. The viscosity of the mixture may range, for example, from about 4,000 centipoise (cP) to about 2,000,000 cP. The mixture may be pressed (e.g., by a wiper or a build head) into a film of the mixture on or over such area (e.g., the print window, the film, etc.). A thickness of the film of the mixture may be adjustable. The mixture may include a photoactive resin. The photoactive resin may include a polymerizable and/or cross-linkable component (e.g., a precursor) and a photoinitiator that activates curing of the polymerizable and/or cross-linkable component, to thereby subject the polymerizable and/or cross-linkable component to polymerization and/or cross-linking. The photoactive resin may include a photoinhibitor that inhibits curing of the polymerizable and/or cross-linkable component. In some examples, the mixture may include a plurality of particles (e.g., polymer particles, metal particles, ceramic particles, combinations thereof, etc.). In such a case, the mixture may be a slurry or a photopolymer slurry. The mixture may be a paste. The plurality of particles may be added to the mixture. The plurality of particles may be solids or semi-solids (e.g., gels). Examples of non-metal material include metallic, intermetallic, ceramic, polymeric, or composite materials. The plurality of particles may be suspended throughout the mixture. The plurality of particles in the mixture may have a distribution that is monodisperse or polydisperse. In some examples, the mixture may contain additional optical absorbers and/or non-photoreactive components (e.g., fillers, binders, plasticizers, stabilizers such as radical inhibitors, etc.). The 3D printing may be performed with at least 1, 2, 3, 4, 5, 6, 7, 8, 9, 10 or more mixtures. A plurality of mixtures comprising different materials (e.g., different photoactive resin and/or different plurality of particles) may be used for printing a multi-material 3D object.

The terms "mixture" and "viscous liquid" may be used interchangeably in the present disclosure.

The term "particles," as used here, generally refers to any particulate material that may be incorporated into the mixture. The particles may be incorporated to alter (e.g., increase, decrease, stabilize, etc.) a material property (e.g., viscosity) of the mixture. The particles may be configured to be melted or sintered (e.g., not completely melted). The particulate material may be in powder form. The particles may be inorganic materials. The inorganic materials may be metallic (e.g., aluminum or titanium), intermetallic (e.g., steel alloys), ceramic (e.g., metal oxides) materials, or any combination thereof. The powders may be coated by one or more polymers. The term "metal" or "metallic" generally refers to both metallic and intermetallic materials. The metallic materials may include ferromagnetic metals (e.g., iron and/or nickel). The particles may have various shapes and sizes. For example, a particle may be in the shape of a sphere, cuboid, or disc, or any partial shape or combination of shapes thereof. The particle may have a cross-section that is circular, triangular, square, rectangular, pentagonal, hexagonal, or any partial shape or combination of shapes thereof. Upon heating, the particles may sinter (or coalesce) into a solid or porous object that may be at least a portion of a larger 3D object or an entirety of the 3D object. The 3D printing may be performed with at least 1, 2, 3, 4, 5, 6, 7, 8, 9, 10 or more types of particles.

The term "a film of a mixture" or "a layer of mixture," as used interchangeably herein, generally refers to a layer of the mixture that is usable to print a 3D object. The film of the mixture may have a uniform or non-uniform thickness across the film of the mixture. The film of the mixture may have an average thickness or a variation of the thickness that is below, within, or above a defined threshold (e.g., a value or a range). The average thickness or the variation of the thickness of the film of the mixture may be detectable and/or adjustable during the 3D printing. An average (mean) thickness of the film of the mixture may be an average of thicknesses from at least about 2, 3, 4, 5, 6, 7, 8, 9, 10, 15, 20, 30, 40, 50, 100, 200, 300, 400, 500, 1000, 2000, 3000, 4000, 5000, or more positions within the film of the mixture. An average (mean) thickness of the film of the mixture may be an average of thicknesses from at most about 5000, 4000, 3000, 2000, 1000, 500, 400, 300, 200, 100, 50, 40, 30, 20, 15, 10, 9, 8, 7, 6, 5, 4, 3, or 2 positions within the film of the mixture. A variation of the thickness of the film of the mixture may be a variance (i.e., sigma squared or "$\sigma^2$") or standard deviation (i.e., sigma or "$\sigma$") within a set of thicknesses from the at least about 2, 3, 4, 5, 6, 7, 8, 9, 10, 15, 20, 30, 40, 50, 100, 200, 300, 400, 500, 1000, 2000, 3000, 4000, 5000, or more positions within the film of the mixture. A variation of the thickness of the film of the mixture may be a variance or standard deviation within a set of thicknesses from the at most about 5000, 4000, 3000, 2000, 1000, 500, 400, 300, 200, 100, 50, 40, 30, 20, 15, 10, 9, 8, 7, 6, 5, 4, 3, or 2 positions within the film of the mixture.

During 3D printing, one or more parameters (e.g., (1) a speed of deposition of a film of a mixture adjacent to a surface of an area of a platform (e.g., a print window, a film, etc.), (2) a speed of extrusion of the mixture from a nozzle onto the area of the platform, (3) an amount of the mixture extruded onto the area of the platform, (4) intensity and/or exposure time of one or more lights from one or more light sources, (5) a speed of a relative movement between the platform and the build head, (6) a speed of a relative movement of the platform between a deposition unit and a printing unit, (7) a force exerted by the build head onto the mixture on or adjacent to the platform, etc.) may be maintained or adjusted to maintain or improve print quality (e.g., a quality of the film of the mixture prior to printing at least a portion of the 3D object, or the printed portion of the 3D object, etc.).

The film of the mixture that is usable to print the 3D object may or may not be re-deposited (e.g., adjacent to the area of the platform) prior to printing at least a portion of the 3D object. For re-deposition, the film of the mixture that is usable to print the 3D object may be removed and a new film of the mixture may be re-deposited prior to printing at least a portion of the 3D object. Access mixture from the removed film may or may not be recycled to deposit the new film of the mixture. In some examples, the film of the mixture may be re-deposited until a desired (e.g., pre-determined) thickness, average thickness, a variation of the thickness, area, average area, and/or a variation of the area is obtained.

The term "deposition head," as used herein, generally refers to a part that may move across an area of a platform configured to hold a mixture (e.g., a print window a platform, a film on or adjacent to the platform, etc.). The deposition head may move across the area and deposit a mixture (e.g., a pool or film of a mixture) over the area. The film of the mixture may have a uniform thickness across the print window. The film of the mixture may not have a uniform thickness across the print window. The thickness of the film may be adjustable. The deposition head may be coupled to a motion stage adjacent to at least the area of the platform. The deposition head may have at least one nozzle to dispense at least one mixture (e.g., a mixture) over the area of the platform. The deposition head may have at least one wiper to form the layer (or film) of the mixture or remove any excess mixture from the area. The deposition head may have at least one actuator to adjust a distance between the at least one wiper and the area of the platform (thereby to adjust a desired thickness of the film of the mixture). In some examples, the deposition head may have a slot die. The deposition head may retrieve any excess mixture from the area of the platform, contain the excess mixture within the deposition head, and/or recycle the retrieved mixture when printing subsequent portions of the 3D object. The deposition head may clean the area of the platform.

The 3D printing may be performed with at least 1, 2, 3, 4, 5, 6, 7, 8, 9, 10 or more deposition heads. Each of a plurality of deposition heads may be in fluid communication with a separate source of mixture. The plurality of deposition heads may be used to deposit and cure alternating films of different mixtures (e.g., different photoactive resins and/or different inorganic particles). Compartmentalizing different mixtures in separate sources and separate deposition heads may improve printing speed and prevent cross-contamination of the different mixtures.

The term "nozzle," as used herein, generally refers to a component of the deposition head that directs the mixture towards the area of the platform. The nozzle may include an opening for the mixture to enter and an additional opening for the mixture to exit. The nozzle may not comprise any contraction or control mechanism to adjust flow of the mixture towards the open platform. As an alternative, the nozzle may comprise a contraction or control mechanism to adjust the flow of the mixture towards the open platform.

The term "wiper," as used herein, generally refers to a part that may be in contact with a the area of the platform configured to hold a mixture, the mixture, or another wiper. In some examples, the wiper may be a component of a deposition head. The wiper may be in contact with a mixture to press the mixture into a film. The wiper may be in contact with the area of the platform to remove any excess mixture. A distance between the wiper and the area of the platform may be adjustable. In some examples, the wiper may be a component in a cleaning zone. The wiper may be in contact with another wiper to remove any excess mixture. The wiper may have various shapes, sizes, and surface textures. The wiper may be a blade (e.g., a squeegee blade, a doctor blade), roller, or rod (e.g., wire wound rod), for example. The 3D printing may be performed with at least 1, 2, 3, 4, 5, 6, 7, 8, 9, 10 or more wipers. In some examples, the blade is part of the nozzle or attached to the nozzle.

The deposition head may be a container with an exit orifice opened towards the area of the platform configured to hold the mixture. The mixture may be poured out from the deposition head, through the exit orifice, and towards the area of the platform. The deposition head may be mobile or stationary when the mixture is poured out towards the area of the platform.

One or more lights (e.g., from one or more light sources) may be used to initiate (activate) curing of a portion of the mixture, thereby to print at least a portion of the 3D object. The one or more lights (e.g., from one or more light sources) may be used to inhibit (prevent) curing of a portion of the mixture adjacent to an area of the platform (e.g., a print window, a film on or adjacent to the platform, etc.). The one or more lights (e.g., from one or more light sources) may be used by one or more sensors to determine a profile and/or quality of the mixture (e.g., the film of the mixture) prior to, during, and subsequent to printing the at least the portion of the 3D object.

The 3D printing may be performed with one wavelength. The 3D printing may be performed with at least about 2, 3, 4, 5, 6, 7, 8, 9, 10 or more wavelengths that are different. The 3D printing may be performed with at least about 1, 2, 3, 4, 5, 6, 7, 8, 9, 10 or more lights. The 3D printing may be performed with at least about 1, 2, 3, 4, 5, 6, 7, 8, 9, 10 or more light sources, and it may be desirable to prevent curing of a portion of the mixture (e.g., a film of the mixture) adjacent to the area of the platform (e.g., a print window, a film on or adjacent to the platform, etc.).

The one or more lights may comprise electromagnetic radiation. The term "electromagnetic radiation," as used herein, generally refers to one or more wavelengths from the electromagnetic spectrum including, but not limited to x-rays (about 0.1 nanometers (nm) to about 10.0 nm; or about $10^{18}$ Hertz (Hz) to about $10^{16}$ Hz), ultraviolet (UV) rays (about 10.0 nm to about 380 nm; or about $8\times10^{16}$ Hz to about 915 Hz), visible light (about 380 nm to about 750 nm; or about $8\times10^{14}$ Hz to about $4\times10^{14}$ Hz), infrared (IR) light (about 750 nm to about 0.1 centimeters (cm); or about $4\times10^{14}$ Hz to about $5\times10^{11}$ Hz), and microwaves (about 0.1 cm to about 100 cm; or about $10^8$ Hz to about $5\times10^{11}$ Hz).

The one or more light sources may comprise an electromagnetic radiation source. The term "electromagnetic radiation source," as used herein, generally refers to a source that emits electromagnetic radiation. The electromagnetic radiation source may emit one or more wavelengths from the electromagnetic spectrum.

The term "photoinitiation," as used herein, generally refers to a process of subjecting a portion of a mixture (e.g., a film of the mixture) to a light to cure a photoactive resin in the portion of the mixture. The light (i.e., "photoinitiation light") may have a wavelength that activates a photoinitiator that initiates curing of a polymerizable and/or cross-linkable component (e.g., monomers, oligomers, etc.) in the photoactive resin.

The term "photoinhibition," as used herein, generally refers to a process of subjecting a portion of a mixture (e.g., a film of a mixture) to a light to inhibit curing of a photoactive resin in the portion of the mixture. The light (i.e., "photoinhibition light") may have a wavelength that activates a photoinhibitor that inhibit curing of a polymerizable and/or cross-linkable component in the photoactive resin. The wavelength of the photoinhibition light and another wavelength of a photoinitiation light may be different. In some examples, the photoinhibition light and the photoinitiation light may be projected from the same optical source. In some examples, the photoinhibition light and the photoinitiation light may be projected from different optical sources.

The term "diffuser," as used herein, generally refers to a sheet (e.g., a plate) or a film (e.g., a laminate or coating on an optical lens or a window) that diffuses energy (e.g., light). The diffuser may scatter or filter the energy. The diffuser may receive one or more electromagnetic radiations (e.g., IR lights) on a first side of the diffuser, then transmit scattered (e.g., distributed, evenly distributed, etc) electromagnetic radiations from a second side of the diffuser opposite the first side. The transmitted scattered electromagnetic radiations may form a flood electromagnetic radiation. The diffuser may eliminate bright spots corresponding to location(s) of one or more electromagnetic radiation sources. Flux of the scattered electromagnetic radiations from the diffuser may be independent of angle with respect to the diffuser and/or of position within a surface of the diffuser. The diffuser may cause light to spread evenly across a surface (e.g., a surface of the diffuser), thereby minimizing or removing high intensity bright spots as the light travels through the diffuser.

The term "profile," as used herein, generally refers to a view (e.g., image or video) and/or electromagnetic spectrum with respect to such components. The view may be a side view, bottom-up view, or top-down view. The view may comprise an outline, silhouette, contour, shape, form, figure, structure of the components. The electromagnetic spectrum may be absorption, emission, and/or fluorescence spectrum of at least a portion of the electromagnetic radiation (e.g., IR radiation). The profiles may be indicative of one or more features of the components. In an example, the sensor may be capable of sensing or detecting and/or analyzing zero-dimensional (e.g., a single point), one-dimensional (1D), two-dimensional (2D), and/or 3D profiles (e.g., features) of the components.

The 3D printing system may be surrounded by an enclosure (e.g., a case or fabric). The enclosure may prevent external energy (e.g., ambient light) from interfering with one or more lights used during the 3D printing.

The term "green body," as used herein, generally refers to a 3D object that has a polymeric material and a plurality of particles (e.g., metal, ceramic, or both) that are encapsulated by the polymeric material. The plurality of particles may be in a polymer (or polymeric) matrix. The plurality of particles may be capable of sintering or melting. The green body may be self-supporting. The green body may be heated in a heater (e.g., in a furnace) to burn off at least a portion of the polymeric material and coalesce the plurality of particles into at least a portion of a larger 3D object or an entirety of the 3D object.

The term "brown body," as used herein, generally refers to a green body that has been treated (e.g., solvent treatment, heat treatment, pressure treatment, etc.) to remove at least a portion (e.g., at least 20 percent (%), 30%, 40%, 50%, 60%, 70%, 80%, 90%, 95%, or more; at most 100%, 95%, 90%, 80%, 70%, 60%, 50%, 4%, 30%, 20%, or less) of the polymeric material within the green body. The brown body may comprise the plurality of particles of the green body. The plurality of particles may be capable of sintering or melting. The brown body may be self-supporting. The brown body may be heated in a heater (e.g., in a furnace) to burn off at least a portion of any remaining polymeric material and coalesce the plurality of particles into at least a portion of a larger 3D object or an entirety of the 3D object.

The present disclosure provides methods and systems for forming a 3D object. Such methods may employ application of a film of a mixture adjacent to an area of a platform and exposing the film to light to subject at least a portion of the film to polymerization and/or cross-linking. The 3D object may be based on a computer model of the 3D object, such as a computer-aided design (CAD) stored in a non-transitory computer storage medium (e.g., medium).

Systems for 3D Printing

Three-dimensional (3D) printing systems and methods (e.g., layer-by-layer 3D printing) can utilize repeating a serial process comprising (i) preparation (e.g., deposition) of a printing material (e.g., a layer of powder, mixture, resin, etc.) for printing and (ii) printing (e.g., solidification, curing, fusion, laser sintering, etc.) at least a portion of the printing material into at least a portion of a 3D object. Thus, a time to produce a layer of the 3D object may be the sum of at least the steps (i) and (ii), and such production may be time-consuming. In view of the foregoing, there exists a considerable need for alternative systems and methods to reduce the production time.

In an aspect, the present disclosure provides a system for printing a 3D object. The system can comprise at least one platform configured to hold a film of at least one mixture. The at least one platform may comprise a window (e.g., a solid window or a transparent/semi-transparent film) as provided herein. The system can further comprise a deposition unit comprising a nozzle in fluid communication with at least one source of the at least one mixture (e.g., one source of one mixture, multiple sources of the same mixture, multiple sources of different mixtures, etc.). The deposition unit can be configured to deposit the film onto the at least one platform. The system can further comprise a building unit comprising a light source configured to provide a light sufficient for curing at least a portion of the film, to form at least a portion of the 3D object. The system can further comprise a controller (or a processor) operatively coupled to the at least one platform. The controller can further be operatively coupled to the deposition unit and the building unit. The controller can be configured to direct the at least one platform to move from the deposition unit to the building unit, or vice versa, along a plurality of different paths.

The plurality of different paths can comprise a plurality of non-overlapping paths. At least a portion of the plurality of non-overlapping paths may not intersect with each other. In some cases, the plurality of non-overlapping paths may be separated from one another, such that no single path comes in contact (e.g., physical contact) with another path. In some cases, the plurality of non-overlapping paths may be connected to each other at one or more ends of each path, but a region between two ends of a path may not overlap with another region between two ends of another path. In some cases, a first platform may be disposed at any point along a first path of the plurality of the non-overlapping paths, second platform may be disposed at any point along a second path of the plurality of the non-overlapping paths, and the non-overlapping paths may be designed/configured such that the first platform and the second platform may not intersect or bump into each other while moving along the first path and the second path, respectively.

The plurality of non-overlapping paths can comprise at least 1, 2, 3, 4, 5, 6, 7, 8, 9, 10, or more non-overlapping path(s). The plurality of non-overlapping paths can comprise at most 10, 9, 8, 7, 6, 5, 4, 3, 2, or 1 non-overlapping path(s). The plurality of non-overlapping paths may be disposed in a same plane. Such plan may be a horizontal plane (e.g., two or more paths disposed to the left and right of each other), a vertical plane (e.g., two or more paths stacked above and below each other), or any plane angled therebetween. Alternatively, the plurality of non-overlapping paths may be disposed in different planes. The different planes may be substantially parallel to each other. Alternatively, the different planes may not be parallel to each other, but not overlapping. The plurality of non-overlapping paths may be disposed parallel to each other. Alternatively, the plurality of non-overlapping paths may be angled with respect to each other, wherein the angle between at least two of the plurality of non-overlapping paths may be at least about 1, 2, 3, 4, 5, 10, 15, 20, 30, 40, 50, 60, 70, 80, 90 degree(s), or more. The angle between at least two of the plurality of non-overlapping paths may be at most about 90, 80, 70, 60, 50, 40, 30, 20, 15, 10, 5, 4, 3, 2, 1 degree(s), or less.

At least a portion of each path of the plurality of non-overlapping paths may be continuous. At least a portion of each path of the plurality of non-overlapping paths may be discontinuous. At least a portion of each path of the plurality of non-overlapping paths may be straight or linear. At least a portion of each path of the plurality of non-overlapping paths may be non-straight or non-linear (e.g., curved, wavy, angled, jagged, etc.).

In an example, two non-overlapping paths may be two straight paths that are next to each other (e.g., on the same horizontal plane) or stacked over each other. In another example, each of the two non-overlapping paths may be in a shape of a semi-circle, such that the two paths connect at the deposition unit and the building unit to form a circular track (e.g., a carousel).

A path of the plurality of non-overlapping paths may be defined by a motion of the at least one platform. In some cases, the at least one platform may be configured to move (e.g., via one or more actuators) along a pre-defined route, and such route may define the path. The route may not comprise a physical track for the at least one platform to move along. Alternatively or in addition to, a path of the plurality of non-overlapping paths may be defined by a physical track (or belt system) for the at least one platform to move along. The track may be stationary. Alternatively, the track may be movable or adjustable.

A path of the plurality of non-overlapping paths may be specifically assigned for movement of a single platform. Alternatively, the path may be used for movement of a plurality of platforms, e.g., at least 2, 3, 4, 5, 6, 7, 8, 9, 10, or more platforms. The plurality of platforms may be moving along the path at the same time (e.g., a first platform may be moving along the path while a second platform may be moving along the same path and behind the first platform). Alternatively, the plurality of platforms may move along the path sequentially (e.g., the second platform may begin moving along the path only after the first/previous platform substantially completes movement along the path).

The at least one platform may comprise a single platform. In some cases, the single platform can be configured to move (i) from the deposition unit to the building unit along a first path and (ii) from the building unit to the deposition unit along a second path that does not overlap with the first path. The single platform may be operatively coupled to one or more actuators configured to direct movement of the single platform between the plurality of paths (e.g., between the first path and the second path). The actuator(s) for moving the single platform between the plurality of paths may be the same actuator(s) that move the single platform along each path. Alternatively, the actuator(s) (e.g., vertical actuators) for moving the single platform between the plurality of paths and the actuator(s) (e.g., horizontal actuators) for moving the single platform along each path may be different actuators. The actuator(s) for moving the single platform between the plurality of paths may be configured to move along one or more paths of the plurality of paths. Alternatively, the actuator(s) for moving the single platform between the plurality of paths may not be configured to move along any of the plurality of paths. For example, one or more actuators may be disposed at the deposition unit to move the single platform from one path to another path, and additional one or more actuators may be disposed at the building unit to move the single platform from one path to another path.

The at least one platform may comprise a plurality of platforms. The plurality of platforms may comprise at least 2, 3, 4, 5, 6, 7, 8, 9, 10, or more platforms. The plurality of platforms may comprise at most 10, 9, 8, 7, 6, 5, 4, 3, or 2 platforms. The plurality of platforms may be configured to hold a film of the same mixture for printing. Alternatively, the plurality of platforms may be configured to hold a film of different mixtures (e.g., for multi-material printing). As such, when a first platform is at the building unit for printing a first layer of the 3D object, a second platform may receive or may already have received a different layer of the same or different mixture for printing a second layer of the 3D object. As soon as the first layer of the 3D object is formed at the building unit, the first platform may be replaced with the second platform to build the second layer of the 3D object, thereby reducing processing time to build at least a portion of the 3D object, as compared to building a 3D object with a single platform.

Each of the plurality of platforms may be configured to move between the deposition unit to the building unit. The plurality of platforms may be configured to move from the deposition unit to the building unit, or vice versa, along the plurality of different paths, as disclosed herein. In some cases, each platform of the plurality of platforms may move between the deposition unit and the building unit along its designated and specific path, and the designated/specific path may not overlap with the paths for other platforms for moving between deposition unit and the building unit. As such, a movement of a first platform between the deposition unit and the building unit may not interfere (e.g., overlap with, collide with, etc.) with a movement of a second platform (or other platforms) between the deposition unit and the building unit. In some cases, each platform of the plurality of platforms may move along different paths when moving between the deposition unit and the building unit. Each platform of the plurality of platforms may move (i) from the deposition unit to the building unit along a first path and (ii) from the building unit to the deposition unit along a second path that may not overlap with the first path.

Each platform of the plurality of platforms may be operatively coupled to one or more actuators configured to direct movement of the platform between the plurality of paths (e.g., between the first path and the second path). The plurality of platforms may be operatively coupled to one or more actuators configured to direct movement of the plurality of platforms between the plurality of paths (e.g., between the first path and the second path). The actuator(s) for moving the plurality of platforms between the plurality of paths may be the same actuator(s) that move the plurality of platforms along the plurality of paths, respectively. Alternatively, the actuator(s) (e.g., vertical actuators) for moving the plurality of platforms between the plurality of paths, and the actuator(s) (e.g., horizontal actuators) for moving the plurality of platforms along the plurality of paths may be different actuators. The actuator(s) for moving the plurality of platforms between the plurality of paths may be configured to move along one or more paths of the plurality of paths. Alternatively, the actuator(s) for moving the plurality of platforms between the plurality of paths may not be configured to move along any of the plurality of paths. For example, one or more actuators may be disposed at the deposition unit to move the plurality of platforms from one path to another path, and additional one or more actuators may be disposed at the building unit to move the plurality of platforms from one path to another path.

One or more actuators disclosed herein (e.g., for moving one or more platforms between two or more non-overlapping paths) may comprise at least 1, 2, 3, 4, 5, 6, 7, 8, 9, 10, or more actuator(s). The one or more actuators may comprise at most 10, 9, 8, 7, 6, 5, 4, 3, 2, or 1 actuator(s). Examples of the one or more actuators may comprise a stepper actuator, linear actuator, hydraulic actuator, pneumatic actuator, electric actuator, magnetic actuator, mechanical actuator (e.g., rack and pinion, chains, etc.), etc. Examples of the actuator provided herein may comprise a servomotor, brushed electric motor, brushless electric motor (e.g., stepper motor), torque motor, and shaft actuator (e.g. hollow shaft actuator).

The deposition unit and the building unit may comprise a working position for each platform to be in. For example, once a platform is transferred to the deposition unit along one of the non-overlapping paths, the platform may be configured to move towards the working position (e.g., to a mixture deposition position relative to a deposition unit as disclosed herein) via one or more actuators (e.g., one or more vertical actuators). In another example, once the platform is transferred to the building unit along one of the non-overlapping paths, the platform may be configured to move towards the working position (e.g., to a determined position relative to the light source and/or the build head as disclosed herein) via one or more actuators (e.g., one or more vertical actuators).

By utilizing the plurality of pathways for the plurality of platforms to move between the deposition unit and the building unit, the system as disclosed herein may reduce processing time (e.g., the time for building at least 2, 3, 4, 5, 6, 7, 8, 9, 10, or more layers of a 3D object, or the time for building the 3D object) by at least about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, or more.

In another aspect, the present disclosure provides a system for printing a 3D object. The system can comprise at least one platform configured to hold a film of a mixture. The system can further comprise a deposition unit comprising a nozzle in fluid communication with a source of the mixture. The deposition unit can be configured to deposit the film onto the at least one platform. The system can further comprise a building unit comprising a light source configured to provide a light sufficient for curing at least a portion of the film, to form at least a portion of the 3D object. The system can further comprise a sensor disposed along a path of the at least one platform from the deposition unit to the building unit, or vice versa. The sensor can be configured to (i) determine a profile of the film disposed on the at least one platform prior to the curing, or (ii) detect any excess mixture on the at least one platform subsequent to the curing. The system can further comprise a controller operatively coupled to the at least one platform. The controller can be configured to direct movement of the at least one platform along the path. In some cases, the system can comprise at least one belt, a surface of the at least one belt comprising the at least one platform.

The sensor of the system can comprise at least 1, 2, 3, 4, 5, 6, 7, 8, 9, 10, or more sensor(s). The sensor can comprise at most 10, 9, 8, 7, 6, 5, 4, 3, 2, or 1 sensor(s). At least one sensor may be disposed in a pathway for the at least platform to move between the deposition unit and the building unit. At least one sensor may be disposed in a plurality of pathways for the at least platform to move between the deposition unit and the building unit. In some cases, a platform may move (i) from the deposition unit and the building unit in a first pathway and (ii) from the building unit and the deposition unit in a second pathway that is different and non-overlapping with the first pathway. In such cases, different sensors may be operatively coupled to (e.g., coupled to) each of the first pathway and the second pathway. For example, different sensors may be disposed within one or more of the pathways. For example, the path may be from the deposition unit to the building unit, and the sensor may be configured to determine the profile of the film. In another example, the path may be from the building unit to the deposition unit, and the sensor may be configured to detect the excess mixture on the at least one platform.

The deposition unit can comprise one or more sensors disposed within the deposition unit. For example, the deposition unit can comprise an additional sensor configured to determine a different profile of the film prior to the curing. The building unit can comprise one or more sensors disposed within the building unit. For example, the building unit can comprise one or more sensors to detect a degree of compression exerted by a build head to the film of the mixture, or to detect a thickness of the film of the mixture that is compressed by the build head.

Non-examples of one or more sensors disclosed herein can include, but are not limited to, a camera, a laser displacement sensor, a laser scanner (e.g., a two-dimensional laser line scanner), a physical touch probe, a structured light projector and one or more cameras operatively coupled thereof, a thickness gauge (e.g., an ultrasonic thickness gauge), an X-ray source and a detector operatively coupled thereto, a spectral reflectance sensor, and a spectroscopic ellipsometry sensor.

Any of the sensor disclosed herein may be configured to detect a property or characteristic of (i) the film of the mixture or (ii) the belt comprising the platform is moving. In an example, the belt may move at a substantially constant speed while the sensor detects such property or characteristic. In another example, the belt may be configured to slow duce (e.g., decelerate) when close to the sensor, such that the sensor can detect the property or characteristic, as disclosed herein. During such sensing, the speed (e.g., rotational speed, winding speed, unwinding speed, etc.) of the belt may be reduced by at least about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, or more. Alternatively, the belt may be configured to stop (e.g., substantially stop), such that the sensor may detect the property or characteristic of (i) the film of the mixture of (ii) the belt comprising the platform.

In some examples, a sensor as disclosed herein may be configured to detect quality (e.g., thickness, defects, volume, etc.) of the film (or layer) of the mixture. The sensor may confirm that such quality of the film of the mixture is within a predetermined threshold (e.g., a tolerance range). In some examples, the thickness of the film of the mixture may have a tolerance ranging between about 10 nm to about 10 $\mu$m. The thickness of the film of the mixture may have a tolerance of at least about 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 $\mu$m, 2 $\mu$m, 3 $\mu$m, 4 $\mu$m, 5 $\mu$m, 6 $\mu$m, 7 $\mu$m, 8 $\mu$m, 9 $\mu$m, 10 $\mu$m, or more. The thickness of the film of the mixture may have a tolerance of at most about 10 $\mu$m, 9 $\mu$m, 8 $\mu$m, 7 $\mu$m, 6 $\mu$m, 5 $\mu$m, 4 $\mu$m, 3 $\mu$m, 2 $\mu$m, 1 $\mu$m, 900 nm, 800 nm, 700 nm, 600 nm, 500 nm, 400 nm, 300 nm, 200 nm, 100 nm, 90 nm, 80 nm, 70 nm, 60 nm, 50 nm, 40 nm, 30 nm, 20 nm, 10 nm, or less.

The at least one belt may comprise at least 1, 2, 3, 4, 5, 6, 7, 8, 9, 10, or more belt(s). The at least one belt may comprise at most 10, 9, 8, 7, 6, 5, 4, 3, 2, or 1 belt(s). Non-limiting examples of the at least one belt may include a continuous belt, a conveyor belt, a roll-to-roll belt (e.g., comprising a payout roll and a take-up roll), etc. The at least one belt may be operatively coupled to (e.g., operate with) at least 1, 2, 3, 4, 5, 6, 7, 8, 9, 10, or more pulley(s) (or drum(s)). The at least one bely may be operatively coupled to (e.g., operate with) at most 10, 9, 8, 7, 6, 5, 4, 3, 2, or 1 pulley(s) (or drum(s)). A pulley as disclosed herein may be a drive pulley (e.g., coupled to one or more actuators, such as rotational actuators). Alternatively, a pulley may be an idler pulley.

During printing of one or more 3D objects by the systems and methods disclosed herein, a belt may comprise one or more platforms, each platform for holding a film of a mixture. The belt may comprise at least 1, 2, 3, 4, 5, 6, 7, 8, 9, 10, or more platform(s). The belt may comprise at most 10, 9, 8, 7, 6, 5, 4, 3, 2, or 1 platform(s). A platform may be part of the belt (e.g., a transparent or semi-transparent portion of the belt). Alternatively, the platform may be a separate component that is disposed over at least a portion of the belt.

In some embodiments of any one of the systems disclosed herein, the system may be for printing a three-dimensional (3D) object. A platform for holding the mixture (e.g., a film of the mixture), as disclosed herein, may be a transparent substrate (or a semi-transparent substrate). The system may comprise (1) a recoating station configured to coat a feedstock film onto a transparent substrate, (2) a printing station configured to receive the feedstock film on the transparent substrate and to cure the feedstock into a desired structural layer, and (3) a transfer device (e.g., one or more transfer devices) configured to move two or more transparent substrates between the recoating station and the printing station, wherein the system, may be configured for both the recoating station and the printing station to operate at the same time (or substantially at the same time).

In some cases, the transparent substrates may be held in one or more frames, and the transfer device may be configured to move (e.g., move substantially simultaneously) (i) a first transparent substrate from the recoating station to the printing station along a first plane and (ii) a second transparent substrate from the printing station to the recoating station along a second plane, wherein the first plane and the second plane may be parallel and separated by a distance greater that a thickness of the one or more frames. In such cases, the first and second transparent substrates may be over and under each other.

In some cases, the transparent substrates may be held in one or more frames, wherein the one or more frames may be coplanar and may be attached to one another at a central point, and the transfer device may be configured to move (e.g., move substantially simultaneously) (i) a first transparent substrate from the recoating station to the printing station and (ii) a second transparent substrate from the printing station to the recoating station, by pivoting around the central point. In such cases, the first and second transparent substrates may be rotationally swapped during 3D printing.

In some cases, the system may further comprise one or more sensors. The one or more sensors may be part of the recoating station and/or the printing station. Alternatively, the one or more sensors may be disposed separate from the recoating station and the printing station. For example, the system may comprise one or more sensor stations comprising (i) a pre-print inspection station configured to receive a feedstock film on the transparent substrate from the recoating station and to inspect the feedstock film before sending the feedstock film on the transparent substrate onto the printing station, and (ii) a post-print inspection station configured to receive a waste film on the transparent substrate from the printing station and to inspect the waste film before sending the waste film on the transparent substrate onto the recoating station.

In some cases, the transparent substrates may be held in one or more frames, and the transfer device may be configured to move simultaneously (e.g., substantially simultaneously) (i) a first transparent substrate from the recoating station to the pre-print inspection station, (ii) a second transparent substrate from the pre-print inspection station to the printing station, (iii) a third transparent substrate from the printing station to the post print inspection station, and (iv) a fourth transparent substrate from the post print inspection station to the recoating station, wherein the first, second, third, and fourth transparent substrates maybe co-planar. In some examples, the transfer device may direct movement of (or may move) the first, second, third, and/or fourth transparent substrates around a continuous track. In some examples, the transfer device may direct movement of (or may move) the first, second, third, and fourth transparent substrates around a pivot point. In some examples, the transparent substrate may be a continuous belt, and the transfer device may be configured to advance the belt to move the transparent substrate from the recoating station to the printing station. In some examples, the transparent substrate may be a wound sheet between a payout roll and a take-up roll, and the transfer device may be configured to unwind the payout roll and wind the take up roll to move the transparent substrate from the recoating station to the printing station.

Figure 1C:
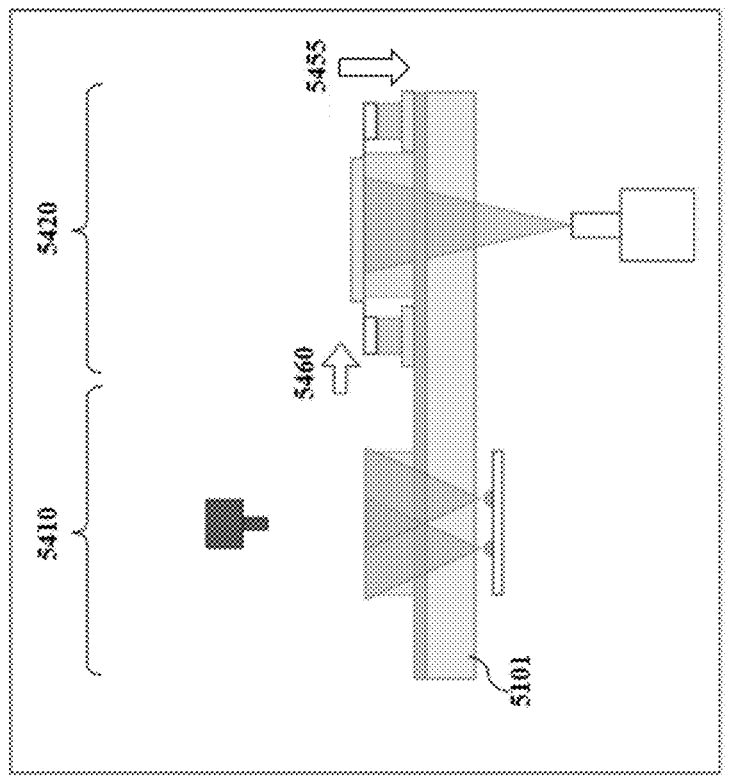
Figure 1B:
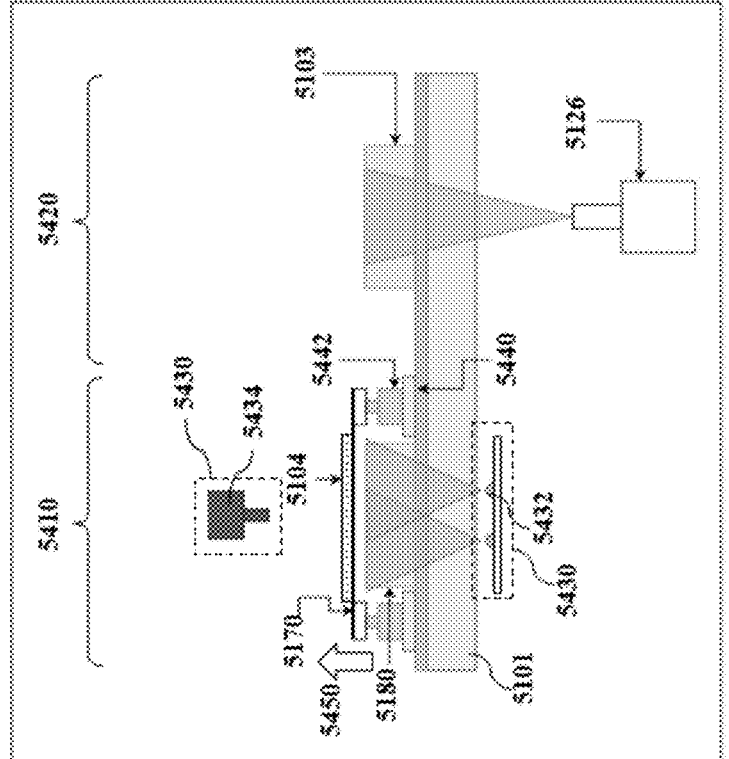

FIGS. 1A-1C show an example of a 3D printing system 5400 as disclosed herein. Referring to FIG. 1A, the 3D printing system 5400 comprises a mixture deposition zone 5410 (or a deposition unit, as used interchangeably herein) and a printing zone 5420 (or a building unit, as disclosed herein) that are (i) connected to a same base 5101 or (ii) coupled to the same base 5101. The system 5400 further comprises a deposition head 5105 configured to deposit a mixture 5104 to the film 5170 (or platform 5170, as used interchangeably herein) configured to hold a mixture. In this example, the deposition head is configured to deposit the mixture 5104 onto the film 5170. The deposition head 5105 comprises a nozzle 5107 that is in fluid communication with a source of the mixture 5104 and at least one wiper 5106 configured to (i) reduce or inhibit flow the mixture 5104 out of the deposition head 5105, (ii) flatten the mixture 5104 into a film or layer of the mixture 5104, and/or (iii) remove any excess of the 5104 from the film 5170. The system 5400 further comprises a mixture sensor 5430 (e.g., a camera, a densitometer, etc.) configured to detect one or more qualities of the mixture 5104 that is deposited onto the film 5170. The mixture sensor comprises a mixture sensor light source 5432 and a mixture sensor detector 5434. The mixture sensor light source 5432 is disposed beneath the film 5170, and the mixture sensor detector 5434 is disposed above the film 5170. Alternatively or in addition to, the mixture sensor light source 5432 and the mixture sensor detector 5434 may be disposed inversely or on the same side of the film 5170. Subsequent to depositing a layer of the mixture 5104 on the film 5170, the mixture sensor light source 5432 may emit a sensor light (e.g., infrared light) through at least the film 5170 and towards the layer of mixture 5104 on or adjacent to the film 5170, and the mixture sensor detector 5434 may capture or detect any of the infrared light that is transmitted through the layer of the mixture 5104. Measurements by the mixture sensor 5430 can help determine whether a quality of the layer of the mixture 5104 is sufficient to proceed with printing at least a portion of the 3D object.

The infrared light (e.g., for detecting qualities of a layer of the mixture) may comprise near-infrared (NIR) light (about 750 nm to about 1.4 μm), short-wavelength infrared (SWIR) light (about 1.4 μm to about 3 μm), mid-wavelength infrared (MWIR) light (about 3 μm to about 8 μm), long-wavelength infrared (LWIR) light (8 μm to about 15 μm), and/or far infrared light (about 15 μm to about 1 mm). An optical source of the infrared light (e.g., for the mixture sensor light source 5432) may comprise a LED device, a halogen lamp, a fluorescent light device, and a gas discharge lamp (e.g., a xenon arc lamp).

The film 5170 is coupled to a film transfer unit 5172. The film transfer unit 5172 is configured to move 5460 between the mixture deposition zone 5410 and the printing zone 5420. Alternatively, the film 5170 may be part of a roll of a film, and reeling of the film from the roll (e.g., roll-to-roll processing) may move the portion of the film 5170 comprising the layer of the mixture 5104 relative to the mixture deposition zone 5410 and the printing zone 5420.

The printing zone 5420 (e.g., the base 5101 of the printing zone 5420) comprises a print window 5103. Once the film transfer unit 5172 transfers the film 5170 to the printing zone 5420, the film 170 can be disposed onto the print window 103, e.g., via one or more actuators of the film transfer unit 5172 or via one or more actuators of the printing zone 5420 that can be operatively coupled to the film 5170.

The printing zone 5420 (e.g., the base 5101 of the printing zone 5420) further comprises a plurality of first coupling units 5150. The plurality of first coupling units 5150 may not be in contact with the mixture 5104 during 3D printing. The plurality of first coupling units 5150 may be operatively coupled to one or more actuators 5154 (e.g., one or more z-axis telescopic actuators) configured to adjust a height (or protrusion) of the plurality of first coupling units 5150 relative to the base 5101 (or relative to a surface of the film 5170 disposed adjacent to the print window 5103). The one or more actuators 5154 may comprise one or more fasteners 5156 (e.g., one or more shaft clamps) configured to fasten, hold on to, or stabilize a movement of the plurality of first coupling units 5150 relative to the actuators 5154. The printing zone 5420 further comprises a build head 5110 configured to move relative to the base 5101. The build head 5110 is movable by an actuator 5112 (e.g., a linear actuator) operatively coupled to the build head 5110. Alternatively or in addition to, the base 5101 may comprise one or more actuators to move the base 5101 relative to the build head 5110. The build head 5110 comprises a surface 5111 configured to hold at least a portion of a 3D object 5108a (e.g., a previously printed portion of the 3D object) or a different object onto which the at least the portion of the 3D object is to be printed. The build head 5110 comprises a plurality of second coupling units 5160. One of the plurality of second coupling units 5160 of the build head 5110 is configured to couple to one of the plurality of the first coupling units 5150 of the base 5101 to provide an alignment of the film 5170 relative to the surface 5111 of the build head 5110 during 3D printing.

Referring to FIG. 1B, the film transfer unit 5172 comprises one or more actuators. The one or more actuators can comprise a horizontal actuator 5440 that directs a horizontal movement (e.g., linear and/or rotational movement) of the film 5170 relative to the base 5101. The horizontal actuator 5440 may comprise or be operatively coupled to one or more axis rails to allow for movement of the film transfer unit 5172 between the mixture deposition zone 5410 and the printing zone 5420. For example, the horizontal actuator 5440 can be configured to direct a relative movement of the film 5170 and the film transfer unit 5172 between deposition area 5180 of the mixture deposition zone 5410 to the print window 5103 of the printing zone 5420. The deposition area 5180 of the mixture deposition zone 5410 may be part of the base 5101 or an additional layer or slab (e.g., a transparent or semi-transparent material) disposed on or adjacent to the base 5101. Alternatively or in addition to, the one or more actuators of the film transfer unit 5172 can comprise a vertical actuator 5442 (e.g., pneumatic actuators) that directs a vertical movement 5450 (e.g., upwards or downwards) of the film 5170 relative to the deposition area 5180 of the mixture deposition zone 5410. A direction of movement of the horizontal actuator 5440 and a direction of movement of the vertical actuator 5442 may or may not be perpendicular.

A portion of the base 5101 disposed beneath at least a portion of the deposition area 180 may be transparent or semi-transparent, such that a light (e.g., a sensor light) may be directed through the portion of the base 5101, through the deposition area 5180, through the film 5170, and towards the mixture 5104. As an alternative, a portion of the base 5101 disposed beneath at least a portion of the deposition area 5180 may be hollow, such that a light (e.g., a sensor light) may be directed through the hollow portion of the base 5101, through the deposition area 5180, through the film 5170, and towards the mixture 5104.

Referring to FIG. 1B, once the mixture 5104 (e.g., the film or layer of the mixture 5104) is deposited on the film 5170, and one or more qualities of the deposited mixture 5104 is confirmed by the sensor 5530, the vertical actuator 5442 of the film transfer unit 5172 can direct a movement of the film 5170 holding the deposited mixture 5104 in a direction 5450 (e.g., upwards) away from the deposition area 5180. Following, as shown in FIG. 1C, the horizontal actuator 5440 of the film transfer unit 5172 can direct a movement of the film 5170 in a direction 5460 from the deposition area 5180 of the mixture deposition zone 5410 towards the print window 5103 of the printing zone 5420. Following, the vertical actuator 5442 of the film transfer unit 5172 directs a movement of the film 5170 holding the deposited mixture 5104 in a direction 5455 (e.g., downwards) towards the print window 5103. Such movement of the film 5170 relative to the print window 5103 can help ensure that the film 5170 is contacting the print window 103 in a manner that keeps the film 5170 flat (e.g., without or with minimal wrinkles, without or with minimal disruption, such as aggregation of the deposited mixture 5104 or aggregation of one or more particles within the deposited mixture 5104, etc.). Subsequently, the optical source 5126 directs one or more lights towards the mixture 5104 (e.g., through the base 5101, through the print window 5103, through the film 5170, and towards the mixture 5104) for printing at least a portion of the 3D object. As an alternative, the optical source 5126 may direct the one or more lights at least through the print window 5103, through the film 5170, and towards the mixture 5104 for printing the at least the portion of the 3D object. FIGS. 1B and 1C schematically illustrate the vertical actuator(s) 5442 to be movable across the platform 5102 between the deposition zone 5410 and the printing zone 5420. However, alternatively or in addition to, each of the deposition zone 5410 and the printing zone 5420 may comprise one or more separate vertical actuators configured to (i) operatively coupled to the film 5170 and/or the film transfer unit 5172 and (ii) direct vertical movement(s) (e.g., up or down) of the film 5170 and/or the film transfer unit 5172 relative to the base 5101. Such separate vertical actuators may not be configured to move between the deposition zone 5410 and the printing zone 5420.

FIG. 1D shows an example of a 3D printing system 100 (e.g., one or more components of a serial 3D printing system). The system 100 can comprise one or more components and/or functions of the 3D printing system 5400 as illustrated in FIGS. 1A-1C. For example, the system 100 of FIG. 1D may be a modification of the system 5400 of FIGS. 1A-1C. Referring to FIG. 1D, the system 100 comprises a recoating station 110 (or a coating station or a deposition unit, as used interchangeably herein) and a printing station 150 (or a building unit, as used interchangeably herein). In the recoating station 110, a film transfer unit (FTU) 112 is configured to move back and forth between the recoating station 110 and the printing station 150. The FTU 112 includes a rigid or semi rigid frame that supports a transparent substrate (or a platform that may be transparent or semi-transparent, as used interchangeably herein), such as a fluorinated ethylene propylene (FEP) film. The FTU 112 is held in place by a vacuum chuck 113. A feedstock 114 (or a mixture as used interchangeable herein) that contains a photoactive resin in a viscous liquid is dispensed onto the FTU 112 (e.g., the FEP surface) from a syringe or other dispensing device(s). One or more wipers 118 move across the FEP to form a bead of feedstock 114 (or a pool or a collection of mixture, such as any excess mixture, as used interchangeably herein). A sensor can be configured to detect a quality or property of the FEP or the mixture. For examples, a camera 120 takes an image of wiped feedstock 114 on the FTU 112. A back light 122 is activated to provide illumination for the camera image. One or more additional wipers (e.g., doctor blade 124) move across the feedstock 114 on the FTU 112 to create a substantially uniform feedstock film 130 (e.g., having a substantially uniform thickness). The camera 120 takes an image of the feedstock film 130 using the back light 122. The FTU 112 the feedstock film 130 to the printing station 150.

Referring to FIG. 1D, one the feedstock film 130 is prepared, the FTU 112 moves the transparent substrate (FTU) 112 to from the recoating station 110 to the printing station 150. At the printing station 150, the FTU 112 is positioned onto a print window 152 that is transparent or semi-transparent. A build plate 154 is lowered onto the feedstock film 130 (e.g., via one or more vertical actuators), to compress the feedstock film 130 to a desired printing layer thickness. The printed layer can be inspected with a camera 160 either before or as the build plate 154 is lowered onto the feedstock film 130. A digital light processing (DLP) projector 156, directs patterned light through the print window 152 onto the feedstock film 130 to cure the photoactive resin therein and form a printed layer (e.g., at least a portion of a 3D object). The build plate 154 moves away from the feedstock film 130. Then the FTU 112 is returned to the recoating station 110, where excess or remnants of the feedstock film 130 (e.g., waste film) are incorporated into a new feedstock film that is applied or prepared onto the FTU 112.

FIG. 2 illustrates an example process 200 of the 3D printing system illustrated in FIG. 1D. FIG. 2 illustrates a plurality of processes (e.g., a serial process) from recoating operations, film transfer operations, and printing operations. In the coating or recoating operations, the feedstock (or mixture) is dispensed onto a transparent substrate that is held in a frame of a film transfer unit (FTU) (process 1). One or more first wipers move across the substrate to form a bead or pool of the feedstock (process 2). A sensor inspects whether the substrate is clean after the first wiper(s) remove any access feedstock during formation of the bead/pool (process 3). One or more second wipers (e.g., coater, such as a doctor blade) moves across the substrate and flattens the bead/pool into a uniform film (process 4). The sensor (or a different sensor) inspects the film of the feedstock for presence of any defect (process 5). In the film transfer operation, the FTU moves the substrate comprising the film of the feedstock to the printing station (process 6). In the printing operations, a build plate (or build head as used interchangeably herein) moves down and presses at least a portion of the film of feedstock into substantially a desired layer thickness (process 7). The projector directs light and exposes at least a portion of the film of feedstock to the light, to cure at least the portion of the film of feedstock to a layer of a 3D object, which layer is cured onto the build plate of a previously printed layer of the 3D object disposed on the build head (process 8). The build plate then moves up (process 9). Subsequently, the FTU moves the substrate comprising any excess feedstock back to the coating/recoating station (process 10). The processes 10-10 may be repeated for the number of layers of the 3D object that needs to be printed.

In some cases, a Layer Cycle Time (LCT) is the sum time required or spent in all of the plurality of steps (e.g., the steps of 1-10 as illustrated in FIG. 2). For example, film transfer operations account for only a few percent of the LCT, while recoating operations and printing operations can take a longer period of time than the film transfer operations. In some cases, the recoating operations and the printing operations can take similar amounts of time. Recoating operations are idle while printing operations are going on, and vice versa. Thus, the present disclosure provides systems or methods for reducing the amount of time the stations are idle and thus reducing the LCT, to maximize throughput and reduce the cost per part.

Figure 3:
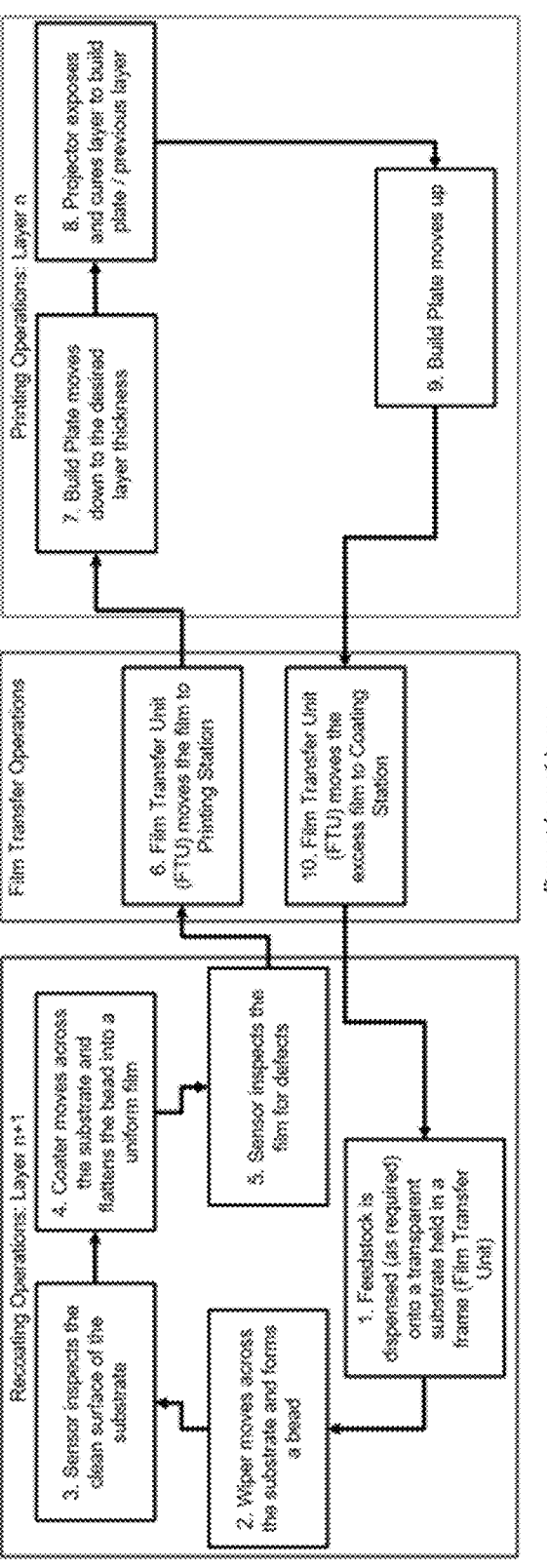
FIG. 3 shows a flow chart of an example method for a parallel 3D printing system.

FIG. 3 illustrates a different example process 300 of the 3D printing system illustrated in FIG. 1D. FIG. 3 illustrates a plurality of processes (e.g., a parallel process) of printing a 3D object, the plurality of processes comprising coating/recoating operations, film transfer operations, and printing operations as disclosed in FIG. 2. Referring to FIG. 3, as a parallel 3D printing process, each process (e.g., any of the processes 1-10) may proceed to either its subsequent step (e.g., from process 5 to process 6) or to another non-subsequent step (e.g., from process 5 to process 1, in case for re-coating the film of the feedstock without printing).

Referring to FIG. 3, in some cases, the LCT can be reduced by making the process parallel, as shown in FIG. 3, in which the film transfer operation can accommodate at least two FTUs at the same time. While layer "n" is being printed (e.g., on a first substrate), layer n+1 is being recoated (e.g., on a second substrate), eliminating much of the idle time for the stations. Thus, the LCT may be the sum of the film transfer operations and the longer of (i) the recoating operation and (ii) the printing operation, and the overall LCT can be reduced (e.g., by a factor of 2) as compared to a control (e.g., a process with only a single substrate moving between the deposition zone and the printing zone).

Figure 4:
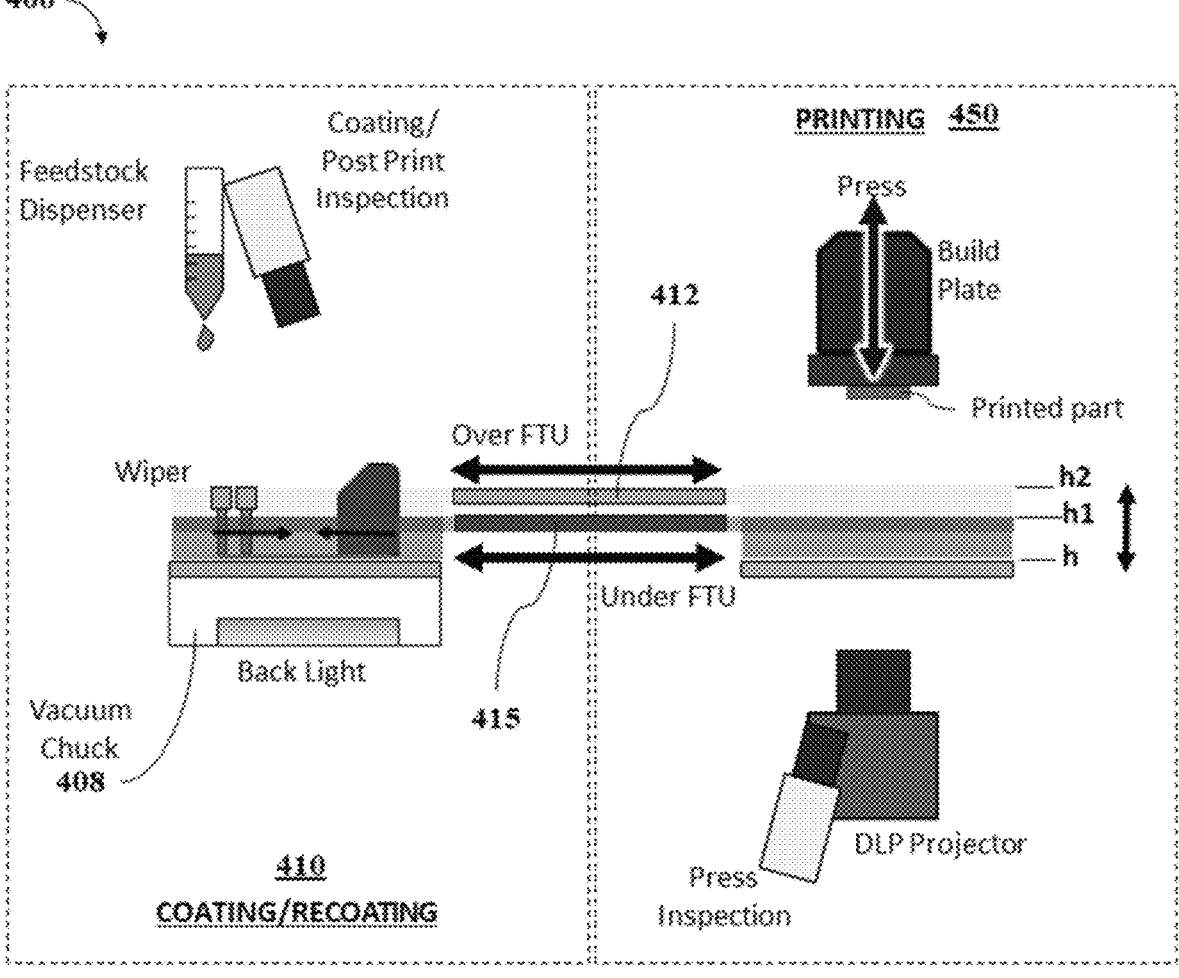
FIG. 4 schematically illustrates a side-view of a 3D printing system comprising two platforms disposed in an under/over configuration.

FIG. 4 is a schematic illustration of a parallel 3D printing system comprising two platforms configured to move between the deposition zone (coating/recoating zone) and the printing zone. The system 400 of FIG. 4 can comprise one or more components of the system 100 of FIG. 1D. For example, the system 400 may be a modification of the system 100. Referring to FIG. 4, the two platforms may be disposed relative to each other in a under/over configuration (e.g., a first plate is moving over a second plate, while the second plate is moving under the first plate). The system 400 comprises a recoating station 410 and a printing station 450, e.g., similar to those described in FIG. 1D. The system 400 comprises two film transfer units: the over FTU 412 and the under FTU 415. Each FTU is mounted to an independent vertical motion system (e.g., comprising one or more actuators, such as vertical actuators) that can move each of the FTUs 412, 415 up and down (e.g., from height h to height h1, from height h to height h2, from height h1 to height h2, or vice versa). The vertical motion system is then mounted to an independent horizontal motion system, such that the vertical motion system can be moved. The over FTU 412 moves horizontally at a height that provides enough clearance to avoid collision with the under FTU 415; the under FTU 415 moves horizontally at a height below the over FTU 412. The horizontal movement is performed by a belt driven or linear actuator driven movement, and the two FTUs 412 and 415 move in opposite horizontal directions simultaneously as they swap stations between the deposition zone and the printing zone. Each of the FTUs 412 and 415 can move independently both vertically and horizontally. Alternatively, the FTUs 412 and 415 may be configured to move vertically and horizontally in unison. For moving between the deposition zone and the printing zone, each FTU 412 or 415 may have a fixed pathway. The FTU 412 may have a first pathway for moving between the deposition zone and the printing zone, and the FTU 415 may have a second and different pathway for moving between the deposition zone and the printing zone.

Referring to FIG. 4, in some cases, the under FTU 415 may be in the recoating station 410 and may be positioned at working height h on the vacuum chuck 408. A waste film may be wiped and recoated with additional fresh feedstock to form a new feedstock film on the under FTU 415. At the same time, the over FTU 412 may be in the printing station 450 and may be positioned at working height h on the print window. A new printed layer may be being formed onto the 3D structure being printed. After the recoating operation has completed, the under FTU 415 may be lifted from working height h up to height h1 by a recoating station vertical actuator. After the printing operation has completed, the over FTU 412 may be lifted from working height h up to height h2 by a printing station vertical actuator. The under FTU 415 may be moved at height h1 from the recoating station 410 to the printing station 450 by a first transfer actuator and lowered into place by the printing station vertical actuator to the working height h. At substantially the same time, the over FTU 412 may be moved at height h2 from the printing station 450 by a second transfer actuator to the recoating station 410 and lowered into place by the recoating station vertical actuator to the working height h.

Referring to FIG. 4, the distance between h and h1 and the distance between h1 and h2 may be about the same, wherein such distance is sufficient to prevent collisions between the FTUs. Alternatively, the distance between h and h2 and the distance between h1 and h2 may be different. For example, the distance between h and h2 may be greater than the distance between h1 and h2. In another example, the distance between h and h2 may be less than the distance between h1 and h2. In some cases, it may be important that such distance is sufficient such that the FTUs 412 and 415 can move (e.g., smoothly) without making a contact with one another or with the surfaces at the working heights in the recoating station 410 or the printing station 450. For example, if each of the FTUs 412 and 415 (e.g., each comprising a film of feedstock) has a thickness of 20 millimeters (mm), h1 can be 25 mm above h, and h2 can be 25 mm above h1. Such heights may provide a 5 mm gap (e.g., a safety gap) to avoid collision during horizontal movement. If the FTUs cannot be positioned accurately, the gap between the different heights can be increased to avoid collision.

Figure 5:
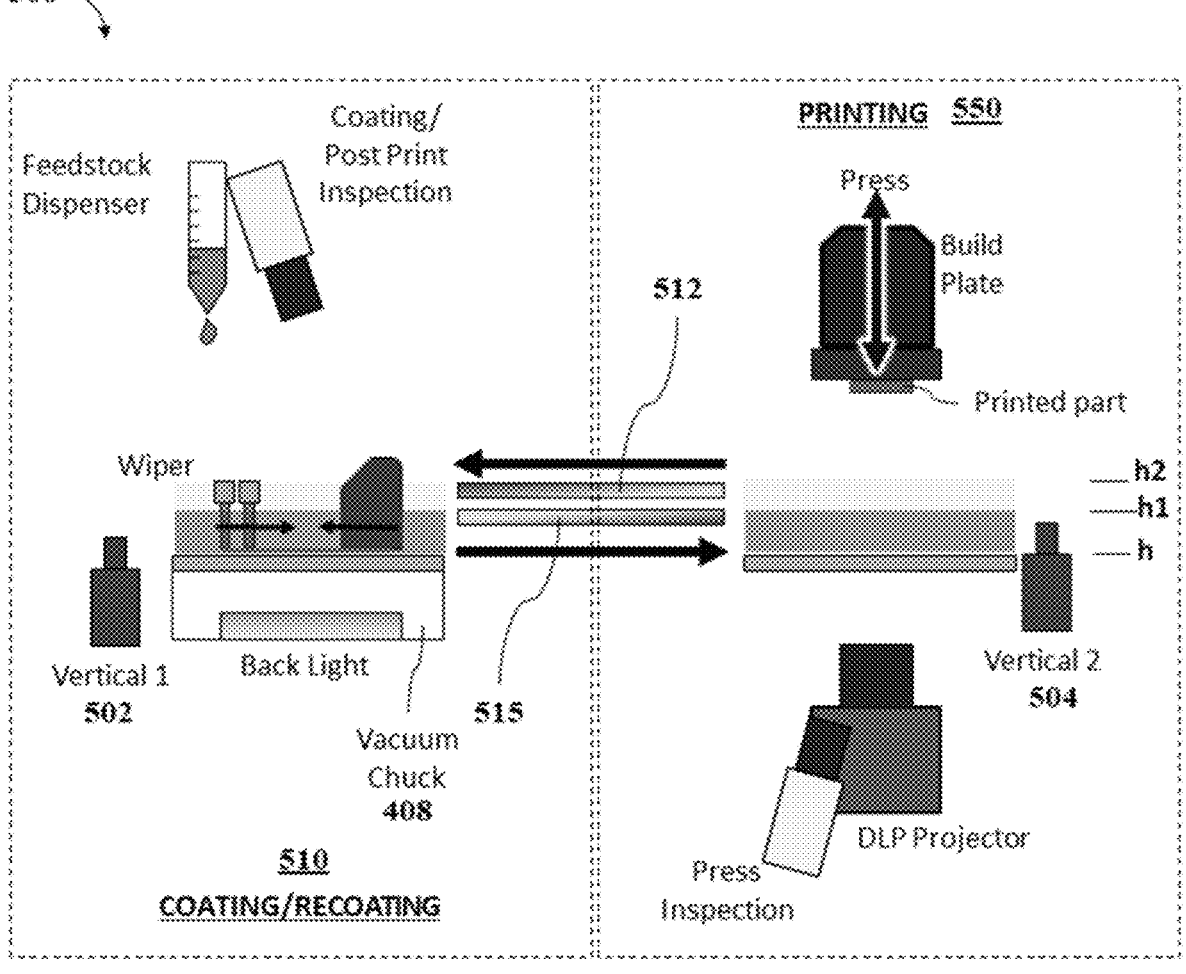
FIG. 5 schematically illustrates a side-view of a 3D printing system comprising two platforms disposed in a different under/over configuration.

FIG. 5 is a schematic illustration of a parallel 3D printing system comprising two platforms configured to move between the deposition zone (coating/recoating zone) and the printing zone. The system 500 of FIG. 5 can comprise one or more components of the system 100 of FIG. 1D. For example, the system 500 may be a modification of the system 100. Alternatively or in addition to, the system 500 may be a modification of the system 400 of FIG. 4. Referring to FIG. 5, the system 500 comprises two pathways for the two substrates to move between the deposition zone 510 and the printing zone 550. Here, the system 500 comprises a first pathway 515 (e.g., a dedicated height at h1) for any of the two substrates to move from the deposition zone 510 to the printing zone 550. The system 500 also comprises a second and different pathway 512 (e.g., a dedicated height at h2) that (i) does not overlap with the pathway 512 and (ii) is for any of the two substrates to move from the printing zone 550 to the deposition zone 510. As disclosed elsewhere herein, the system 500 can comprise vertical actuators to adjust a vertical position of the substrates. (e.g., to move each of the substrates to pathway 515 or 512). Here, the deposition zone 510 comprises one or more vertical actuators 502, and the printing zone comprises one or more separate vertical actuators 504. The vertical actuators 502 and 504 may not be configured to move horizontally, and may be configured to remain at their respective stations in the recoating station 510 or the printing station 550. The two FTUs alternate whether they are in the over or under configuration depending on their station location. For example, the FTU that moves from the recoating station 510 to the printing station 550 is the under FTU (e.g., along the pathway 515), and the FTU that moves from the printing station 550 to the recoating station 510 is the over FTU (e.g., along the pathway 512).

Referring to FIG. 5, two sets of vertical FTU actuators 502, 504 are operatively coupled to the recoating station 510 and the printing station 550, respectively, and do not move in the horizontal plane. The system 500 can comprise additional horizontal actuators (e.g., transfer actuators 1 and 2) that are in planes h1 and h2 respectively. FTU 1 starts in the recoating station 510 and FTU 2 in the printing station 550. After the recoating and printing operations have completed FTU 1 is moved by the vertical actuator 502 from the coating plane h to the transfer plane h1 (e.g., for pathway 515) and connects via a latch mechanism to the horizontal transfer actuator 1 that moves the FTU 1 from the recoating station 510 to the printing station 550 along the pathway 515. FTU 2 is moved by the vertical actuator 504 from the printing plane h into the transfer plane h2 (e.g., for pathway 512) and connects via a latch mechanism to the horizontal transfer actuator 2 that moves FTU 2 from the printing station 550 to the recoating station 510 along the pathway 512. Once the FTU 1 is at the printing station, the vertical actuator 504 moves the FTU 1 from the transfer plane h1 to the printing plane h, for the next layer of the 3D object to be printed. Once the FTU 2 is at the recoating station, the vertical actuator 502 moves the FTU 2 from the transfer plane h2 to the recoating plane h, to prepare the next film of mixture to be used for printing a subsequent layer of the 3D object.

Referring to FIG. 4 and FIG. 5, or any modified embodiments thereof, a distance between two non-overlapping pathways (e.g., a vertical distance between h1 and h2 as illustrated in FIG. 4 and FIG.) may be at least about 1 micrometer (μm), 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 200 μm, 300 μm, 400 μm, 500 μm, 1 millimeter (mm), 2 mm, 3 mm, 4 mm, 5 mm, 6 mm, 7 mm, 8 mm, 9 mm, 10 mm, 20 mm, 30 mm, or greater. The distance between the two non-overlapping pathways (e.g., the vertical distance between h1 and h2 as illustrated in FIG. 4 and FIG.) may be at most about 30 mm, 20 mm, 10 mm, 9 mm, 8 mm, 7 mm, 6 mm, 5 mm, 4 mm, 3 mm, 2 mm, 1 mm, 500 μm, 400 μm, 300 μm, 200 μm, 100 μm, 90 μm, 80

μm, 70 μm, 60 μm, 50 μm, 40 μm, 30 μm, 20 μm, 10 μm, 9 μm, 8 μm, 7 μm, 6 μm, 5 μm, 4 μm, 3 μm, 2 μm, 1 μm, or less.

The distance between the two non-overlapping pathways (e.g., the vertical distance between h1 and h2 as illustrated in FIG. 4 and FIG.) may correlate to at least a thickness of a layer (e.g., a subsequent) of the 3D object to be printed. The distance may correlate to at least a thickness of at least 1, 2, 3, 4, 5, 6, 7, 8, 9, 10, or more layers of the 3D object to be printed. The distance may correlate to at least a thickness of at most 10, 9, 8, 7, 6, 5, 4, 3, 2, or 1 layer(s) of the 3D object to be printed. The distance may correlate to a thickness of at least one photoinitiation layer and at least one photoinhibition layer of the 3D printing process.

Figure 6A:
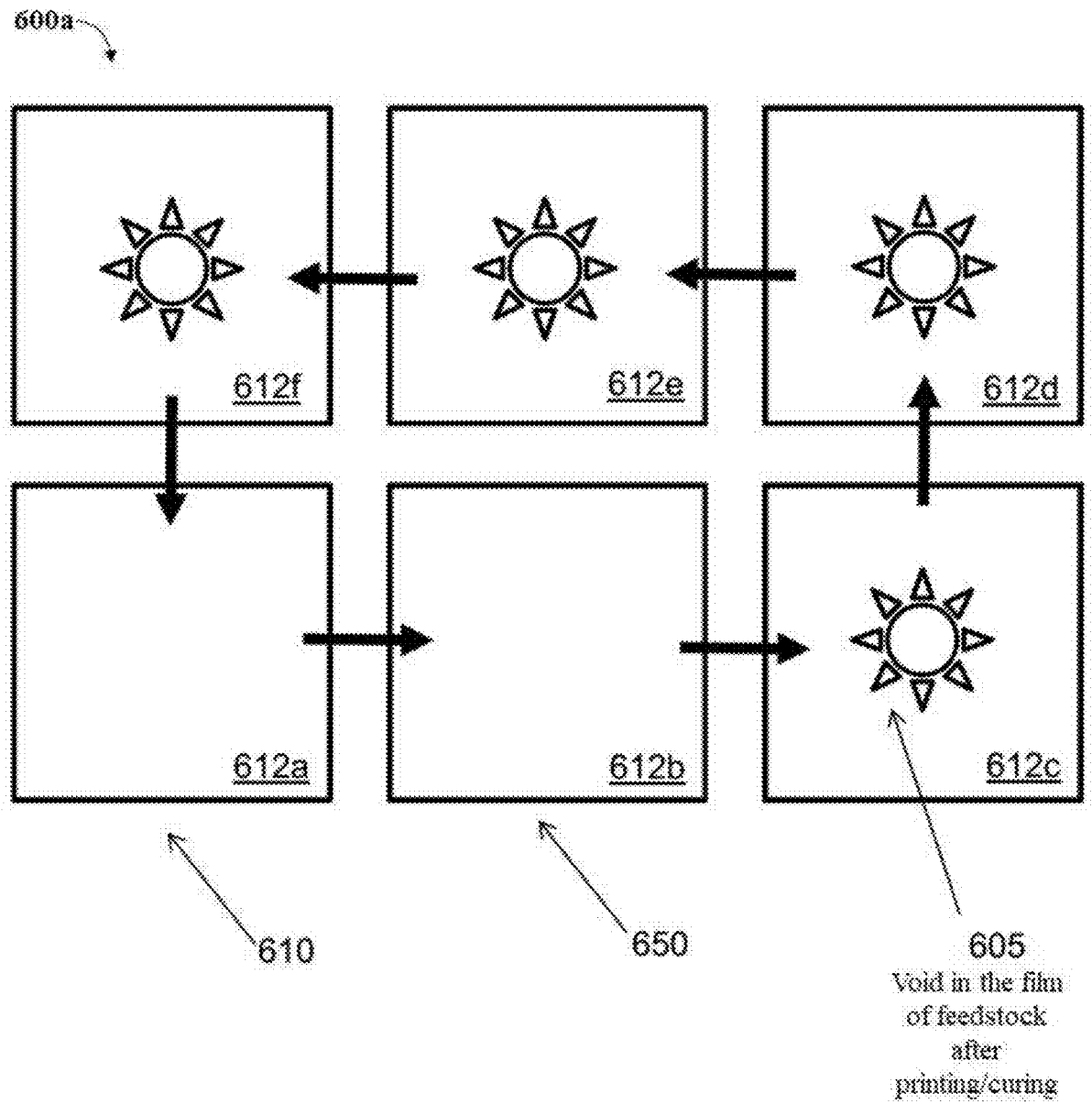
FIGS. 6A and 6B schematically illustrate top-views of different 3D printing systems comprising a racetrack configuration.
Figure 6B:
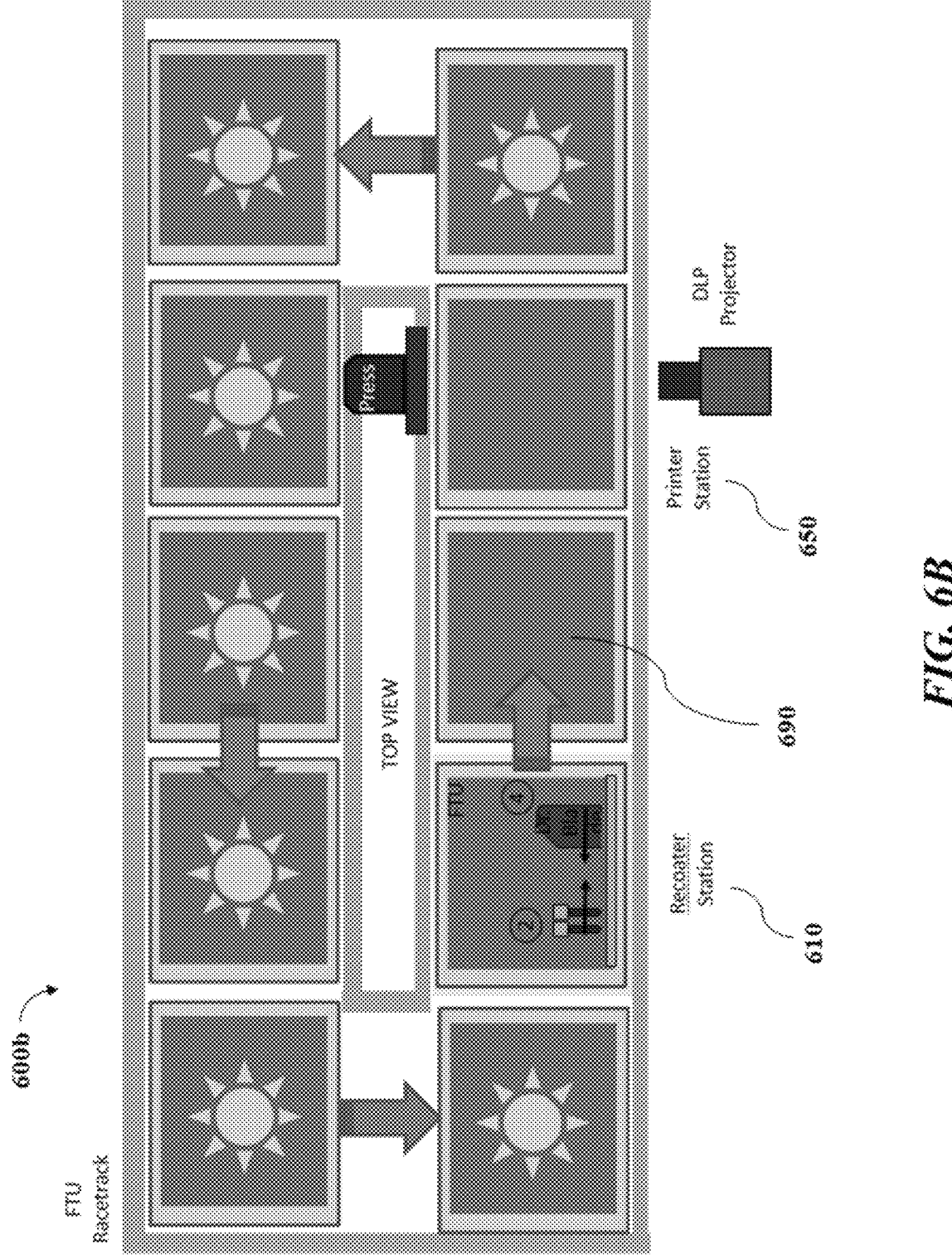

FIGS. 6A and 6B schematically illustrate top-views of different 3D printing systems comprising a racetrack configuration. The system 600a of FIG. 6A can comprise one or more components of the system 100 of FIG. 1D. For example, the system 600a may be a modification of the system 100. The system 600a comprises a racetrack comprising six positions, and each position holds an FTU identified as 612[x] (e.g., 612a, 612b, 612c, 612d, 612e, 612f). In alternative examples, any number of positions can used. For example, the system 600a can comprise at least 2, 3, 4, 5, 6, 7, 8, 9, 10, or more FTUs. The system 600a can comprise at most 10, 9, 8, 7, 6, 5, 4, 3, or 2 FTUs. Referring to FIG. 6A, the FTU 612a is at a recoating station 610 where it undergoes the recoating steps described in FIG. 1D. The FTU 612b is at a printing station 650 where it undergoes the printing steps described in FIG. 1D. Each of the FTUs 612c, 612d, 612e, and 612f has already left the printing station 650 and can contain waste or excess feedstock (e.g., remainder of a film from which a sub-shaped pattern 605 has been cured removed during printing). Each individual FTU moves along the racetrack (or conveyor) as shown by the arrows. As such, it may be possible that there is always (or substantially always) an FTU with a feedstock film ready at the recoating station 610 to be transferred to the printing station 650 as soon as the printing station 650 is ready to receive a recoated FTU for printing a subsequent layer. The conveyor moves and each FTU advances in position so that the FTU 612b with the waste film leaves the printing station 650, the FTU 612a with a fresh feedstock film leaves the recoating station 610 and moves into the printing station 650, and an older waste film 612f moves into position at the recoating station 610 to undergo the recoating process.

Referring to FIG. 6B, in some cases, the system 600b can be a modification of the system 600a of FIG. 6A. Referring to FIG. 6B, the system 600b can comprise additional stations along the conveyer. For example, inspection of an FTU with a fresh feedstock film could be done at an inspection station 690 between the recoating station 610 and the printing station 650. For example, if the feedstock film fails the inspection at the inspection station 690, that information can be sent to the conveyor controller so that the conveyer moves the failed film past the printing station 650 without stopping (or moves the failed film back from the printing station 650 to the recoating station 610 in a backwards direction).

Figure 7:
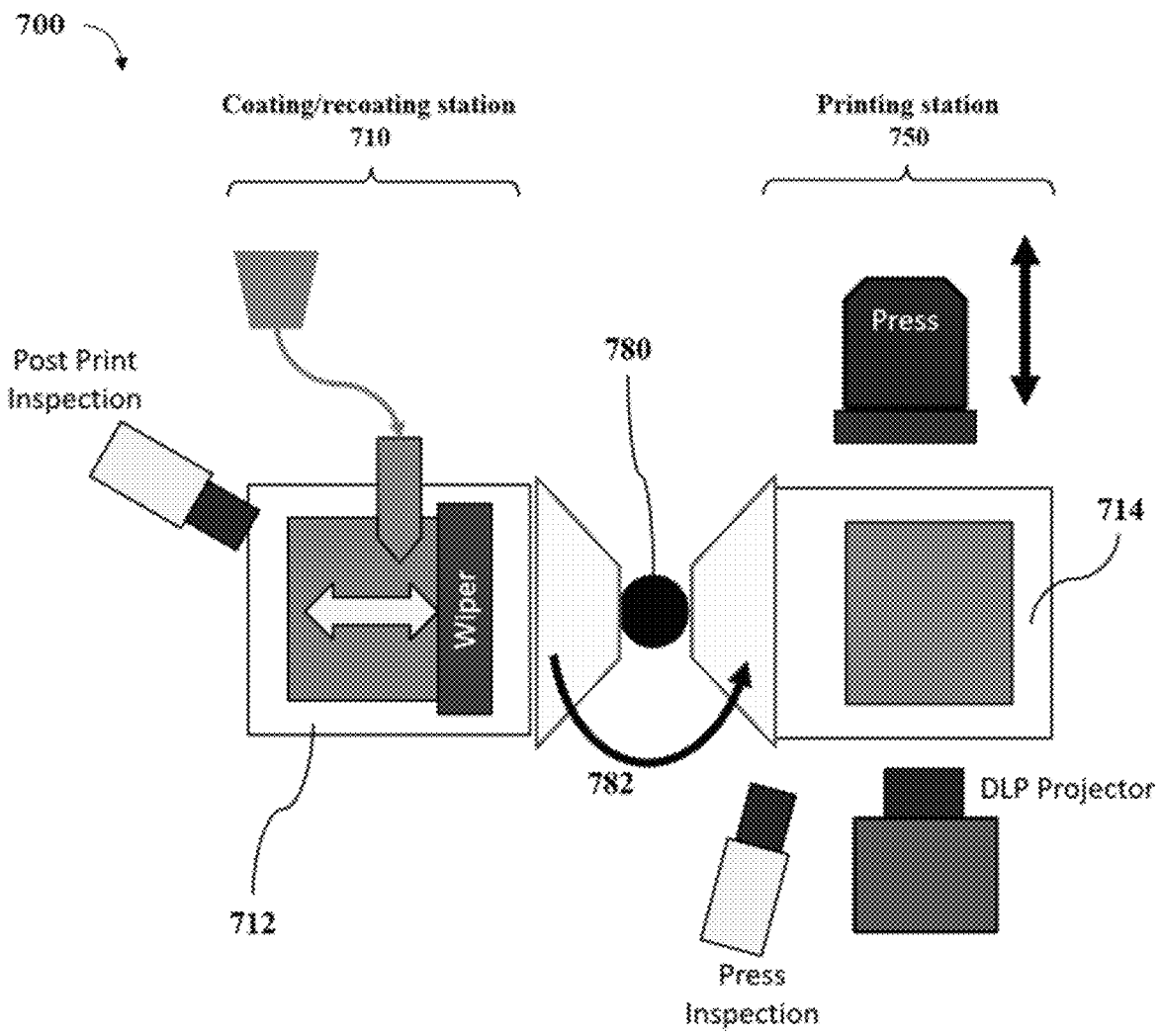
FIG. 7 schematically illustrates a 3D printing system comprising a rotational swap configuration for a plurality of substrates for holding a film of a mixture.

FIG. 7 schematically illustrates a top-view of a 3D printing system 700 comprising a rotational swap configuration for a plurality of substrates for holding a film of a mixture. The system 700 of FIG. 7 can comprise one or more components of the system 100 of FIG. 1D. For example, the system 700 may be a modification of the system 100, such that the substrates are moving between the deposition zone and the printing via a rotational movement (e.g., rotational swap) mechanism, instead of a lateral movement mechanism. The system 700 comprises two film transfer units (FTU 712 and FTU 714) that are operatively coupled together via a rotational mechanism 780 (e.g., a rotational actuator 780 that can pivot in the plane of the arrow 782 around a center point of the actuator 780). While the FTU 712 is in a recoating station 710, the FTU 714 is in a printing station 750. The FTU 712 undergoes recoating operations (e.g., using a deposition comprising one or more wipers, as provided in the present disclosure), while the FTU 714 undergoes printing operations (e.g., using a light source, as provided in the present disclosure). When the recoating and printing operations are complete, the rotary actuator 780 rotates to move the FTU 712 into the printing station 750 and move the FTU 714 into the recoating station 710. In some cases, the rotary actuator 780 may move only counterclockwise (e.g., as illustrated in FIG. 7), such that the FTU 712 comprising a substrate moves (i) from the deposition station 710 to the printing station 750 in a first pathway (e.g., a pathway disposed to the bottom of the actuator 780 as shown in FIG. 7), and (ii) from the printing station 750 to the deposition station 710 in a second pathway that does not overlap with the first pathway (e.g., a pathway disposed to the top of the actuator 780 as shown in FIG. 7). Alternatively, the rotary actuator 780 may move only clockwise. Yet in another alternative, the rotary actuator 780 may be configured to move both clockwise and counterclockwise, such that (i) the FTU 712 moves between the printing station 750 to the deposition station 710 in the first pathway and (ii) the FTU 714 moves between the printing station 750 to the deposition station 710 in the second pathway, as disclosed in the present disclosure. The first pathway and the second pathway may be in the same plane. The system 700 may further comprise one or more sensors for pre-print inspection, post-print inspection, build head print inspection, etc., as disclosed throughout the present disclosure.

Referring to FIG. 7, in some cases, the rotary actuator 780 may be configured to or coupled to a vertical actuator to adjust a height of the FTUs 712 and 714 relative to the printing station 750 and the deposition station 710. Alternatively, the rotary actuator 780 may not be configured to or may not be coupled to a vertical actuator.

Referring to FIG. 7 or any modified system or method of use thereof, a degree of separation between the printing station 750 and the deposition station 710 may be at least about 5 degrees, 10 degrees, 20 degrees, 30 degrees, 40 degrees, 50 degrees, 60 degrees, 70 degrees, 80 degrees, 90 degrees, 100 degrees, 110 degrees, 120 degrees, 150 degrees, 170 degrees, 175 degrees, or more. The degree of separation between the printing station 750 and the deposition station 710 may be at most about 180 degrees, 175 degrees, 170 degrees, 150 degrees, 120 degrees, 110 degrees, 100 degrees, 90 degrees, 80 degrees, 70 degrees, 60 degrees, 50 degrees, 40 degrees, 30 degrees, 20 degrees, 10 degrees, 5 degrees, or less.

Figure 8A:
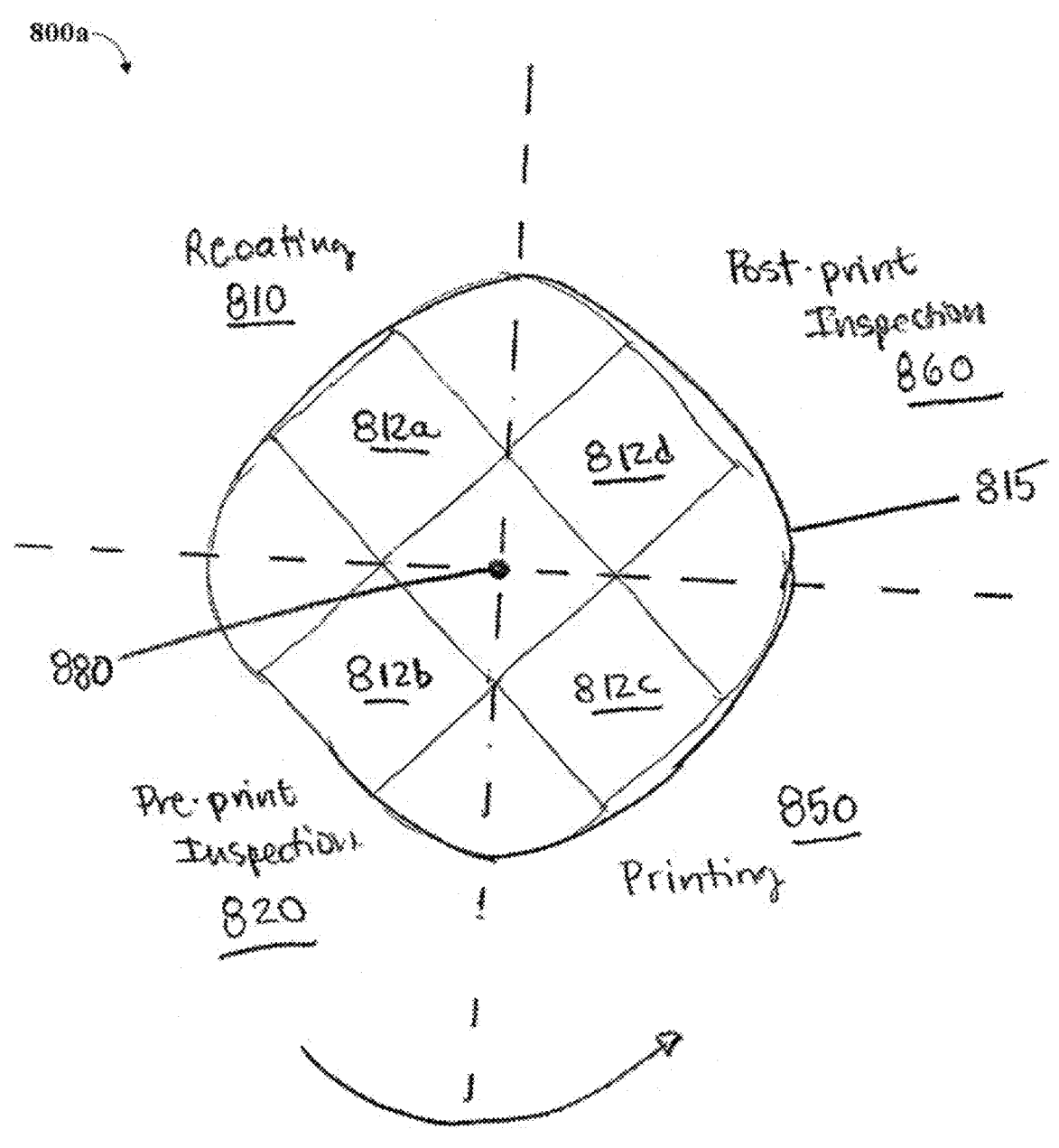
FIGS. 8A and 8B schematically illustrates different parallel 3D printing systems comprising a carousel configuration.

FIG. 8A schematically illustrates a top-view of a parallel 3D printing system comprising a carousel configuration. The system 800a of FIG. 8A can comprise one or more components of the system 100 of FIG. 1D and/or one or more components of the system 700 of FIG. 7. For example, the system 800a may be a modification of the system 700, such that one or more separate sensing stations exist between the deposition station and the printing station. For example, the carousel configuration of the system 800a of FIG. 8A can be an expanded version of the rotational swap configuration of the system 700 of FIG. 7. Referring to FIG. 8A, by adding additional FTUs, it may be possible to reassign some of the recoating and printing inspection operations to additional stations, similar to the racetrack configuration described throughout the present disclosure.

Referring to FIG. 8A, the system 800a comprises a carousel 815 that comprises four positions, wherein each position holds an FTU identified as 812[x] (e.g., 812a, 812b, 812c, and 812d). Alternatively, any number of positions can used (e.g., at least 2, 3, 4, 5, 6, 7, 8, 9, 10, or more positions for holding at least 2, 3, 4, 5, 6, 7, 8, 9, 10, or more FTUs each comprising a platform for holding a film of a feedstock/mixture). The FTUs 812[x] are joined together and can pivot in the plane of the paper around a center point 880. The system 800a can comprise a rotary actuator configured to rotate about the center point 880. Each of the FTUs 812[x] is positioned in a different functional station around the center point 880.

Referring to FIG. 8A, the FTU 812a is at a recoating station 810 where it undergoes the recoating steps, as disclosed throughout the present disclosure. The FTU 812b is at a pre-printing inspection station 820 where the layer thickness is determined. Alternatively or in addition to, other layer characteristics that can be checked at pre-printing inspection station 820 can include thickness uniformity and the presence of defects. In some cases, the thickness can be determined using confocal laser displacement sensors, or light transmission or optical density of the film of the feedstock/mixture. The FTU 812c is at a printing station 850, where it undergoes the printing steps, as provided throughout the present disclosure. The FTU 812d is at a post-printing inspection station 860, where the silhouette image of the film is captured, such image showing the negative of the printed image. The negative image can be used to inspect or confirm quality of what has been cured/printed.

Referring to FIG. 8A, the carousel 815 pivots around the center point 880 and moves the FTUs 812[x] in a counter-clockwise direction from station to station. Alternatively or in addition to, the movement may be in a clockwise direction. The carousel 815 moves and each FTU 812[x] advances in position, e.g., (i) the FTU 812a with a fresh feedstock film leaves the recoating station 810 and moves into pre-printing inspection station 820, (ii) the FTU 812b with the fresh feedstock film that has passed inspection moves to the printing station 850, (iii) the FTU 812c with the waste film leaves the printing station 850 and moves to the post-print inspection station 860, and (iv) the FTU 812d leaves the post-print inspection station 860 and moves to be recoated at the recoating station 810. In this parallel process, there may be (e.g., always may be) an FTU with a feedstock film ready at the pre-printing inspection station 820 to be transferred to the printing station 850 upon (e.g., as soon as) the printing station 850 is ready to receive a recoated FTU. As such, the printing station may have no substantial idle time.

In some cases, the system 800a of FIG. 8A can comprise an FTU feeder unit and an FTU reject unit adjacent to the carousel 815. The FTU feeder unit can be configured to add new FTUs with fresh substrates to the carousel, while an FTU reject unit removes old FTUs whose substrates has become worn out. The FTU feeder unit and the FTU reject unit may be part of the same unit. Alternatively, the FTU feeder unit and the FTU reject unit may be parts of different units.

Referring to FIG. 8A or any modified system or method of use thereof, a degree of separation between any two stations (e.g., any two stations from one or more recoating stations, one or more pre-print inspection stations, one or more printing stations, one or more post-print inspection stations, FTU feeder unit station, FTU reject unit station, etc.) may be at least about 5 degrees, 10 degrees, 15 degrees, 20 degrees, 25 degrees, 30 degrees, 40 degrees, 50 degrees, 60 degrees, 70 degrees, 80 degrees, 90 degrees, 100 degrees, 110 degrees, 120 degrees, 150 degrees, 170 degrees, 175 degrees, or more. The degree of separation between the printing station 750 and the deposition station 710 may be at most about 180 degrees, 175 degrees, 170 degrees, 150 degrees, 120 degrees, 110 degrees, 100 degrees, 90 degrees, 80 degrees, 70 degrees, 60 degrees, 50 degrees, 40 degrees, 30 degrees, 25 degrees, 20 degrees, 15 degrees, 10 degrees, 5 degrees, or less.

Referring to FIG. 8A or any modified system or method of use thereof, the system may comprise at least 3, 4, 5, 6, 7, 8, 9, 10, or more different stations (e.g., any combination of different stations from one or more recoating stations, one or more pre-print inspection stations, one or more printing stations, one or more post-print inspection stations, FTU feeder unit station, FTU reject unit station, etc.). The system may comprise at most 10, 9, 8, 7, 6, 5, 4, or 3 different stations. The system may comprise at least 1, 2, 3, 4, 5, or more recoating stations (e.g., a plurality of recoating stations for depositing a plurality of different mixtures). The system may comprise at least 1, 2, 3, 4, 5, or more printing stations (e.g., a plurality of build heads for printing a plurality of 3D objects). The system may comprise at least 1, 2, 3, 4, 5, or more pre-print inspection stations (e.g., a plurality of inspection stations for inspecting films of different mixtures, or for inspecting different properties of a film of any mixture, etc.). The system may comprise at least 1, 2, 3, 4, 5, or more post-print inspection stations (e.g., a plurality of inspection stations for inspecting any excess of different mixtures, any excess of mixture for printing different 3D objects, or for inspecting different properties of any excess mixture, etc.).

Figure 8B:
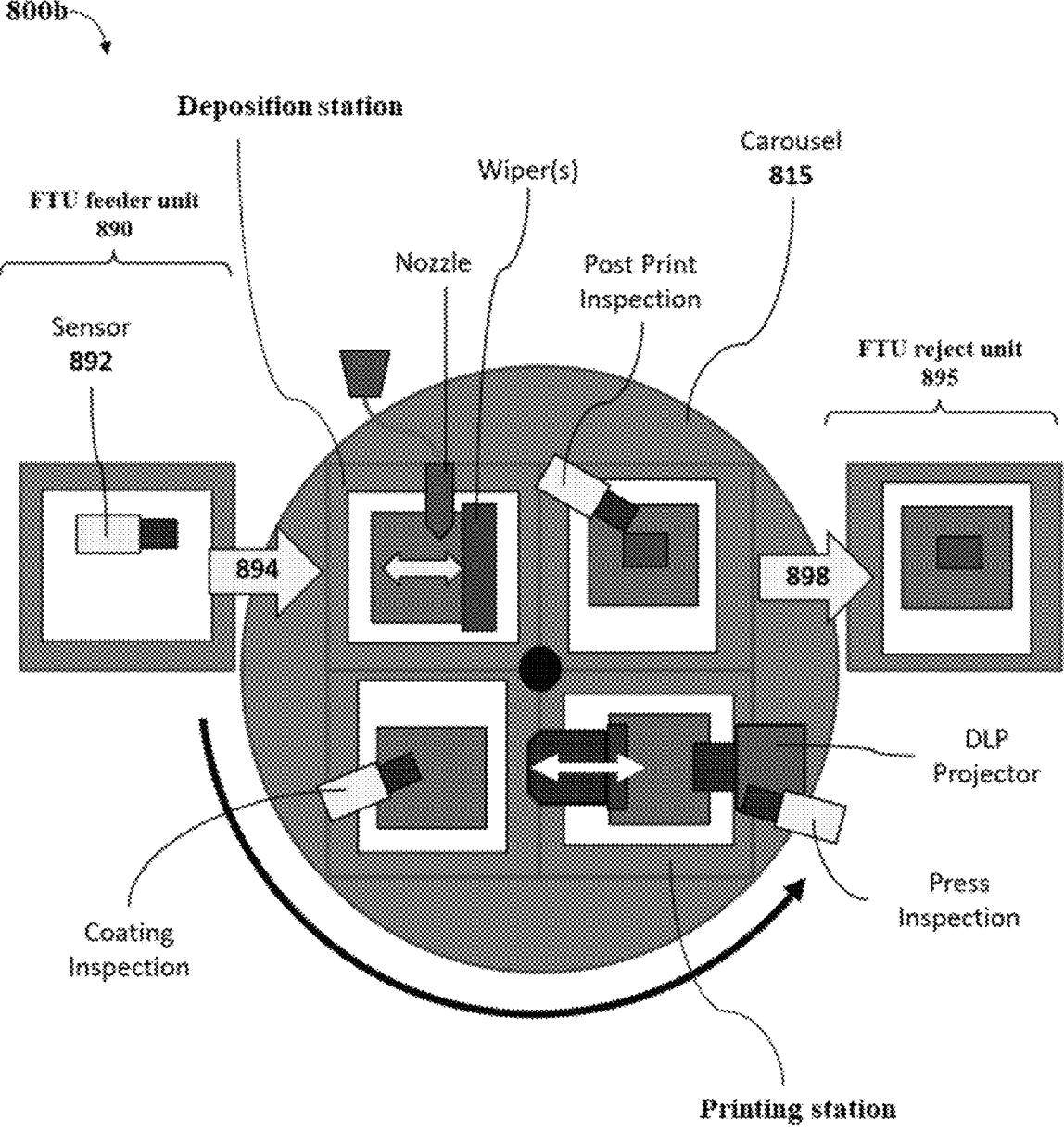

FIG. 8B schematically illustrates a top-view of a parallel 3D printing system comprising a carousel configuration. The system 800b of FIG. 8B can comprise one or more components of the system 800a of FIG. 8A. For example, the system 800b comprises the FTU feeder unit and the FTU reject unit that are operatively coupled to the carousel 815. The FTU feeder unit 890 can be operatively coupled to (e.g., comprise or be adjacent to) a feeder sensor 892 (e.g., FEP inspection sensor) configured to inspect one or more qualities or properties of a substrate or any mixture/feedstock disposed over the substrate. The FTU feeder unit 890 can be disposed adjacent to the deposition zone, the printing zone, or any other zones (e.g., other sensing zones) of the carousel 815. For example, the FTU feeder unit 890 can be disposed adjacent to the deposition zone, as illustrated in FIG. 8B. Alternatively, the FTU feeder unit 890 can be movable, to move to different parts of the carousel 815. When the feeder sensor 892 determines that any existing FTU on the carousel 815 needs to be replaced (e.g., via an analysis algorithm, such as an artificial intelligence or machine learning algorithm), a controller operatively coupled to the feeder sensor 892 will mark the detected FTU (e.g., in silico), such that the marked FTU can be removed from the carousel 815 subsequently by the FTU reject unit 895. The controller can also direct the FTU feeder unit 890 to provide (e.g., insert) a new FTU comprising a new platform (e.g., transparent or semi-transparent film) to the carousel 815. The FTU reject unit 895 can be disposed adjacent to the deposition zone, the printing zone, or any other zones (e.g., other sensing zones) of the carousel 815. For example, the FTU reject unit 895 can be disposed adjacent to the post-print inspection zone, as illustrated in FIG. 8B. Alternatively, the FTU reject unit 895 can be movable, to move to different parts of the carousel 815.

Referring to FIG. 8B, the FTU feeder unit 890 can comprise at least 1, 2, 3, 4, 5, 6, 7, 8, 9, 10, or more FTU(s) (e.g., each comprising a platform) to be provided to the carousel 815. The FTU feeder unit 890 can comprise at most 10, 9, 8, 7, 6, 5, 4, 3, 2, or 1 FTU(s) (e.g., each comprising a platform) to be provided to the carousel 815. The FTU feeder unit 890 can be operatively coupled to one or more actuators (e.g., rollers, wheels, robotic arms, etc.) to provide a new FTU to the carousel 815. The FTU reject unit 895 can be operatively coupled to one or more actuators to remove a FTU from the carousel 815.

Referring to FIG. 8B, the FTU feeder unit and the FTU reject unit can be modified such that (i) the FTU feeder unit provides a replacement platform (e.g., transparent or semi-transparent film) to an existing FTU on the carousel 815 (e.g., a platform feeder unit), and/or (ii) the FTU reject unit removes an existing platform from an existing FTU on the carousel 815 (e.g., a platform exit unit). In doing so, a fewer number of components may need to be transferred in and out of the carousel during the 3D printing process. The FTU feeder unit 890 can comprise at least 1, 2, 3, 4, 5, 6, 7, 8, 9, 10, or more FTU(s) (e.g., each comprising a platform) to be provided to the carousel 815. The FTU feeder unit 890 can comprise at most 10, 9, 8, 7, 6, 5, 4, 3, 2, or 1 FTU(s) (e.g., each comprising a platform) to be provided to the carousel 815. Such platform feeder unit can be operatively coupled to one or more actuators (e.g., rollers, wheels, robotic arms, etc.) to provide a new platform to an existing FTU on the carousel 815. Such platform reject unit can be operatively coupled to one or more actuators to remove a platform from an existing FTU on the carousel 815.

Figure 9:
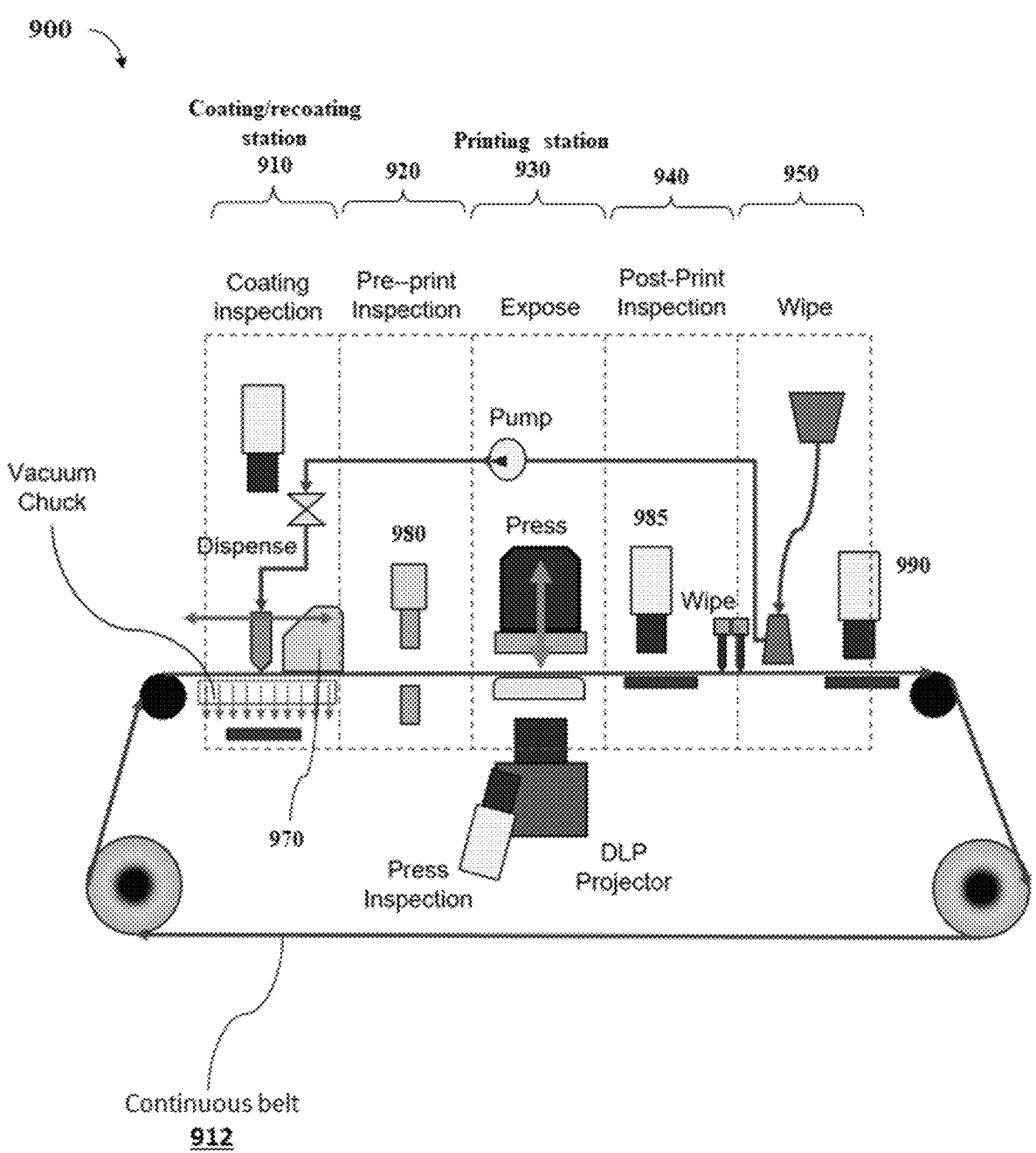
FIG. 9 schematically illustrates a 3D printing system comprising a belt configuration and one or more sensors for assessing one or more steps of printing a 3D object using the 3D printing system.

FIG. 9 schematically illustrates a 3D printing system comprising a belt configuration and one or more sensors for assessing one or more steps of printing a 3D object using the 3D printing system. The system 900 of FIG. 9 can comprise one or more components of the system 100 of FIG. 1D. For example, the system 900 may be a modification of the system 100, such that a continuous belt 912 is moved (e.g., translated) relative to the deposition station 910, the pre-print inspection/sensing station 920, the printing station 930, the post-print inspection/sensing station 940, and a cleaning/wiping station 950.

Referring to the system 900 in FIG. 9, a standard FTU that includes a transparent substrate supported by a rigid or semi rigid frame (e.g., operatively coupled to an translational actuator) is not used. Instead, the continuous belt 912 of transparent or semi-transparent substrate moves through the stations 910, 920, 930, 940, and 950 of the 3D printing system. In some cases, the belt can be made by coupling two portions (e.g., two ends) of a single sheet of transparent substrate via a coupling mechanism (e.g., thermal, mechanical, or chemical bonding).

Referring to FIG. 9, the system 900 comprises a plurality of sensing stations separate from the coating station 910 and the printing station 930. At least a portion of the continuous belt that is holding the feedstock/mixture may need to move away from either the coating station 910 or the printing station 930, such that the feedstock/mixture or the at least the portion of the continuous belt can be analyzed by one or more sensors. For example, a coating station 910 receives a clean transparent substrate portion of the continuous belt 912 and dispenses feedstock onto the substrate. A doctor blade 970 moves across the feedstock to form a uniform feedstock film, as disclosed herein. The belt 912 advances the feedstock film to an optional pre-printing inspection station 920, where the layer thickness is determined by one or more sensors 980. For example, the thickness is determined using confocal laser displacement sensors. As the belt 912 advances the feedstock film from the coating station 910 to the pre-printing inspection station 920, a clean substrate portion of the continuous belt 912 is also advanced into the coating station 910, such that a new feedstock film can be made.

Referring to FIG. 9, the belt 912 advances the feedstock film from the coating station 910 (or the optional pre-print inspection station 920) to the printing station 930. In the printing station 930, a build plate is lowered onto the feedstock film and compresses the feedstock film to a desired printing layer thickness. A light source (e.g., a digital light processing (DLP) projector) directs patterned light through a print window onto the feedstock film to cure the photoactive resin therein and form a printed layer. The printed layer can be inspected with a camera during or subsequent to the printing. The build plate moves away from the belt 912, leaving behind a waste film, which may comprise an excess of the feedstock. Subsequently, the belt 912 advances the waste film to a post-printing inspection station 940, where the silhouette image is captured by one or more sensors 985, e.g., to confirm the quality of the previously cured layer of the 3D object. As the belt 912 advances the waste film to the wiping station 950, where one or more wipers remove the waste film from the belt 912 and returns the unused feedstock back to the coating station 910 (e.g., through one or more channels operatively coupled to one or more pumps). Also, the belt 912 is optionally inspected by one or more sensors 990 to see if the all the feedstock has been removed. When substantially all feedstock has been removed from the waste film portion of the belt, the belt 912 advances to be introduced into the coating station 910 again, and the process is repeated. In some cases, along the length of the belt 912 that is within the five stations, the functions in all the stations 910, 920, 930, 940, and 950 can proceed substantially at the same time (e.g., operate in parallel). For example, the belt 912 can advance when the longest process out of the stations (e.g., 910, 920, 930, 940, and 950) is completed.

Figure 10:
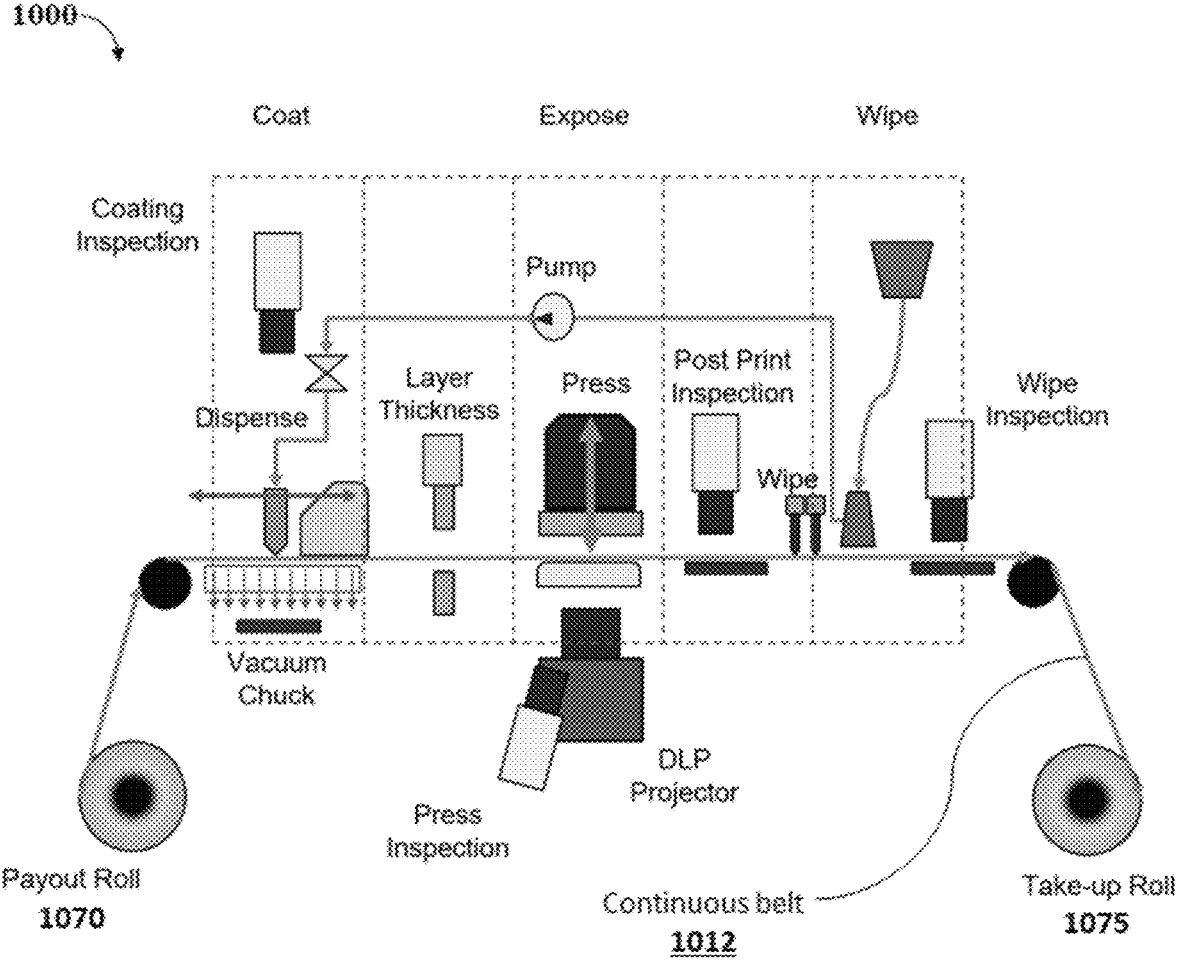
FIG. 10 schematically illustrates a different 3D printing system comprising a belt configuration and one or more sensors for assessing one or more steps of printing a 3D object using the 3D printing system.

FIG. 10 schematically illustrates a 3D printing system comprising a belt configuration and one or more sensors for assessing one or more steps of printing a 3D object using the 3D printing system. The system 1000 of FIG. 10 can comprise one or more components of the system 900 of FIG. 9. For example, the system 1000 may be a modification of the system 900, such that the continuous belt 912 is replaced by a roll-to-roll belt 1012. The roll-to-roll system 1000 may operate substantially identical to the continuous belt system 900 of FIG. 9, except that instead of a continuous belt 912, the substrate (or film substrate) moves through the stations from a payout roll 1070 to a take up roll 1075. In some cases, this system can be advantageous wherein the film substrate is inexpensive and disposable, such as a substrate made of polyethylene terephthalate (PET).

In another aspect, the present disclosure provides a system for printing a 3D object. The system can comprise a plurality of wipers. The system can comprise at least a first wiper configured to mix at least a portion of a mixture disposed over the platform. The system can comprise at least a second wiper configured to remove the at least the portion of the mixture from at least a portion of the platform. The system can further comprise a controller configured to direct (i) the at least the first wiper to move relative to the platform, to mix the at least the portion of the mixture, and (ii) the at least the second wiper to move relative to the platform, to remove the at least the portion of the mixture from the platform. As disclosed herein, the mixture may comprise a plurality of particles. The plurality of particles may comprise a distribution of particle dimension (e.g., a distribution of average particle diameter).

In some cases, during 3D printing, a photocurable mixture (e.g., excess mixture) may be moved (e.g., wiped by one or more wipers) into a collection (e.g., a bead) on a portion of a platform (e.g., a transparent substrate). A wiper (e.g., a doctor blade) may move across the collection to spread it onto the platform and flatten it into a film of the mixture, e.g., a film having a thickness between about 30 μm and 600 μm. The mixture film may be positioned under a build plate that is lowered onto the mixture film and compresses the mixture film to a desired printing layer thickness. An optical source (e.g., a digital light processing (DLP) projector) may direct a patterned light onto the mixture film to cure at least a portion of the photoactive resin therein and form a printed layer. The build plate may subsequently move away from the mixture film. Following, the platform with the waste (uncured portion) mixture film may be returned to a deposition unit (or recoating station, as used interchangeably herein), where the waste mixture film may be wiped up to form a new collection (or a new bead) with additional feedstock, which may be flattened into a new mixture film on the substrate. The mixture as disclosed herein (e.g., a photocurable mixture) may comprise a plurality of different components. For example, as provided throughout the present disclosure, the mixture may comprise a population of metal or ceramic particles, and the population of metal or ceramic particles may have a distribution of particle sizes. In some cases, when the build head compresses the mixture film (such that the compressed mixture film is disposed between the build head and the platform), at least a portion of the mixture may be is pushed out of the compressed region and towards/around one or more edges of the build head. In some cases, large particles in the mixture film may substantially remain within the compressed region (e.g., under the build head), and small particles in the mixture may flow out along with the mixture that is pushed out of the compressed region.

Figure 11:
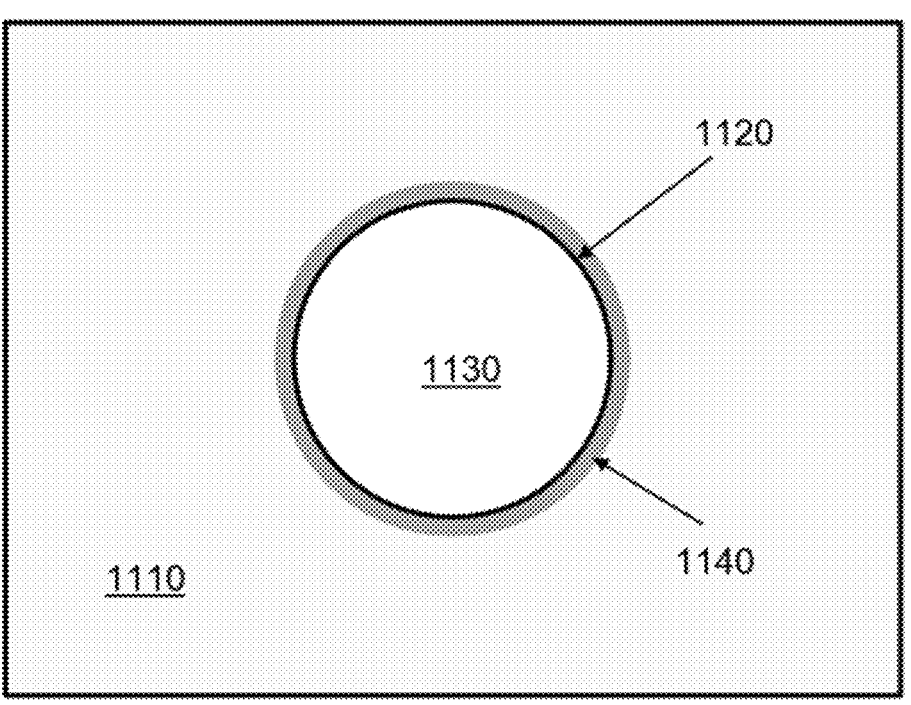
FIG. 11 schematically illustrates a heterogeneous distribution of particles within an excess mixture on a platform.

FIG. 11 schematically illustrates a heterogeneous distribution of particles within an excess of a film of a mixture 1110 on a platform (e.g., a substrate), following curing and removal of a portion of the film of the mixture 1110. The portion may be formed and adhered adjacent to a build head (or an object disposed on the build head), and the build head may have been moved away, thereby leaving behind a void 1130 where the portion used to be. Referring to FIG. 11, the line 1120 indicates an outer edge of the portion that has been cured and removed (or an outer edge of the void 1130). Around the space 1130 may be a region 1140 of the mixture 1110, and the region 1140 adjacent to the void 1130 may exhibit a different distribution of particles (e.g., metal or ceramic particles) than another part of the film of the mixture 1110 that has not be pressed by the build head during printing. For example, the region 1140 may exhibit a higher concentration of small particles (e.g., small metal or ceramic particles) as compared to another part of the film of the mixture 1110 that has not be pressed by the build head during printing. In some cases, the excess film of mixture may be removed from the platform (e.g., wiped off from the transparent substrate) with a single flexible wiper (e.g., wiper blade), fresh mixture may be optionally dispensed onto the platform, and a new collection (e.g., a new pool) of the excess mixture and the optional new mixture may be formed. The same wiper or a different wiper may move across and spread the new collection over the platform, to flatten the collection into a new film of mixture for printing. However, in some examples, the newly formed film of mixture may not be homogeneous (e.g., may comprise a heterogenous distribution of particle/particle size throughout the area of the film of the mixture).

Figure 12:
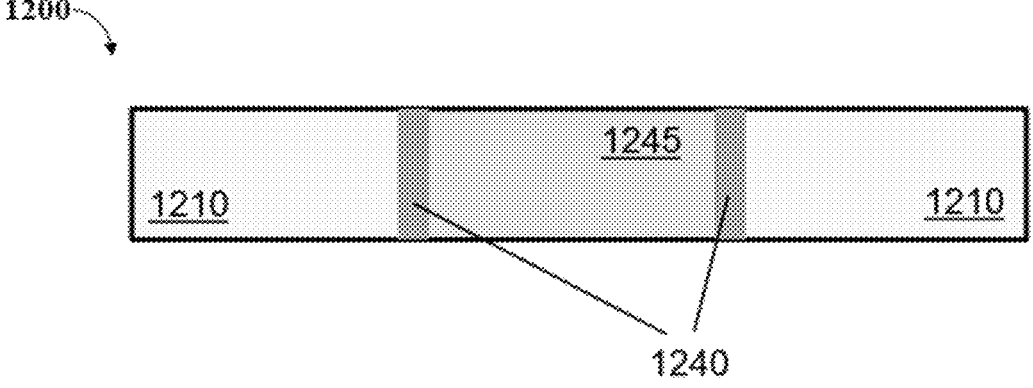
FIG. 12 schematically illustrates a heterogeneous distribution of particles within an pool of mixture.

FIG. 12 schematically illustrates heterogeneous distribution of particles within a pool of mixture. FIG. 12 shows a heterogenous distribution of particles (e.g., small particles as disclosed herein) that may be expected when the waste mixture film as illustrated in FIG. 11 is wiped into a new pool (or bead) 1200. Referring to FIG. 12, the mixture pool 1200 may comprise a first concentration of small particles in regions 1240, and second and lower concentration of small particles in region 1245. The regions 1210 may retain the particle distribution of the original mixture film 1110 from FIG. 11. The regions 1210 may comprise a third concentration of small particles, and the third concentration may be different than the first and second concentrations. For example, the third concentration may be lower than the first and second concentrations. When such pool 1200 having a heterogenous distribution of the small particles is used for subsequent layer(s) of the 3D object, the cumulative effect (e.g., from printing a plurality of layers, such as at least 2, 5, 10, 15, 20, 25, 30, 40, 50, 100, 200, 500, 1,000, 2,000, 5,000, or more layers) may yield (i) heterogenous distribution of the small particles (and/or other particles of other size ranges) within the printed 3D object and/or (ii) heterogeneous properties (e.g., strength, toughness, thermal resistivity, etc.) within the printed 3D object. The differences in the concentration and/or distribution of the small particles. For example, the heterogenous distribution of the small particles in areas near the edge of the print head or end of a cured region (e.g., region 1240) may increase with printing of each layer.

However, recognized herein is a critical need for the mixture to remain homogeneous (e.g., substantially homogeneous) throughout the printing of one or more 3D objects (e.g., throughout printing of numerous identical layers or identical 3D objects). When the excess mixture with heterogenous distribution of particles is used for 3D printing (e.g., as illustrated in FIGS. 11 and 12), undesirable variations in particle loading and/or property throughout the 3D object may result. For example, inhomogeneity printing errors may result. As such, there remains an unmet need to mix the excess film of mixture and reduce heterogeneity of particles within the excess film of mixture, prior to re-using the excess film of mixture for printing one or more subsequent layers of the 3D object (or a different 3D object). Thus, the present disclosure provides a multiple-wiper system configured to effect mixing of at least a portion of the mixture (e.g., the excess mixture).

In some cases, a dimension (e.g., an average diameter) the particles in the mixture that may be flown out or pushed out of the compressed region (e.g., region that is compressed by the build head, as disclosed herein), may be at most about 80%, 75%, 70%, 65%, 60%, 55%, 50%, 45%, 40%, 35%, 30%, 25%, 20%, or less than a thickness of the compressed region. In some cases, the dimension (e.g., an average diameter) of the particles in the mixture that may be flown out or pushed out of the compressed region may be at most about 60%, 55%, 50%, 45%, 40%, 35%, 30%, 25%, 20%, or less than the thickness of the compressed region. In some cases, the dimension (e.g., an average diameter) of the particles in the mixture that may be flown out or pushed out of the compressed region may be at most about 50% of the thickness of the compressed region. In some examples, the thickness of the compressed region of the film of mixture may be between about 10 μm and about 200 μm, about 10 μm and about 100 μm, or about 50 μm and 100 μm.

In some cases, when the excess mixture (excess mixture remaining after curing and removing at least a portion of the film of the mixture) is re-used for printing one or more subsequent layers without using the at least the first wiper as disclosed herein for mixing the excess mixture, and this process is repeated for printing a plurality of layers, an average particle size (e.g., as defined by D50 measurement) of the excess (or left-over) mixture disposed over the platform may decrease after printing a plurality of layers. For example, without the use of the at least the first wiper as disclosed herein, the average particle size of the excess mixture may decrease by at least about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, or more upon printing at least about 10 layers, 15 layers, 20 layers, 25 layers, 30 layers, 35 layers, 40 layers, 45 layers, 50 layers, 55 layers, 60 layers, 65 layers, 70 layers, 80 layers, 90 layers, 100 layers, or more (e.g., layers having the same shape or different shapes). For example, without the use of the at least the first wiper, the average particle size of the excess mixture may decrease by about 15% as compared to the starting average particle size of the mixture, after printing about 50 layers. Thus, by use of the at least the first wiper as disclosed herein during 3D printing, a degree of such decrease of the average particle size of the excess mixture after printing a plurality of layers may be reduced by at least about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, or more (as compared to 3D printing without the at least the first wiper) upon printing at least about 10 layers, 15 layers, 20 layers, 25 layers, 30 layers, 35 layers, 40 layers, 45 layers, 50 layers, 55 layers, 60 layers, 65 layers, 70 layers, 80 layers, 90 layers, 100 layers, or more (e.g., layers having the same shape or different shapes).

In some cases, when the excess mixture is re-used for printing one or more subsequent layers without using the at least the first wiper as disclosed herein for mixing the excess mixture, and this process is repeated for printing a plurality of layers, there may be a build-up of particles (e.g., metal and/or ceramic powder particles) in the portion of the excess mixture adjacent to the part that has been cured and removed, as a function of layer number. This, mixing the excess mixture by the at least one wiper as disclosed herein (e.g., prior to the use of the at least the second wiper) may reduce heterogeneity within the excess mixture (or substantially re-homogenize the excess mixture) to redistribute the particles that have been pushed out of the compressed region, to reduce or substantially prevent such local build-up of particles adjacent to the part that has been cured and removed. As such, while the smaller particles (or fine particles) may be prone to getting pushed out of the compressed region, such particles may be redistributed by mixing via the at least the first wiper to minimize their effect (e.g., negative effect) on printing or quality of the printed part(s). In some examples, without the use of the at least the first wiper as disclosed herein, local particle loading in the mixture (e.g., the local concertation of particles within a local volume of the mixture) adjacent to (e.g., adjacent to and outside of) the compressed region may increase by at least about 1%, 2%, 3%, 4%, 5%, 6%, 7%, 8%, 9%, 10, 11%, 12%, 13%, 14%, 15%, 16%, 17%, 18%, 19%, 20%, or more upon printing at least about 10 layers, 15 layers, 20 layers, 25 layers, 30 layers, 35 layers, 40 layers, 45 layers, 50 layers, 55 layers, 60 layers, 65 layers, 70 layers, 80 layers, 90 layers, 100 layers, or more (e.g., layers having the same shape or different shapes). For example, without the use of the at least the first wiper as disclosed herein, the local particle loading in the mixture may increase by about 5% after printing about 50 layers. Thus, by use of the at least first wiper as disclosed herein during 3D printing, a degree of such increase of the local particle loading adjacent to the compressed region may be reduced by at least about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, or more (as compared to 3D printing without the at least the first wiper) upon printing at least about 10 layers, 15 layers, 20 layers, 25 layers, 30 layers, 35 layers, 40 layers, 45 layers, 50 layers, 55 layers, 60 layers, 65 layers, 70 layers, 80 layers, 90 layers, 100 layers, or more (e.g., layers having the same shape or different shapes).

As disclosed herein, a volume of the compressed region within a film of the mixture may be about 10% to about 90%. A volume of the compressed region within a film of the mixture may be at least about 10%. A volume of the compressed region within a film of the mixture may be at most about 90%. A volume of the compressed region within a film of the mixture may be about 10% to about 20%, about 10% to about 25%, about 10% to about 30%, about 10% to about 35%, about 10% to about 40%, about 10% to about 45%, about 10% to about 50%, about 10% to about 60%, about 10% to about 70%, about 10% to about 80%, about 10% to about 90%, about 20% to about 25%, about 20% to about 30%, about 20% to about 35%, about 20% to about 40%, about 20% to about 45%, about 20% to about 50%, about 20% to about 60%, about 20% to about 70%, about 20% to about 80%, about 20% to about 90%, about 25% to about 30%, about 25% to about 35%, about 25% to about 40%, about 25% to about 45%, about 25% to about 50%, about 25% to about 60%, about 25% to about 70%, about 25% to about 80%, about 25% to about 90%, about 30% to about 35%, about 30% to about 40%, about 30% to about 45%, about 30% to about 50%, about 30% to about 60%, about 30% to about 70%, about 30% to about 80%, about 30% to about 90%, about 35% to about 40%, about 35% to about 45%, about 35% to about 50%, about 35% to about 60%, about 35% to about 70%, about 35% to about 80%, about 35% to about 90%, about 40% to about 45%, about 40% to about 50%, about 40% to about 60%, about 40% to about 70%, about 40% to about 80%, about 40% to about 90%, about 45% to about 50%, about 45% to about 60%, about 45% to about 70%, about 45% to about 80%, about 45% to about 90%, about 50% to about 60%, about 50% to about 70%, about 50% to about 80%, about 50% to about 90%, about 60% to about 70%, about 60% to about 80%, about 60% to about 90%, about 70% to about 80%, about 70% to about 90%, or about 80% to about 90%. A volume of the compressed region within a film of the mixture may be about 10%, about 20%, about 25%, about 30%, about 35%, about 40%, about 45%, about 50%, about 60%, about 70%, about 80%, or about 90%. For example, the volume of the compressed region may be between about 30% and about 35% of the volume of the film of the mixture.

In some cases, (i) the at least the first wiper may contact the at least the portion of the mixture (e.g., any excess mixture remaining after) to mix the at least the portion of the mixture, (ii) the at least the portion of the mixture that is mixed may be directed to (e.g., by movement of the at least the first wiper) the at least the second wiper, and (iii) subsequently, the at least the second wiper may contact the at least the portion of the mixture that has been mixed and remove the at least the portion of the mixture from the platform. In doing so, the at least the second wiper can collect the at least the portion of the mixture to another portion of the platform, e.g., into a pool of the mixture which can be used (e.g., flattened) to form at least a portion of a new film of mixture. One of more of the process (i), (ii), and (iii) (e.g., all of the processes (i), (ii), and (iii)) may occur while the at least the first wiper is moving relative to the platform (e.g., moving across the platform). One of more of the process (i), (ii), and (iii) (e.g., all of the processes (i), (ii), and (iii)) may occur while the at least the second wiper is moving relative to the platform (e.g., moving across the platform). In some cases, a nozzle in fluid communication with a source of the mixture, as disclosed herein, may dispense an additional amount of the mixture to the platform. Such dispensing may occur prior to the process (i), substantially at the same time as the process (i), or subsequent to the process (i). Alternatively or in addition to, such dispensing may occur prior to the process (ii), substantially at the same time as the process (ii), or subsequent to the process (ii). Alternatively or in addition to, such dispensing may occur prior to the process (iii), substantially at the same time as the process (iii), or subsequent to the process (iii).

The mixing of the at least the portion of the mixture by the at least the first wiper may reduce heterogeneity of the at least the portion of the mixture (e.g., heterogenous distribution of large particles within the mixture) by at least about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, or more, as compared to a control mixture without the mixing (e.g., excess mixture disposed on the platform after printing). The mixing of the at least the portion of the mixture by the at least the first wiper may reduce heterogeneity of the at least the portion of the mixture by at most about 95%, 90%, 85%, 80%, 75%, 70%, 65%, 560%, 55%, 50%, 45%, 40%, 35%, 30%, 25%, 20%, 19%, 18%, 17%, 16%, 15%, 14%, 13%, 12%, 11%, 10%, 9%, 8%, 7%, 6%, 5%, 4%, 3%, 2%, 1%, or less, as compared to a control mixture without the mixing (e.g., excess mixture disposed on the platform after printing). In some examples, the heterogeneity of the mixture may be ascertained (or measured) by an optical density of the mixture, radiograph (e.g., two-dimensional radiography) of the mixture, light scanning (e.g., three-dimensional structured light scanning) of the mixture to measure the surface roughness uniformity, etc.

The plurality of wipers can comprise at least 1, 2, 3, 4, 5, 6, 7, 8, 9, 10, or more wiper(s). The plurality of wipers can comprise at most 10, 9, 8, 7, 6, 5, 4, 3, 2, or 1 wiper(s). The at least the first wiper can comprise a plurality of first wipers. The plurality of first wipers can be arranged (e.g., in an array), for example, in series, in parallel, in a zigzag, etc. The plurality of first wipers may be configured to move substantially together. Alternatively, the plurality of first wipers may be configured to move separately from each other. The at least the first wiper can comprise at least 1, 2, 3, 4, 5, 6, 7, 8, 9, 10, or more first wiper(s). The at least the first wiper can comprise at most 10, 9, 8, 7, 6, 5, 4, 3, 2, or 1 first wiper(s). The at least the second wiper can comprise a plurality of second wipers. The plurality of first wipers can be arranged (e.g., in an array), for example, in series, in parallel, in a zigzag, etc. The at least the second wiper can comprise at least 1, 2, 3, 4, 5, 6, 7, 8, 9, 10, or more second wiper(s). The at least the second wiper can comprise at most 10, 9, 8, 7, 6, 5, 4, 3, 2, or 1 second wiper(s). The plurality of second wipers may be configured to move substantially together.

Alternatively, the plurality of second wipers may be configured to move separately from each other.

The at least one wiper (e.g., the at least the first wiper and/or the at least the second wiper) may be operatively coupled to one or more actuators (e.g., at least 1, 2, 3, 4, 5, 6, 7, 8, 9, 10, or more actuator(s) as disclosed herein) for controlling movement of the at least one wiper relative to the platform.

The at least the first wiper can be angled with respect to a dimension (e.g., a plane) of the at least the second wiper. For example, an axis of a length (e.g., the longest dimension) of the at least the first wiper may be angled with respect to an axis of a length (e.g., the longest dimension) of the at least the second wiper. Such angle between the at least the first wiper and the at least the second wiper may be at least about 1 degree, 2 degrees, 3 degrees, 4 degrees, 5 degrees, 10 degrees, 20 degrees, 30 degrees, 60 degrees, 90 degrees, 120 degrees, 150 degrees, or more. The angle between the at least the first wiper and the at least the second wiper may be at most about 150 degrees, 120 degrees, 90 degrees, 60 degrees, 30 degrees, 20 degrees, 10 degrees, 5 degrees, 4 degrees, 3 degrees, 2 degrees, 1 degree, or less.

The at least the first wiper can comprise a first wiper and an additional first wiper. The first wiper and the additional first wiper may be angled with respect to each other. For example, an axis of a length (e.g., the longest dimension) of the first wiper may be angled with respect to an axis of a length (e.g., the longest dimension) of the additional first wiper. Such angle between the first wiper and the additional first wiper may be at least about 1 degree, 2 degrees, 3 degrees, 4 degrees, 5 degrees, 10 degrees, 20 degrees, 30 degrees, 60 degrees, 90 degrees, 120 degrees, 150 degrees, or more. The angle between the first wiper and the additional first wiper may be at most about 150 degrees, 120 degrees, 90 degrees, 60 degrees, 30 degrees, 20 degrees, 10 degrees, 5 degrees, 4 degrees, 3 degrees, 2 degrees, 1 degree, or less. In some examples, the at least the first wiper can comprise a plurality of first wipers, and the plurality of first wipers may not form a substantially straight line.

The at least the first wiper may comprise one or more gaps configured to direct the at least the portion of the mixture to flow The at least the first wiper and/or the at least the second wiper may be rigid. Alternatively, the at least the first wiper and/or the at least the second wiper may be flexible. through the one or more gaps and towards the at least the second wiper. A first wiper may comprise at least 1, 2, 3, 4, 5, 6, 7, 8, 9, 10, or more gap(s) (e.g., hole(s)). A first wiper may comprise at most 10, 9, 8, 7, 6, 5, 4, 3, 2, or 1 gap(s) (e.g., hole(s)). In some cases, a first wiper and an additional first wiper may be disposed relative to each other with a gap between an end of the first wiper and an end of the additional first wiper. Thus, in some examples, "n" number of first wipers may be configured to create "n–1" number of gaps between the first wipers. A dimension (e.g., a diameter or length) of a gap as disclosed herein may be at least about 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 100 μm, 200 μm, 300 μm, 400 μm, 500 μm, 600 μm, 700 μm, 800 μm, 900 μm, 1000 μm, 2 mm, 3 mm, 4 mm, 5 mm, 6 mm, 7 mm, 8 mm, 9 mm, 10 mm, or more. The dimension of the gap may be at most about 10 mm, 9 mm, 8 mm, 7 mm, 6 mm, 5 mm, 4 mm, 3 mm, 2 mm, 1000 μm, 900 μm, 800 μm, 700 μm, 600 μm, 500 μm, 400 μm, 300 μm, 200 μm, 100 μm, 90 μm, 80 μm, 70 μm, 60 μm, 50 μm, 40 μm, 30 μm, 20 μm, 10 μm, 9 μm, 8 μm, 7 μm, 6 μm, 5

μm, 4 μm, 3 μm, 2 μm, 1 μm, 900 nm, 800 nm, 700 nm, 600 nm, 500 nm, 400 nm, 300 nm, 200 nm, 100 nm, or less.

The size of a gap of the at least the first wiper as disclosed herein may be adjustable (e.g., by moving one or more wipers of the at least the first wiper). Alternatively, the size of the gap may not be adjustable.

In some cases, the mixture may comprise a plurality of particles, and a size of the gap as disclosed herein may be greater than a dimension (e.g., diameter) of a particle of the plurality of particles by at least about 1%, 2%, 5%, 10%, 20%, 50%, 100%, 200%, 1,000%, 2,000%, 5,000%, or more. The size of the gap may be less than about 5,000%, 2,000%, 1,000%, 200%, 100%, 50%, 20%, 10%, 5%, 2%, 1%, or less.

The at least the first wiper and/or the at least the second wiper may be part of a deposition head, as disclosed herein. Alternatively, the at least the first wiper and/or the at least the second wiper may not be a part of (or parts of) the deposition head (e.g., may not be contained within a housing of the deposition head).

As disclosed herein, a relative movement between the at least the first wiper and the platform may be linear and/or rotational. A relative movement between the at least the second wiper and the platform may be linear and/or rotational.

The at least the first wiper and/or the at least the second wiper may be rigid. Alternatively, the at least the first wiper and/or the at least the second wiper may be flexible. The at least the first wiper and/or the at least the second wiper may be linear. Alternatively, the at least the first wiper and/or the at least the second wiper may be non-linear (e.g., curved, wavy, angled, jagged, etc.).

In some embodiments of any one of the systems disclosed herein, the system may comprise a wiper blade system. The wiper blade system may comprise a first array of wiper blades. The wiper blade system may comprise a second array of wiper blades positioned adjacent to the first array of wiper blades. The first array of wiper blades may be configured to move through a mixture (e.g., a feedstock solution) on a platform (e.g., a substrate) and provide mixing to the mixture. The second array of wiper blades may be configured to remove the mixture from the platform.

In some cases, the second array of wiper blades may comprise a single wiper blade.

In some cases, the first array of wiper blades may comprise a plurality of blades. The plurality of blades of the first array of wiper blades may be oriented at one or more angles relative to one another. The plurality of blades of the first array of wiper blades may not remove the mixture from the platform. The plurality of blades of the first array of wiper blades may move at least a portion of the mixture from one portion of the platform to another portion of the platform.

In some cases, the wiper blades may be made of a flexible or compliant material. In some cases, the flexible or compliant material may be selected from the group consisting of polyurethane, rubber, and silicone.

In some cases, the wiper blade system may be configured to move through the mixture on the platform, such that the first array of wiper blades makes contact with the mixture before the second array of wiper blades makes contact with the mixture.

Figure 13:
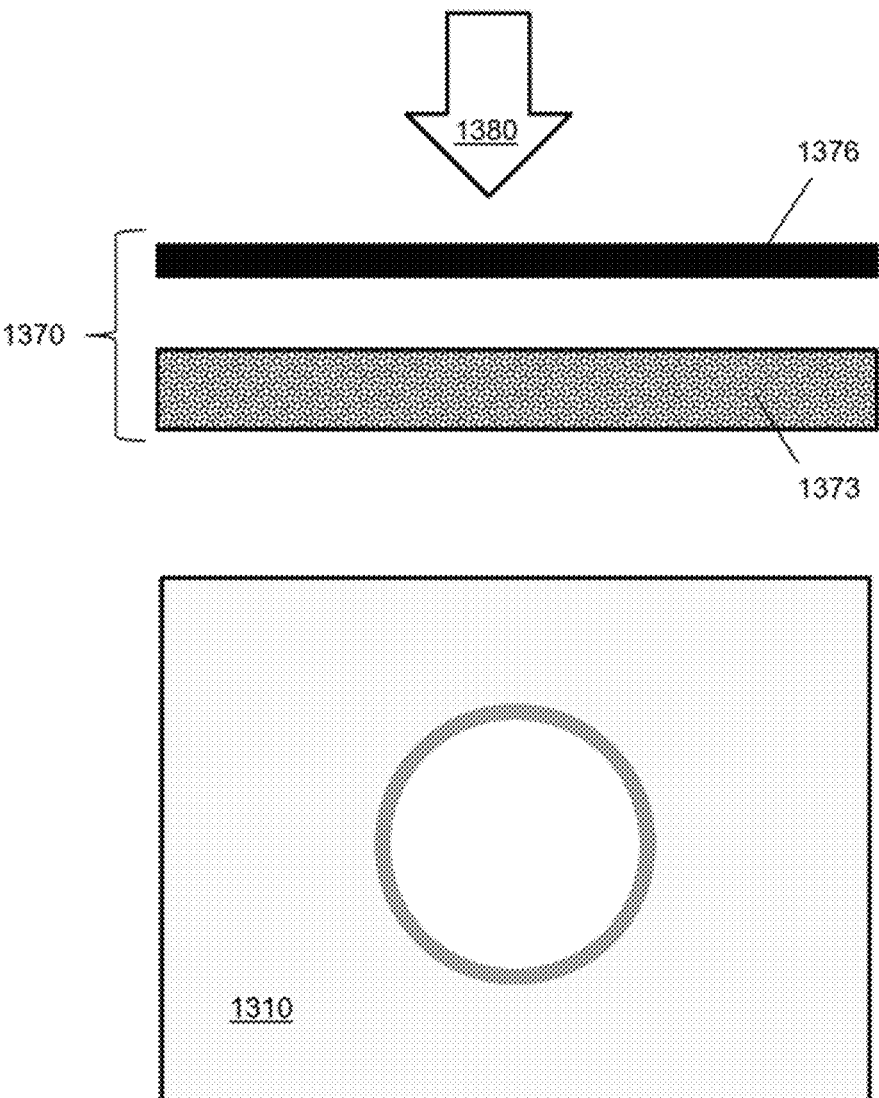
FIG. 13 schematically illustrates a wiper system.

FIG. 13 schematically illustrates a wiper system 1370, usable for printing a 3D object as disclosed herein. The wiper system 1370 comprises at least two different arrays of wiper blades. A first (mixing) wiper blade array 1373 contains a plurality of blades that is configured to provide mixing to a waste mixture 1310. A second (removing) wiper blade array 1376 contains one or more blades that wipe the waste mixture 1310 off the platform (e.g., transparent substrate) and collects the waste mixture into a new pool (or bead). The wiper system 1370 may move across the platform along the direction of the arrow 1380, to form the waste mixture 1310 into the pool (or bead) that may be reapplied onto the platform for printing a subsequent layer.

Figure 14:
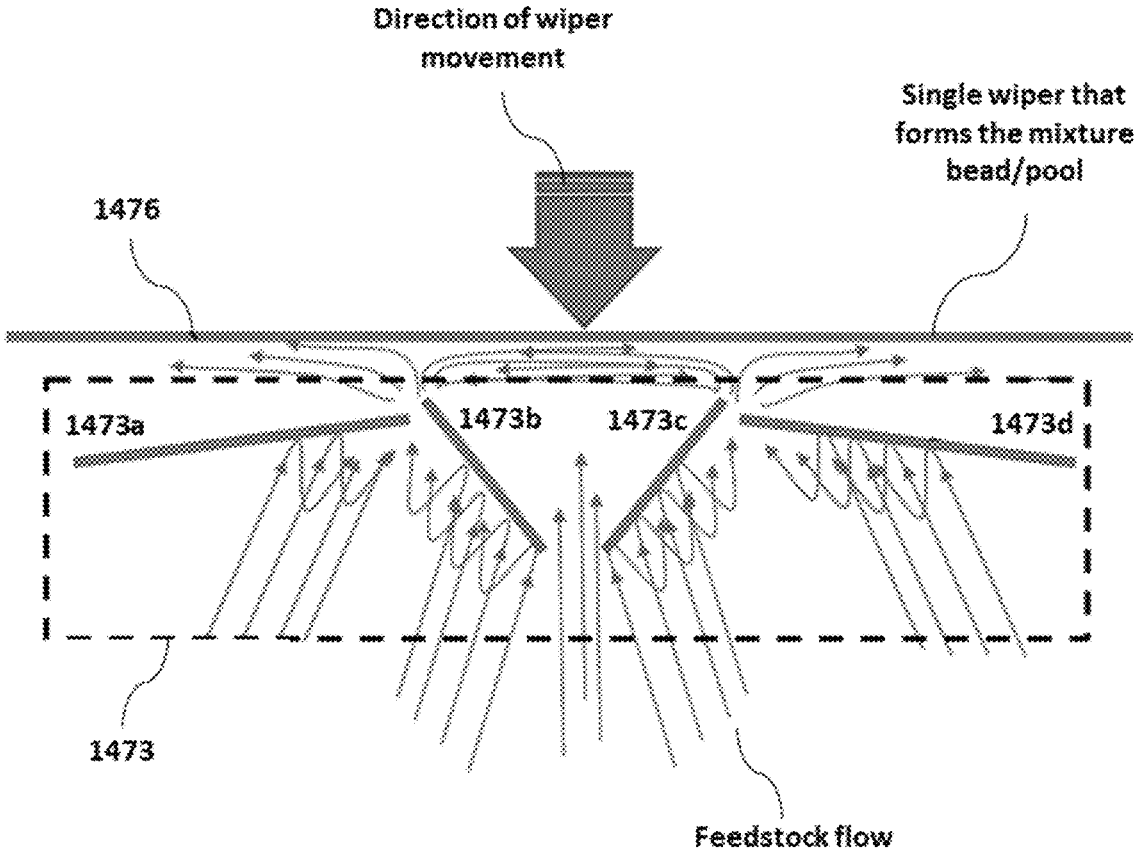
FIGS. 14 and 15 schematically illustrates examples of a wiper system.
Figure 15:
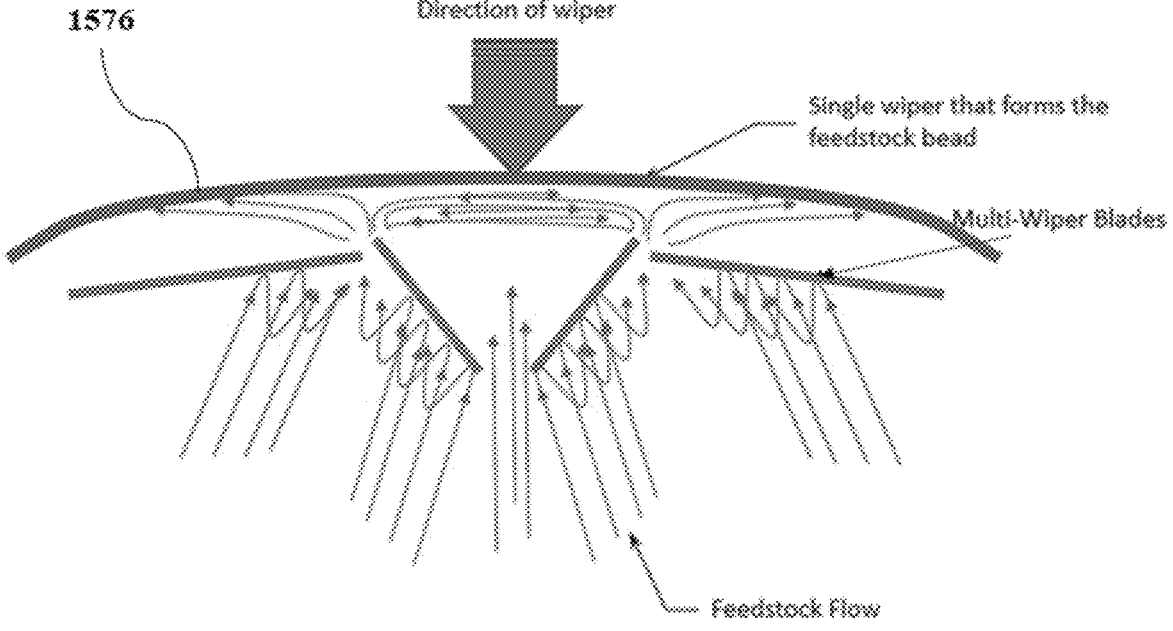

FIGS. 14 and 15 schematically illustrates examples of the wiper system as disclosed herein (e.g., examples of the wiper system 1370 of FIG. 13). Referring to FIG. 14, the mixing wiper blade array can comprise any combination of wipers that effect complete mixing of the waste mixture and, optionally, any added new mixture. A mixing wiper blade array 1473 can have four individual wipers 1473a, 1473b, 1473c, and 1473d that are arranged non-linearly, e.g., angled relative to one another. The arrows illustrate flow of the waste mixture (e.g., direction of the flow of the waste mixture) as it is mixed by the mixing wiper blade array 1473 and directed towards the removing wiper 1476. The mixing wiper blade array 1473 may mix the mixture (e.g., optionally including freshly added mixture while moving across the waste mixture), thus ensuring an even distribution of particles in the next layer that is printed. The removing wiper 1476 receive the mixed excess mixture and pushes the mixed excess mixture into a pool (or a bead), to be usable to form a new film of mixture for 3D printing. Referring to FIG. 15, the wiper system can comprise a non-linear removing wiper 1576.

Figures 16A, 16B, 16C, 16D:
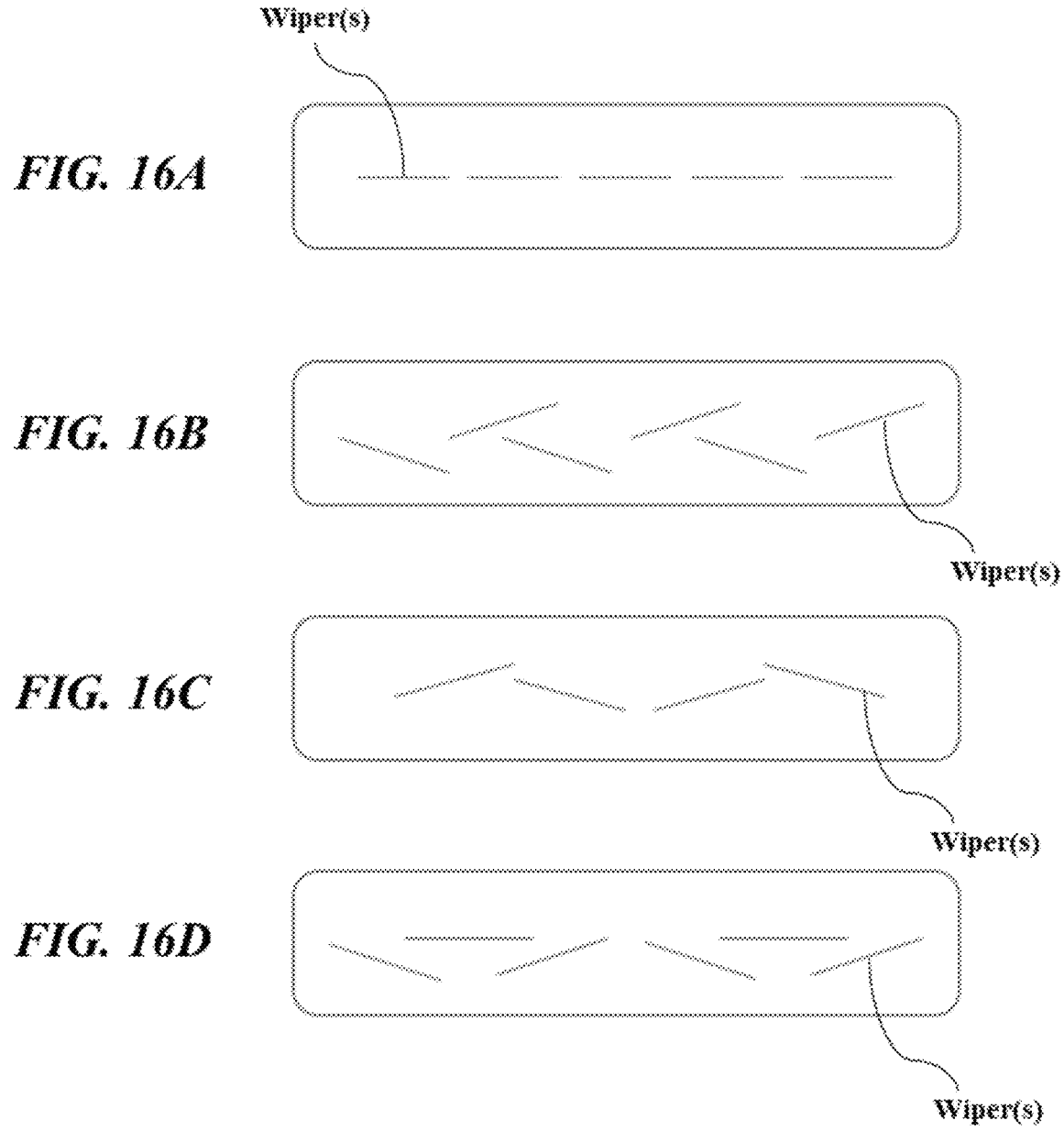
FIGS. 16A-16D schematically illustrate examples of an array of wipers for mixing a mixture.

FIGS. 16A-16D schematically illustrate examples of an array of wipers for mixing a mixture. The array of wipers shown in FIGS. 16A-16D may be example embodiments of the at least the first wiper, as disclosed herein. The array of wipers shown in FIGS. 16A-16D may be example embodiments of the mixing wiper blade 1473 of FIG. 14A. Referring to FIG. 16A, the array of wipers for mixing may be arranged linearly. Referring to FIGS. 16B-16D, the array of wipers for mixing may be arranged non-linearly.

As disclosed herein, the wipers in the multiple wiper system may be made of any flexible material that is suitable for use with the mixture of interest. When a plurality of wipers are used (e.g., for the at least the first wiper as disclosed herein), the plurality of wipers may comprise the same material. Alternatively, the plurality of wipers may comprise different materials.

Within the mixing wiper blade array, it may be important to carefully choose the position, the angle between wipers, the gap between wipers, the wiper material, and/or the number of wipers, to ensure homogeneity in the waste mixture before it is used again. In some cases, wiper blades having larger gaps may be used for a highly viscous mixture, to ensure sufficient mixing and movement of the mixture. In some cases, additional mixing features (e.g., tapered openings in the wipers) may be utilized for highly viscous mixtures. In some cases, the shape and layout of the parts being printed on the build plate may be a factor in deciding on the configuration of the mixing blades. For example, an array of previously printed parts on the build plate of the build head may result in different regions within the mixture having different heterogeneous distributions of particles, as compared to a build plate having only a single part. Thus, different wiper configures may be needed for different cross-section of a 3D object. The speed with which the multiple wiper system moves through the waste mixture is another important variable. The mixing wiper configuration can be adjusted for different mixture compositions, the size and length of the desired beads, and/or the volume of mixture required for the print.

Methods of Use

Additional aspects of the present disclosure provides methods of using any of the systems provided herein for printing one or more 3D objects.

In an aspect, the present disclosure provides a method for printing a 3D object. The method may comprise providing at least one platform for holding a film of at least one mixture. The method may comprise providing a deposition unit comprising a nozzle in fluid communication with a source of the at least one mixture. The deposition unit may be for depositing the film onto the at least one platform. The method may comprise providing a building unit comprising a light source for providing a light sufficient for curing at least a portion of the film, to form at least a portion of the 3D object. The method may comprise moving the at least one platform from the deposition unit to the building unit, or vice versa, along a plurality of non-overlapping paths.

In another aspect, the present disclosure provides a method for printing a 3D object. The method may comprise providing at least one platform for holding a film of a mixture. The method may comprise providing a deposition unit comprising a nozzle in fluid communication with a source of the mixture. The deposition unit may be for depositing the film onto the at least one platform. The method may comprise providing a building unit comprising a light source for providing a light sufficient for curing at least a portion of the film, to form at least a portion of the 3D object. The method may comprise providing a sensor disposed along a path of the at least one platform from the deposition unit to the building unit, or vice versa. The sensor may be for (1) determining a profile of the film disposed on the at least one platform prior to the curing, or (2) detecting any excess mixture on the at least one platform subsequent to the curing. The method may comprise moving the at least one platform along the path. In some cases, the method can comprise providing at least one belt, a surface of the at least one belt comprising the at least one platform.

In another aspect, the present disclosure provides a method for printing a 3D object. The method may comprise providing at least a first wiper configured to mix at least a portion of a mixture disposed over the platform. The method may comprise providing at least a second wiper configured to remove the at least the portion of the mixture from at least a portion of the platform. The method may comprise (1) moving the at least the first wiper relative to the platform, to mix the at least the portion of the mixture, and (2) moving the at least the second wiper relative to the platform, to remove the at least the portion of the mixture from the platform.

In another aspect, the present disclosure provides a method of using a wiper blade system. The method may comprise providing feedstock solution on a substrate. The method may comprise providing a wiper blade system comprising: (i) a first array of wiper blades comprising multiple blades oriented at angles to one another, and (ii) a second array of wiper blades positioned adjacent to the first array of wiper blades, the second array of wiper blades configured to remove the feedstock solution from the substrate. The method may comprise positioning the wiper blade system so that the first array of wiper blades is adjacent to the feedstock solution. The method may comprise moving the wiper blade system through the feedstock solution.

Once the at least the portion of the 3D object is printed (herein referred to as a green body), the method may further comprise removing the green body from the build head. The green body may be separated from the build head by inserting a thin material (e.g. a steel blade) between the green body and the build head. In some examples, a first layer of the green body that is in contact with the build head may not comprise the plurality of particles for easy removal from the build head by the thin material. The method may further comprise washing the green body. The green body may be washed by jetting a solvent (e.g., isopropanol) to remove any excess polymeric precursor. The method may further comprise subjecting the green body to further heat treatment (e.g., in a furnace) to (i) decompose (e.g., into a gas phase) or remove at least a portion of (e.g., substantially all of) polymeric materials and/or precursors in the green body and/or (ii) sinter the plurality of particles of the green body to form a final product that is at least a portion of a 3D object or an entire 3D object.

Additional Details for 3D Printing

A wiper as disclosed herein may comprise a blade, a roller, and/or a rod. A surface of the wiper may comprise (e.g., may be coated with) one or more fluoropolymers that prevent adjesion of the at least one wiper to the back surface of the substrate. Examples of the one or more fluoropolymers include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA).

In an example, a wiper as disclosed herein may be a roller or a rod. The roller or a rod may have a diameter of at least about 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm, or more. The roller or a rod may have a diameter of at most about 30 mm, 29 mm, 28 mm, 27 mm, 26 mm, 25 mm, 24 mm, 23 mm, 22 mm, 21 mm, 20 mm, 19 mm, 18 mm, 17 mm, 16 mm, 15 mm, 14 mm, 13 mm, 12 mm, 11 mm, 10 mm, 9 mm, 8 mm, 7 mm, 6 mm, 5 mm, or less.

A sensor as disclosed herein may be configured to provide a feedback (e.g., light absorption spectroscopy, image, video, etc.) indicative of the film of the mixture disposed on or adjacent to at least a portion of the platform (e.g., a print window of the platform, a film disposed on or adjacent to the at least the portion of the platform, etc.). The sensor may be operatively coupled to a controller (e.g., a computer) that controls one or more operations (e.g., depositing the film of the mixture onto the at least the portion of the platform) of the 3D printing. The controller may adjust the one or more operations of the 3D printing, based on the feedback provided by the sensor. The controller may adjust the operation(s) during the 3D printing, and thus such feedback may be a closed loop feedback. The sensor may provide the feedback (i) during calibration of the 3D printing system, (ii) prior to, during, and/or subsequent to depositing the film of the mixture to be used for 3D printing, and/or (iii) prior to, during, or subsequent to solidifying (curing) at least a portion of the film of the mixture to print at least a portion of the 3D object. The sensor may provide the feedback pre-fabrication or post-fabrication of the 3D object. The 3D printing may use at least about 1, 2, 3, 4, 5, 6, 7, 8, 9, 10, or more sensors. The 3D printing may use at most about 10, 9, 8, 7, 6, 5, 4, 3, 2, or 1 sensor(s).

Examples of the sensor configured to provide such feedback indicative of the film of the mixture may comprise a detector, vision system, computer vision, machine vision, imager, camera, electromagnetic radiation sensor (e.g., IR sensor, color sensor, etc.), proximity sensor, densitometer (e.g., optical densitometer), profilometer, spectrometer, pyrometer, force sensor (e.g., piezo sensor for pressure, acceleration, temperature, strain, force), motion sensor, magnetic field sensor (e.g., microelectromechanical systems), electric field sensor, chemical sensor, structured-light sensor, etc.

The sensor may be capable of detecting and/or analyzing one or more profiles of various components of the 3D printing system. The various components may be used (e.g., the print window) and/or generated (e,g., the film of mixture or mixture) during the 3D printing process.

The sensor may capture profiles of a print surface (e.g., a portion of the platform, i.e., a print area, the film 170), a surface of the build head that is configured to hold at least a portion of the 3D object during printing, or a surface of a previously deposited layer of the 3D object adjacent to the build head.

The feedback from the sensor may be one or more images of the film of the mixture or any excess mixture remaining on the print surface after printing at least a portion of the 3D object. The feedback from the sensor may be one or more videos (e.g., for a duration of time) of the film of the mixture or the excess mixture remaining on the print surface.

The feedback provided by the sensor may comprise one or more internal or external features (e.g., temperature, transparency or opacity, surface texture, thickness, shape, size, length, area, pattern, density of one or more particles embedded in the film of the mixture, defects, etc.) of the film of the mixture deposited on or adjacent to the print surface. In an example, the sensor provides such feedback of the film of the mixture prior to solidifying (e.g., curing, polymerizing, cross-linking) a portion of the film of the mixture into at least a portion of the 3D object. In another example, the sensor provides such feedback of any excess mixture remaining on the print surface after the portion of the film of the mixture is solidified (e.g., cured, polymerized, cross-linked) into the at least a portion of the 3D object and removed from the print surface (e.g., by the build head). The feedback may comprise the one or more internal or external features of at least a portion of a 3D object printed on the build head, or a portion of a non-printed 3D object on the build head onto which at least a portion of a 3D object is to be printed.

The sensor may be capable of measuring an energy that is emitted, reflected, or transmitted by a medium (e.g., the film of the mixture on the build surface). The sensor may be capable of measuring an energy density, comprising: electromagnetic energy density, optical energy density, reflectance density, transmittance density, absorbance density, spectral density, luminescence (fluorescence, phosphorescence) density, and/or electron density. Such energy density may be indicative of an amount, concentration, and/or density of one or more components (e.g., one or more particles) within one or more points, lines, or areas within the film of the mixture.

The sensor may be operatively coupled to a source of energy for sensing, wherein at least a portion of energy for sensing is measured by the sensor as a feedback indicative of the 3D printing process. Such energy for sensing may be electromagnetic radiation (e.g., from ambient light or from an electromagnetic radiation source) and/or electrons (e.g., from an electron beam). In an example, the sensor may be an IR sensor (e.g., an IR camera), and the source of energy may be an IR light source. In such a case, the IR sensor may detect at least a portion of the IR light from the IR light source that is being reflected by or transmitted from (i) the film of the mixture adjacent to the print surface, or (ii) any excess mixture remaining on the print surface. The IR light being reflected by or transmitted from the film of the mixture or any excess mixture may be zero-dimensional (a point), 1D (a line), or 2D (a plane).

A single sensor may be operatively coupled to a single source of energy for sensing. A single sensor may be operatively coupled to at least 2, 3, 4, 5, 6, 7, 8, 9, 10, or more sources of energy for sensing that are the same or different. A single sensor may be operatively coupled to at most 10, 9, 8, 7, 6, 5, 4, 3, or 2 sources of energy for sensing that are the same or different. A single source of energy for sensing may be operatively coupled to at least 2, 3, 4, 5, 6, 7, 8, 9, 10, or more sensors that are the same or different. A single source of energy for sensing may be operatively coupled to at most 10, 9, 8, 7, 6, 5, 4, 3, or 2 sensors that are the same or different.

One or more sensors and one or more sources of energy for sensing may be part of a same system (e.g., a single enclosed unit) or different systems. The one or more sensors may be disposed below, within, on, and/or over the build surface. The one or more sensors and the one or more sources of energy for sensing may be on a same side or opposite sides of a component of the 3D printing system (e.g., the print window or film comprising the print surface, the film of the mixture adjacent to the print surface, etc.). In some examples, the one or more sensors and the one or more sources of energy may be in contact with the print surface, the film of the mixture adjacent to the print surface, and/or any excess mixture remaining on the print surface subsequent to printing a layer of the 3D object. In some examples, the one or more sensors and the one or more sources of energy may not be in contact with the print surface, the film of the mixture adjacent to the print surface, and/or any excess mixture remaining on the print surface subsequent to printing a layer of the 3D object.

The sensor may not be in contact with the film of the mixture while generating the feedback. The sensor may be in contact with the film of the mixture while generating the feedback.

The sensor and/or the source of energy for sensing may be stationary with respect to the print surface (e.g., the print window or the film disposed on or adjacent to the platform). The sensor and/or the source of energy for sensing may be movable with respect to the print surface. Such movement may be a relative movement, and thus the moving piece may be the sensor, the source of energy for sensing, and/or the print surface.

The one or more sensors may be operatively coupled to a controller (e.g., a computer) capable of employing artificial intelligence (e.g., one or more machine learning algorithms) to analyze a database comprising a plurality of feedbacks indicative of various components of the 3D printing system, such as the film of the mixture on the print surface or of any excess mixture remaining on the print surface after printing a portion of the 3D object. One or more machine learning algorithms of the artificial intelligence may be capable of distinguishing or differentiating profiles (e.g., features) of a film of the mixture on or adjacent to the print surface based on the database. Such features may comprise the film quality, film thickness, density of one or more components (e.g., one or more particles, etc.) in the film of the mixture, or one or more defects (e.g., bubbles, wrinkles, pre-polymerized particulates, etc.).

The database may further comprise a plurality of training data sets that comprise example feedback indicative of the features of the film of the mixture. The plurality of training data sets may allow the machine learning algorithm(s) to learn a plurality of parameters to generate one or more models (e.g., mathematical models, classifiers) that can be used to distinguish or differentiate the features of a new film of the mixture received from the one or more sensors during the 3D printing. In an example, the feedback from a sensor may be an optical (e.g., IR) densitometry profile of the film of the mixture. In such a case, the trained machine learning algorithm may be used to distinguish (i) a variation in optical density due to a height defect across the film of the mixture, (ii) a variation in optical density due to voids (e.g., bubbles, streaks, etc.) in the film of the mixture, and (iii) a variation in optical density due to a difference in the density of one or more particles (e.g., metal or ceramic particles) in the film of the mixture.

A series of machine learning algorithms may be connected as an artificial neural network to better recognize, categorize, and/or classify each feature of the film of the mixture or each feature of any excess mixture remaining on the print surface from the feedback of the one or more sensors. An artificial intelligence system capable of acquiring, processing, and analyzing image and/or video feedbacks from the one or more sensors, and such system may be referred to as computer vision.

The one or more machine learning algorithms may use deep learning algorithms. The deep learning algorithms may be capable of generating new classifications (e.g., categories, sub-categories, etc.) of one or more features of the mixture or the film of the mixture, based on a new feedback and a database comprising a plurality of previous feedbacks and example feedbacks. The deep learning algorithms may use the new classifications to distinguish or differentiate the features of the mixture or the film of the mixture.

The diffuser may be disposed between the one or more sources of energy (e.g., one or more electromagnetic radiations) for sensing and the corresponding sensor(s). In an example, the diffuser may diffuse the one or more electromagnetic radiations (e.g., one or more IR lights) and direct the scattered electromagnetic radiations towards a build surface (e.g., a print window), to the film of the mixture, and to the corresponding sensor(s) (e.g., one or more IR sensors). The scattered electromagnetic radiations may be directed to the film of the mixture without passing through the build surface. In another example, the diffuser may be adjacent to the one or more sensor(s).

The diffuser may be transparent, semi-transparent, semi-opaque, or opaque. The diffuser may be ceramic, polymeric (e.g., polycarbonate, polytetrafluoroethylene (PTFE), etc.), or a combination thereof. Examples of the diffuser comprise a holographic diffuser, a white diffusing glass, and a ground glass diffuser. Other examples of the diffuser include paper or fabric.

One or more surfaces of the diffuser may comprise a matte finish on its surface to further assist in scattering the one or more electromagnetic radiations. The diffuser may not be a mirror. During the 3D printing process, at least about 1, 2, 3, 4, 5, or more diffusers may be used. During the 3D printing process, at most about 5, 4, 3, 2, or 1 diffuser may be used.

The mixture may be used for printing the at least the portion of the 3D object. The mixture may comprise a photoactive resin to form a polymeric material. The photoactive resin may comprise a polymeric precursor of the polymeric material. The photoactive resin may comprise at least one photoinitiator that is configured to initiate formation of the polymeric material from the polymeric precursor. The photoactive resin may comprise at least one photoinhibitor that is configured to inhibit formation of the polymeric material from the polymeric precursor. The mixture may comprise a plurality of particles for forming the at least the portion of the 3D object.

The mixture may be the photoactive resin. The viscosity of the photoactive resin may range between about 1 cP to about 2,000,000 cP. The viscosity of the photoactive resin may be at least about 1 cP, 5 cP, 10 cP, 50 cP, 100 cP, 500 cP, 1000 cP, 5,000 cP, 10,000 cP, 50,000 cP, 100,000 cP, 500,000 cP, 1,000,000 cP, 2,000,000 cP, or more. The viscosity of the photoactive resin may be at most about 2,000,000 cP, 1,000,000 cP, 500,000 cP, 100,000 cP, 50,000 cP, 10,000 cP, 5,000 cP, 1,000 cP, 500 cP, 100 cP, 50 cP, 10 cP, 5 cP, 1 cP, or less.

The mixture may be a non-Newtonian fluid. The viscosity of the mixture may vary based on a shear rate or shear history of the mixture. As an alternative, the mixture may be a Newtonian fluid.

The mixture may comprise the photoactive resin and the plurality of particles. The viscosity of the mixture may range between about 4,000 cP to about 2,000,000 cP. The viscosity of the mixture may be at least about 4,000 cP, 10,000 cP, 20,000 cP, 30,000 cP, 40,000 cP, 50,000 cP, 60,000 cP, 70,000 cP, 80,000 cP, 90,000 cP, 100,000 cP, 200,000 cP, 300,000 cP, 400,000 cP, 500,000 cP, 600,000 cP, 700,000 cP, 800,000 cP, 900,000 cP, 1,000,000 cP, 2,000,000 cP, or more. The viscosity of the mixture may be at most about 2,000,000 cP, 1,000,000 cP, 900,000 cP, 800,000 cP, 700,000 cP, 600,000 cP, 500,000 cP, 400,000 cP, 300,000 cP, 200,000 cP, 100,000 cP, 90,000 cP, 80,000 cP, 70,000 cP, 60,000 cP, 50,000 cP, 40,000 cP, 30,000 cP, 20,000 cP, 10,000 cP, 4,000 cP, or less.

In the mixture comprising the photoactive resin and the plurality of particles, the photoactive resin may be present in an amount ranging between about 5 volume % (vol %) to about 80 vol % in the mixture. The photoactive resin may be present in an amount of at least about 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 30 vol %, 35 vol %, 40 vol %, 45 vol %, 50 vol %, 55 vol %, 60 vol %, 65 vol %, 70 vol %, 75 vol %, 80 vol %, or more in the mixture. The photoactive resin may be present in an amount of at most about 80 vol %, 75 vol %, 70 vol %, 65 vol %, 60 vol %, 55 vol %, 50 vol %, 45 vol %, 40 vol %, 35 vol %, 30 vol %, 25 vol %, 24 vol %, 23 vol %, 22 vol %, 21 vol %, 20 vol %, 19 vol %, 18 vol %, 17 vol %, 16 vol %, 15 vol %, 14 vol %, 13 vol %, 12 vol %, 11 vol %, 10 vol %, 9 vol %, 8 vol %, 7 vol %, 6 vol %, 5 vol %, or less in the mixture.

The polymeric precursor in the photoactive resin may comprise monomers to be polymerized into the polymeric material, oligomers to be cross-linked into the polymeric material, or both. The monomers may be of the same or different types. An oligomer may comprise two or more monomers that are covalently linked to each other. The oligomer may be of any length, such as at least 2 (dimer), 3 (trimer), 4 (tetramer), 5 (pentamer), 6 (hexamer), 7, 8, 9, 10, 20, 30, 40, 50, 100, 200, 300, 400, 500, or more monomers. Alternatively or in addition to, the polymeric precursor may include a dendritic precursor (monodisperse or polydisperse). The dendritic precursor may be a first generation (G1), second generation (G2), third generation (G3), fourth generation (G4), or higher with functional groups remaining on the surface of the dendritic precursor. The resulting polymeric material may comprise a monopolymer and/or a copolymer. The copolymer may be a linear copolymer or a branched copolymer. The copolymer may be an alternating copolymer, periodic copolymer, statistical copolymer, random copolymer, and/or block copolymer.

Examples of monomers include one or more of hydroxyethyl methacrylate; n-Lauryl acrylate; tetrahydrofurfuryl methacrylate; 2,2,2-trifluoroethyl methacrylate; isobornyl methacrylate; polypropylene glycol monomethacrylates, aliphatic urethane acrylate (i.e., Rahn Genomer 1122); hydroxyethyl acrylate; n-Lauryl methacrylate; tetrahydrofurfuryl acrylate; 2, 2, 2-trifluoroethyl acrylate; isobornyl acrylate; polypropylene glycol monoacrylates; trimethylpropane triacrylate; trimethylpropane trimethacrylate; pentaerythritol tetraacrylate; pentaerythritol tetraacrylate; triethyleneglycol diacrylate; triethylene glycol dimethacrylate; tetrathyleneglycol diacrylate; tetrathylene glycol dimethacrylate; neopentyldimethacrylate; neopentylacrylate; hexane dioldimethacylate; hexane diol diacrylate; polyethylene glycol 400 dimethacrylate; polyethylene glycol 400 diacrylate; diethylglycol diacrylate; diethylene glycol dimethacrylate; ethyleneglycol diacrylate; ethylene glycol dimethacrylate; ethoxylated bis phenol A dimethacrylate; ethoxylated bis phenol A diacrylate; bisphenol A glycidyl methacrylate; bisphenol A glycidyl acrylate; ditrimethylolpropane tetraacrylate; and ditrimethylolpropane tetraacrylate.

Polymeric precursors may be present in an amount ranging between about 3 weight % (wt %) to about 90 wt % in the photoactive resin of the mixture. The polymeric precursors may be present in an amount of at least about 3 wt %, 4 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or more in the photoactive resin of the mixture. The polymeric precursors may be present in an amount of at most about 90 wt %, 85 wt %, 80 wt %, 75 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 5 wt %, 4 wt %, 3 wt %, or less in the photoactive resin of the mixture.

Photopolymerization of the polymeric precursors into the polymeric material may be controlled by one or more photoactive species, such as the at least one photoinitiator and the at least one photoinhibitor. The at least one photoinitiator may be a photon-absorbing compound that (i) is activated by a first light comprising a first wavelength and (ii) initiates photopolymerization of the polymeric precursors. The at least one photoinhibitor may be another photon-absorbing compound that (i) is activated by a second light comprising a second wavelength and (ii) inhibits the photopolymerization of the polymeric precursors. The first wavelength and the second wavelength may be different. The first light and the second light may be directed by the same light source. As an alternative, the first light may be directed by a first light source and the second light may be directed by a second light source. In some examples, the first light may comprise wavelengths ranging between about 420 nm to about 510 nm. In some examples, the second light may comprise wavelengths ranging between about 350 nm to about 410 nm. In an example, the first wavelength to induce photoinitiation is about 460 nm. In an example, the second wavelength to induce photoinhibition is about 365 nm.

Relative rates of the photoinitiation by the at least one photoinitiator and the photoinhibition by the at least one photoinhibitor may be controlled by adjusting the intensity and/or duration of the first light, the second light, or both. By controlling the relative rates of the photoinitiation and the photoinhibition, an overall rate and/or amount (degree) of polymerization of the polymeric precursors into the polymeric material may be controlled. Such process may be used to (i) prevent polymerization of the polymeric precursors at the print surface-mixture interface, (ii) control the rate at which polymerization takes place in the direction away from the print surface, and/or (iii) control a thickness of the polymeric material within the film of the mixture.

Examples of types of the at least one photoinitiator include one or more of benzophenones, thioxanthones, anthraquinones, benzoylformate esters, hydroxyacetophenones, alkylaminoacetophenones, benzil ketals, dialkoxyacetophenones, benzoin ethers, phosphine oxides acyloximino esters, alphahaloacetophenones, trichloromethyl-S-triazines, titanocenes, dibenzylidene ketones, ketocoumarins, dye sensitized photoinitiation systems, maleimides, and mixtures thereof.

Examples of the at least one photoinitiator in the photoactive resin include one or more of 1-hydroxy-cyclohexyl-phenyl-ketone (Irgacure™ 184; BASF, Hawthorne, NJ); a 1:1 mixture of 1-hydroxy-cyclohexyl-phenyl-ketone and benzophenone (Irgacure™ 500; BASF); 2-hydroxy-2-methyl-1-phenyl-1-propanone (Darocur™ 1173; BASF); 2-hydroxy-1-[4-(2-hydroxyethoxy)phenyl]-2-methyl-1-propanone (Irgacure™ 2959; BASF); methyl benzoylformate (Darocur™ MBF; BASF); oxy-phenyl-acetic acid 2-[2-oxo-2-phenyl-acetoxy-ethoxy]-ethyl ester; oxy-phenyl-acetic 2-[2-hydroxy-ethoxy]-ethyl ester; a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester (Irgacure™ 754; BASF); alpha,alpha-dimethoxy-alpha-phenylacetophenone (Irgacure™ 651; BASF); 2-benzyl-2-(dimethylamino)-1-[4-(4-morpholinyl)-phenyl]-1-butanone (Irgacure™ 369; BASF); 2-methyl-1-[4-(methylthio)phenyl]-2-(4-morpholinyl)-1-propanone (Irgacure™ 907; BASF); a 3:7 mixture of 2-benzyl-2-(dimethylamino)-1-[4-(4-morpholinyl) phenyl]-1-butanone and alpha,alpha-dimethoxy-alpha-phenylacetophenone per weight (Irgacure™ 1300; BASF); diphenyl-(2,4,6-trimethylbenzoyl) phosphine oxide (Darocur™ TPO; BASF); a 1:1 mixture of diphenyl-(2,4,6-trimethylbenzoyl)-phosphine oxide and 2-hydroxy-2-methyl-1-phenyl-1-propanone (Darocur™ 4265; BASF); phenyl bis(2,4,6-trimethyl benzoyl) phosphine oxide, which can be used in pure form (Irgacure™ 819; BASF, Hawthorne, NJ) or dispersed in water (45% active, Irgacure™ 819DW; BASF); 2:8 mixture of phosphine oxide, phenyl bis(2,4,6-trimethyl benzoyl) and 2-hydroxy-2-methyl-1-phenyl-1-propanone (Irgacure™ 2022; BASF); Irgacure™ 2100, which comprises phenyl-bis(2,4,6-trimethylbenzoyl)-phosphine oxide); bis-(eta 5-2,4-cyclopentadien-1-yl)-bis-[2,6-difluoro-3-(1H-pyrrol-1-yl) phenyl]-titanium (Irgacure™ 784; BASF); (4-methylphenyl) [4-(2-methylpropyl) phenyl]-iodonium hexafluorophosphate (Irgacure™ 250; BASF); 2-(4-methylbenzyl)-2-(dimethylamino)-1-(4-morpholinophenyl)-butan-1-one (Irgacure™ 379; BASF); 4-(2-hydroxyethoxy)phenyl-(2-hydroxy-2-propyl)ketone (Irgacure™ 2959; BASF); bis-(2,6-dimethoxybenzoyl)-2,4,4-trimethylpentylphosphine oxide; a mixture of bis-(2,6-dimethoxybenzoyl)-2,4,4-trimethylpentylphosphine oxide and 2 hydroxy-2-methyl-1-phenyl-propanone (Irgacure™ 1700; BASF); 4-Isopropyl-9-thioxanthenone; and mixtures thereof.

The at least one photoinitiator may be present in an amount ranging between about 0.1 wt % to about 10 wt % in the photoactive resin. The at least one photoinitiator may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The at least one photoinitiator may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

The at least one photoinhibitor in the photoactive resin may comprise one or more radicals that may preferentially terminate growing polymer radicals, rather than initiating polymerization of the polymeric precursors. Examples of types of the at least one photoinitiator include: one or more of sulfanylthiocarbonyl and other radicals generated in photoiniferter polymerizations; sulfanylthiocarbonyl radicals used in reversible addition-fragmentation chain transfer polymerization; and nitrosyl radicals used in nitroxide mediate polymerization. Other non-radical species that can be generated to terminate growing radical chains may include the numerous metal/ligand complexes used as deactivators in atom-transfer radical polymerization (ATRP). Thus, additional examples of the types of the at least one photoinhibitor include: one or more of thiocarbamates, xanthates, dithiobenzoates, hexaarylbiimidazoles, photoinitiators that generate ketyl and other radicals that tend to terminate growing polymer chains radicals (i.e., camphorquinone (CQ) and benzophenones), ATRP deactivators, and polymeric versions thereof.

Examples of the at least one photoinhibitors in the photoactive resin include one or more of zinc dimethyl dithiocarbamate; zinc diethyl dithiocarbamate; zinc dibutyl dithiocarbamate; nickel dibutyl dithiocarbamate; zinc dibenzyl dithiocarbamate; tetramethylthiuram disulfide; tetraethylthiuram disulfide (TEDS); tetramethylthiuram monosulfide; tetrabenzylthiuram disulfide; tetraisobutylthiuram disulfide; dipentamethylene thiuram hexasulfide; N,N'-dimethyl N,N'-di(4-pyridinyl)thiuram disulfide; 3-Butenyl 2-(dodecylthiocarbonothioylthio)-2-methylpropionate; 4-Cyano-4-[(dodecylsulfanylthiocarbonyl)sulfanyl]pentanoic acid; 4-Cyano-4-[(dodecylsulfanylthiocarbonyl)sulfanyl]pentanol; Cyanomethyl dodecyl trithiocarbonate; Cyanomethyl [3-(trimethoxysilyl)propyl] trithiocarbonate; 2-Cyano-2-propyl dodecyl trithiocarbonate; S,S-Dibenzyl trithiocarbonate; 2-(Dodecylthiocarbonothioylthio)-2-methylpropionic acid; 2-(Dodecylthiocarbonothioylthio)-2-methylpropionic acid N-hydroxysuccinimide; Benzyl 1H-pyrrole-1-carbodithioate; Cyanomethyl diphenylcarbamodithioate; Cyanomethyl methyl(phenyl)carbamodithioate; Cyanomethyl methyl(4-pyridyl)carbamodithioate; 2-Cyanopropan-2-yl N-methyl-N-(pyridin-4-yl)carbamodithioate; Methyl 2-[methyl(4-pyridinyl)carbamothioylthio] propionate; 1-Succinimidyl-4-cyano-4-[N-methyl-N-(4-pyridyl)carbamothioylthio]pentanoate; Benzyl benzodithioate; Cyanomethyl benzodithioate; 4-Cyano-4-(phenylcarbonothioylthio)pentanoic acid; 4-Cyano-4-(phenylcarbonothioylthio)pentanoic acid N-succinimidyl ester; 2-Cyano-2-propyl benzodithioate; 2-Cyano-2-propyl 4-cyanobenzodithioate; Ethyl 2-(4-methoxyphenylcarbonothioylthio)acetate; 2-Phenyl-2-propyl benzodithioate; Cyanomethyl methyl(4-pyridyl)carbamodithioate; 2-Cyanopropan-2-yl N-methyl-N-(pyridin-4-yl)carbamodithioate; 2,2'-Bis (2-chlorophenyl)-4,4', 5,5'-tetraphenyl-1,2'-biimidazole; 2-(2-ethoxyphenyl)-1-[2-(2-ethoxyphenyl)-4,5-diphenyl-2H-imidazol-2-yl]-4,5-diphenyl-1H-imidazole; 2,2',4-tris-(2-Chlorophenyl)-5-(3,4-dimethoxyphenyl)-4',5'-diphenyl-1,1'-biimidazole; and Methyl 2-[methyl(4-pyridinyl) carbamothioylthio]propionate.

In some examples, the photoinhibitor may comprise a hexaarylbiimidazole (HABI) or a functional variant thereof. The hexaarylbiimidazole may comprise a phenyl group with a halogen and/or an alkoxy substitution. In an example, the phenyl group comprises an ortho-chloro-substitution. In another example, the phenyl group comprises an ortho-methoxy-substitution. In another example, the phenyl group comprises an ortho-ethoxy-substitution. Examples of the functional variants of the hexaarylbiimidazole include: 2,2'-Bis(2-chlorophenyl)-4,4',5,5'-tetraphenyl-1,2'-biimidazole; 2-(2-methoxyphenyl)-1-[2-(2-methoxyphenyl)-4,5-diphenyl-2H-imidazol-2-yl]-4,5-diphenyl-1H-imidazole; 2-(2-ethoxyphenyl)-1-[2-(2-ethoxyphenyl)-4,5-diphenyl-2H-imidazol-2-yl]-4,5-diphenyl-1H-imidazole; and 2,2',4-tris-(2-Chlorophenyl)-5-(3,4-dimethoxyphenyl)-4',5'-diphenyl-1,1'-biimidazole.

The at least one photoinhibitor may be present in an amount ranging between about 0.1 wt % to about 10 wt % in the photoactive resin. The at least one photoinhibitor may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 7 wt %, 8 wt %, 9 wt %, 10 wt %, or more in the photoactive resin. The at least one photoinhibitor may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

Alternatively or in addition to, the photoactive resin may include a co-initiator. The co-initiator may be used to enhance the polymerization rate of the polymeric precursors. Suitable classes of the co-initiators may include: primary, secondary, and tertiary amines; alcohols; and thiols. Examples of the co-initiators may include: one or more of isoamyl 4-(dimethylamino)benzoate, 2-ethylhexyl 4-(dimethylamino)benzoate; ethyl 4-(dimethylamino)benzoate (EDMAB); 3-(dimethylamino)propyl acrylate; 2-(dimethylamino)ethyl methacrylate; 4-(dimethylamino)benzophenones, 4-(diethylamino)benzophenones; 4,4'-Bis(diethylamino)benzophenones; methyl diethanolamine; triethylamine; hexane thiol; heptane thiol; octane thiol; nonane thiol; decane thiol; undecane thiol; dodecane thiol; isooctyl 3-mercaptopropionate; pentaerythritol tetrakis(3-mercaptopropionate); 4,4'-thiobisbenzenethiol; trimethylolpropane tris(3-mercaptopropionate); CN374 (Sartomer); CN371 (Sartomer), CN373 (Sartomer), Genomer 5142 (Rahn); Genomer 5161 (Rahn); Genomer (5271 (Rahn); Genomer 5275 (Rahn), and TEMPIC (Bruno Boc, Germany).

The at least one photoinitiator and the co-initiator may be activated by the same light. The at least one photoinitiator and the co-initiator may be activated by the same wavelength and/or two different wavelengths of the same light. Alternatively or in addition to, the at last one photoinitiator and the co-initiator may be activated by different lights comprising different wavelengths. The system may comprise a co-initiator light source configured to direct a co-initiation light comprising a wavelength sufficient to activate the co-initiator to the film of the mixture.

The co-initiator may be a small molecule (e.g., a monomer). Alternatively or in addition to, the co-initiator may be an oligomer or polymer comprising a plurality of small molecules. The co-initiator may be present in an amount ranging between about 0.1 wt % to about 10 wt % in the photoactive resin. The co-initiator may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The co-initiator may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

The photoactive resin may comprise one or more dyes. The one or more dyes may be used to attenuate light, to transfer energy to the photoactive species, or both. The one or more dyes may transfer energy to the photoactive species to increase sensitivity of the photoactive resin to the first light for the photoinitiation process, the second light for the photoinhibition process, or both. In an example, the photoactive resin comprises at least one dye configured to absorb the second light having the second wavelength, which second wavelength is for activating the at least one photoinhibitor. Exposing the photoactive resin to the second light may initiate the at least one dye to absorb the second light and (i) reduce an amount of the second light exposed to the at least one photoinhibitor, thereby controlling the depth of penetration of the second light into the film of the mixture, and/or (ii) transfer (e.g., via Forster resonance energy transfer (FRET)) some of the absorbed energy from the second light to the at least one photoinhibitor, thereby improving the efficiency of photoinhibition. Examples of the one or more dyes may include compounds commonly used as ultraviolet (UV) light absorbers, including 2-hydroxyphenyl-benzophe-nones, 2-(2-hydroxyphenyl)-benzotriazoles, and 2-hydroxy-phenyl-s-triazines. Alternatively or in addition to, the one or more dyes may include those used for histological staining or dying of fabrics, including Martius yellow, Quinoline yellow, Sudan red, Sudan I, Sudan IV, eosin, eosin Y, neutral red, and acid red.

A concentration of the one or more dyes in the photoactive resin may be dependent on the light absorption properties of the one or more dyes. The one or more dyes may be present in an amount ranging between about 0.1 wt % to about 10 wt % in the photoactive resin. The one or more dyes may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The one or more dyes may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

The mixture may comprise the plurality of particles for forming the at least the portion of the 3D object. The amount of the plurality of particles in the mixture may be sufficient to minimize shrinking of the green body during sintering. The plurality of particles may comprise any particulate material (a particle) that can be melted or sintered (e.g., not completely melted). The particulate material may be in powder form. The particular material may be inorganic materials. The inorganic materials may be metallic, inter-metallic, ceramic materials, or any combination thereof. The one or more particles may comprise at least one metallic material, at least one intermetallic material, at least one ceramic material, at least one polymeric material, or any combination thereof.

Whereas powdered metals alone may be a severe safety hazard and may explode and/or require extensive safety infrastructures, using powdered metals that are dispersed in the mixture may avoid or substantially reduce the risks relevant to using the powdered metals that are not dispersed in a liquid medium. Additionally, photopolymer-based 3D printing using the mixture comprising the photoactive resin and the powdered metals may be performed without using heat, thereby avoiding or substantially reducing thermal distortion to the at least the portion of the 3D object during printing.

The metallic materials for the particles may include one or more of aluminum, calcium, magnesium, barium, scandium, titanium, vanadium, chromium, manganese, iron, cobalt, nickel, copper, zinc, yttrium, niobium, molybdenum, ruthe-nium, rhodium, silver, cadmium, actinium, and gold. The particles may comprise a rare earth element. The rare earth element may include one or more of scandium, yttrium, and elements of the lanthanide series having atomic numbers from 57-71.

An intermetallic material may be a solid-state compound exhibiting metallic bonding, defined stoichiometry and ordered crystal structure (i.e., alloys). The intermetallic materials may be in prealloyed powder form. Examples of such prealloyed powders may include, but are not limited to, brass (copper and zinc), bronze (copper and tin), duralumin (aluminum, copper, manganese, and/or magnesium), gold alloys (gold and copper), rose-gold alloys (gold, copper, and zinc), nichrome (nickel and chromium), and stainless steel (iron, carbon, and additional elements including manganese, nickel, chromium, molybdenum, boron, titanium, silicon, vanadium, tungsten, cobalt, and/or niobium). The prealloyed powders may include superalloys. The superalloys may be based on elements including iron, nickel, cobalt, chromium, tungsten, molybdenum, tantalum, niobium, titanium, and/or aluminum.

The ceramic materials may comprise metal (e.g., alumi-num, titanium, etc.), non-metal (e.g., oxygen, nitrogen, etc.), and/or metalloid (e.g., germanium, silicon, etc.) atoms pri-marily held in ionic and covalent bonds. Examples of the ceramic materials include, but are not limited to, an alu-minide, boride, beryllia, carbide, chromium oxide, hydrox-ide, sulfide, nitride, mullite, kyanite, ferrite, titania zirconia, yttria, and magnesia.

The mixture may comprise a pre-ceramic material. The pre-ceramic material may be a polymer that can be heated (or pyrolyzed) to form a ceramic material. The pre-ceramic material may include polyorganozirconates, polyorganoalu-minates, polysiloxanes, polysilanes, polysilazanes, polycar-bosilanes, polyborosilanes, etc. Additional examples of the pre-ceramic material include zirconium tetramethacrylate, zirconyl dimethacrylate, or zirconium 2-ethylhexanoate; aluminum III s-butoxide, aluminum III diisopropoxide-ethy-lacetoacetate; 1,3-bis(chloromethyl) 1,1,3,3-Tetrakis(trim-ethylsiloxy)disiloxane; 1,3-bis(3-carboxypropyl)tetrameth-yldisiloxane; 1,3,5,7-tetraethyl-2,4,6,8-tetramethylcyclotetrasilazane; tris(trimethylsilyl)phosphate; tris(trimethylsiloxy)boron; and mixtures thereof.

A cross-sectional dimension of the plurality of particles may range between about 1 nanometers (nm) to about 500 μm. The cross-sectional dimension of the plurality of par-ticles may be at least about 1 nm, 2 nm, 3 nm, 4 nm, 5 nm, 6 nm, 7 nm, 8 nm, 9 nm, 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 200 μm, 300 μm, 400 μm, 500 μm, or greater. The cross-sectional dimension of the plurality of particles may be at most about 500 μm, 400 μm, 300 μm, 200 μm, 100 μm, 90 μm, 80 μm, 70 μm, 60 μm, 50 μm, 40 μm, 30 μm, 20 μm, 10 μm, 9 μm, 8 μm, 7 μm, 6 μm, 5 μm, 4 μm, 3 μm, 2 μm, 1 μm, 900 nm, 800 nm, 700 nm, 600 nm, 500 nm, 400 nm, 300 nm, 200 nm, 100 nm, 90 nm, 80 nm, 70 nm, 60 nm, 50 nm, 40 nm, 30 nm, 20 nm, 10 nm, 9 nm, 8 nm, 7 nm, 6 nm, 5 nm, 4 nm, 3 nm, 2 nm, 1 nm, or smaller.

The plurality of particles (e.g., metallic, intermetallic, and/or ceramic particles) may be present in an amount ranging between about 5 vol % to about 90 vol % in the mixture. The plurality of particles may be present in an amount of at least about 5 vol %, 10 vol %, 15 vol %, 20 vol %, 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, 90 vol %, or more in the mixture. The plurality of particles may be present in an amount of at most about 90 vol %, 85 vol %, 80 vol %, 75 vol %, 70 vol %, 65 vol %, 60 vol %, 55 vol %, 50 vol %, 45 vol %, 40 vol %, 35 vol %, 30 vol %, 25 vol %, 20 vol %, 15 vol %, 10 vol %, 5 vol %, or less in the mixture.

The mixture may comprise an anti-settling component to prevent settling of the plurality of particles and keep them suspend in the mixture. The anti-settling component may sterically limit the plurality of particles from moving closer to each other. The anti-settling component may not scatter light (e.g., the first light and/or the second light) to avoid negatively affecting the penetration depth of the light into the mixture. The anti-settling component may be present in an amount ranging between about 5 vol % to about 90 vol % in the mixture. The anti-settling component may be present in an amount of at least about 5 vol %, 10 vol %, 15 vol %, 20 vol %, 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, 90 vol %, or more in the mixture. The anti-settling component may be present in an amount of at most about 90 vol %, 85 vol %, 80 vol %, 75 vol %, 70 vol %, 65 vol %, 60 vol %, 55 vol %, 50 vol %, 45 vol %, 40 vol %, 35 vol %, 30 vol %, 25 vol %, 20 vol %, or less in the mixture.

Examples of the anti-settling component include, but are not limited to, one or more additional particles and a thixotropic additive. The one or more additional particles may be configured to prevent settling of the plurality of particles in the mixture. The one or more additional particles may decrease free space and increase the overall packing density within the mixture, thereby preventing the plurality of particles from settling towards the window during printing. Examples of the one or more additional particles include micronized and/or dispersed waxes such as paraffin, carnuba, montan, Fischer tropsch wax, ethylene bis stearamide, and lignin; micronized polymers such as cellulose, high density polyethylene, polyethylene, polypropylene, oxidized polyethylene (PE), paraformaldehyde, polyethylene glycol, phenolics, and melamine-formaldehyde based materials; and microspheres made from crosslinked polystyrene, polymethyl methacrylate, and/or other copolymers. An example of the one or more additional particles is Byk Ceraflour 929 (micronized, modified polyethylene wax).

The thixotropic additive may be a gel-like or static material that becomes fluid-like when physically disturbed. Such property may be reversible. In the mixture, the thixotropic additive may be configured to create a network to prevent settling of the plurality of particles. The network of the thixotropic additive may be easily disturbed by shearing (e.g., dispensing through the nozzle) the mixture to allow flow. Upon being dispensed through the nozzle, the thixotropic additive may form another network within the mixture to prevent settling of the plurality of particles during printing. Examples of the thixotropic additive include castor wax, oxidized polyethylene wax, amide wax, modified ureas, castor oil derivatives, fumed silica and alumina, Bentonite clays, and mixtures thereof.

The anti-settling component of the mixture may be the one or more additional particles, the thixotropic additive, or both.

The mixture may comprise at least one additional additive that is configured to prevent foaming (or induce deaeration) of the mixture. Preventing foaming of the mixture may improve quality of the resulting 3D object. The at least one additional additive may be an amphiphilic material. The at least one additional additive may be a low surface energy material to allow association with each other within the mixture. Such association of the at least one additional additive may trap air bubbles present inside the mixture, migrate towards the mixture-air interface, and release the air bubbles. During curing of the photoactive resin, the at least one additional additive may polymerize and/or cross-link with the polymeric precursor. Examples of the one additional additive include silcones, modified silicones, lauryl acrylates, hydrophobic silicas, and modified ureas. An example of the one additional additive may be Evonik Tegorad 2500 (silicon acrylate).

The mixture may comprise an extractable material. The extractable material may be soluble in the polymeric precursor and/or dispersed throughout the mixture. During printing, curing of the polymeric precursor of the photoactive resin of the at least the portion of the mixture may create a first solid phase comprising the polymeric material and a second solid phase comprising the extractable material within the at least the portion of the 3D object. Such process may be a polymerization-induced phase separation (PIPS) process. At least a portion of the plurality of particles may be encapsulated by the first solid phase comprising the polymeric material. In some examples, the at least the portion of the 3D object may be a green body that can be heated to sinter at least a portion of the plurality of particles and burn off at least a portion of other components (i.e., organic components).

Prior to sintering the plurality of particles, the green body may be treated (e.g., immersed, jetted, etc.) with a solvent (liquid or vapor) to generate a brown body. The solvent may be an extraction solvent. The extractable material may be soluble in the solvent. A first solubility of the extractable material in the solvent may be higher than a second solubility of the polymeric material in the solvent. The solvent may be a poor solvent for the polymeric material. Thus, treating the green body with the solvent may solubilize and extract at least a portion of the extractable material out of the green body into the solvent, and create one or more pores in the at least the portion of the 3D object. The one or more pores may be a plurality of pores. In some examples, the green body may be treated with the solvent and heat at the same time. The one or more pores may create at least one continuous porous network in the at least the portion of the 3D object. Such process may be a solvent de-binding process.

The mixture may be stored in the source of the mixture. The source of the mixture may be a cup, container, syringe, or any other repository that can hold the mixture. The source of the mixture may in fluid communication (e.g., via a passageway) with the nozzle in the deposition head. The source of the mixture may be connected to a flow unit. The flow unit may provide and control flow of the mixture from the source of the mixture towards the nozzle, thereby dispensing the mixture. Alternatively or in addition to, the flow unit may provide and control flow of the mixture in a direction away from the nozzle and towards the source of the mixture, thereby retrieving the mixture. The flow unit may use pressure mechanisms to control the speed and direction of the flow of the mixture. The flow unit may be a syringe pump, vacuum pump, an actuator (e.g., linear, pneumatic, hydraulic, etc.), a compressor, or any other suitable device to exert pressure (positive or negative) to the mixture in the source of the mixture. The controller may be operatively coupled to the flow unit the control the speed, duration, and/or direction of the flow of the mixture.

The source of the mixture may comprise a sensor (e.g., an optical sensor) to detect the volume of the mixture. The controller may be operatively coupled to the sensor to determine when the source of the mixture may be replenished with new mixture. Alternatively or in addition to, the source of the mixture may be removable. The controller may determine when the source of the mixture may be replaced with a new source of the mixture comprising with the mixture.

The deposition head may comprise the nozzle. The nozzle may be in fluid communication with the source of the mixture. The deposition head may dispense the mixture over the print surface through the nozzle as a process of depositing the film of the mixture over the print surface. The deposition head may retrieve any excess mixture from the print surface back into the source of the mixture through the nozzle. The source of the mixture may be connected to the flow unit to provide and control flow of the mixture towards or away from the nozzle of the deposition head. Alternatively or in addition to, the nozzle may comprise a nozzle flow unit that provides and controls flow of the mixture towards or away from the print surface. Examples of the nozzle flow unit include a piezoelectric actuator and an auger screw that is connected to an actuator.

The deposition head may comprise a wiper. The wiper may be movable along a direction towards and/or away from the print surface. The wiper may have a variable height relative to the print surface. The deposition head may comprise an actuator connected to the wiper to control movement of the wiper in a direction towards and away from the print surface. The actuator may be a mechanical, hydraulic, pneumatic, or electro-mechanical actuator. The controller may be operatively coupled to the actuator to control the movement of the wiper in a direction towards and away from the print surface. Alternatively or in addition to, a vertical distance between the wiper and the print surface (e.g., a distance perpendicular to the print surface) may be static. The deposition head may comprise a plurality of wipers with different configurations. In some examples, the deposition head may comprise the nozzle and three wipers.

The wiper of the deposition head may be configured to (i) reduce or inhibit flow of the mixture out of the deposition head, (ii) flatten the film of the mixture, and/or (iii) remove any excess of the mixture. In an example, the wiper may be configured to be in contact with the print surface and reduce or inhibit flow of the mixture out of the deposition head. In another example, the wiper may be movable along a direction away from the print surface and configured to flatten the film of the mixture. The wiper may flatten the film of the mixture to a defined height (or thickness). In a different example, the wiper may be movable along a direction away from the print surface and configured to remove the excess of the mixture.

The wiper may comprise polymer (e.g., rubber, silicone), metal, or ceramic. The wiper may comprise (e.g., entirely or as a coating) one or more fluoropolymers that prevent adhesion of the mixture on the wiper. Examples of the one or more fluoropolymers include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA).

The wiper of the deposition head may be a blade (e.g., a squeegee blade, a doctor blade). The blade may have various shapes. In some examples, the blade may be straight and/or curved. In some examples, the wiper may be a straight blade with a flat surface. In some examples, the wiper may be a straight blade with a curved surface. In some examples, the wiper may be a curved blade (curved along the long axis of the wiper) with a flat surface. In some examples, the wiper may be a curved blade (curved along the long axis of the wiper) with a curved surface. In some examples, the wiper may comprise at least one straight portion and at least one curved portion along its length. In an example, the wiper may be a blade comprising a straight central portion between two curved portions.

In an example, the wiper may be a straight blade and configured perpendicular to the print surface. In another example, the wiper may be a straight blade with a flat surface, and tilted at an angle. When the deposition head moves to remove any excess mixture from the print surface, the tilted straight blade may concentrate the excess resin at the bottom of the blade. The straight blade may be tilted at an angle ranging between about 1 degree to about 50 degrees. The straight blade may be tilted at an angle of at least about 1 degree, 2 degrees, 3 degrees, 4 degrees, 5 degrees, 6 degrees, 7 degrees, 8 degrees, 9 degrees, 10 degrees, 20 degrees, 30 degrees, 40 degrees, 50 degrees, or more. The straight blade may be tiled at an angle of at most about 50 degrees, 40 degrees, 30 degrees, 20 degrees, 10 degrees, 9 degrees, 8 degrees, 7 degrees, 6 degrees, 5 degrees, 4 degrees, 3 degrees, 2 degrees, 1 degree, or less.

In a different example, the wiper may be a straight blade with a curved surface (a curved blade). When the deposition head moves to remove any excess mixture from the print surface, the curved blade may concentrate the excess resin in the center of the concave surface of the wiper. The curved blade may reduce or prevent the excess resin from spilling out from the sides of the blade. A radius of curvature of the surface of the blade may range between about 10 mm to about 1000 mm. The radius of curvature of the surface of the blade may be at least about 10 mm, 20 mm, 30 mm, 40 mm, 50 mm, 60 mm, 70 mm, 80 mm, 90 mm, 100 mm, 200 mm, 300 mm, 400 mm, 500 mm, 1000 mm, or more. The radius of curvature of the surface of the blade may be at most about 1000 mm, 500 mm, 400 mm, 300 mm, 200 mm, 100 mm, 90 mm, 80 mm, 70 mm, 60 mm, 50 mm, 40 mm, 30 mm, 20 mm, 10 mm, or less.

The wiper of the deposition head may be a roller. The roller may have a surface that is flat or textured. The roller may be configured to rotate clockwise and/or counterclockwise while the deposition head moves across the print window. Alternatively or in addition to, the roller may be configured to be static while the deposition head moves across the print window. The wiper of the deposition head may be a rod. The rod may have a surface that is flat or textured. The rod may be configured to rotate clockwise and/or counterclockwise while the deposition head moves across the print window. Alternatively or in addition to, the rod may be configured to be static while the deposition head moves across the print window. In an example, the rod may be a wire wound rod, also known as a Meyer rod.

The deposition head may comprise a slot die. The slot die may be configured to move along a direction away from the print surface. The slot die may be height adjustable with respect to the print surface. The slot die may comprise a channel in fluid communication with the source of the mixture. The channel may comprise a first opening to receive the mixture from the source of the mixture. The channel may comprise a second opening opposite of the first opening to dispense the mixture to the print window. The second opening may be an injection point. The channel may have a reservoir between the first and second openings to hold a volume of the mixture. The injection point of the slot die may comprise a flat surface to flatten the film of the mixture to a defined height (or thickness).

The deposition head comprising the slot die may include a separate nozzle to suction and retrieve any excess mixture from the film of the mixture during printing. The separate nozzle of the deposition head comprising the slot die may be in fluid communication with a repository to collect the excess mixture. The repository may be a recycling bin. The repository may also be in fluid communication with the slot die to send the excess mixture collected in the repository back into the reservoir of the slot die. Alternatively or in addition to, the collected excess mixture may be removed for reprocessing. The reprocessing of the collected excess mixture may comprise (i) filtering out any polymerized solid particulates, (ii) filtering out any of the plurality of particles that may be greater than a target particle size, (iii) remixing the mixture to ensure homogeneity, and/or (iv) removing at least a portion of air entrapped in the mixture. The at least the portion of air entrapped in the mixture may be removed by centrifuging the mixture. The slot die may be part of a nozzle. Alternatively or in addition to, the slot die may be part of a wiper.

The system may further comprise an additional deposition head comprising an additional nozzle. The additional nozzle of the additional deposition head may be in fluid communication with an additional source of an additional mixture. In some examples, the nozzle of the deposition head of the system may be in fluid communication with the source of the mixture and the additional source of the additional mixture. Alternatively or in addition to, the deposition head may comprise a first nozzle in fluid communication with the source of the mixture, and (b) a second nozzle in fluid communication with the additional source of the additional mixture. The presence of the additional source of the additional mixture may allow printing at least a portion of a 3D object comprising multiple materials (multi-materials) in different layers and/or in different portions within the same layer.

The mixture and the additional mixture may be the same. As an alternative, the mixture and the additional mixture may be different. The mixture and the additional mixture may comprise different types of the photoactive resin, the plurality of particles, or both. Alternatively or in addition to, the mixture and the additional mixture may comprise different amounts (concentrations by weight or volume) of the photoactive resin, the plurality of particles, or both. In an example, the mixture may comprise metallic particles, and the additional mixture may comprise ceramic particles. A first concentration of the metallic particles in the mixture and a second concentration of the ceramic particles in the additional mixture may be the same or different. A first photoactive resin in the mixture and a second photoactive resin in the additional mixture may be the same or different. In another example, the mixture may comprise a first type of metallic particles, and the additional mixture may comprise a second type of metallic particles. In a different example, the mixture may comprise ceramic particles at a first concentration, and the additional mixture may comprise the same ceramic particles at a second concentration that is different from the first concentration.

Upon printing at least a portion of the 3D object, the deposition head may be configured to move across the print surface and remove any excess mixture from the print surface. The deposition head may be configured to collect the excess mixture. The deposition head may be configured to collect the excess mixture to a designated area of the platform. The deposition head may be configured to collect the excess mixture within the deposition head. At least a portion of the collected excess mixture may be used to deposit a subsequent layer or film of the mixture by the deposition head.

The system may comprise a cleaning zone. The cleaning zone may be configured adjacent to the platform. The cleaning zone may be configured in a path of movement of the deposition head across the platform. The cleaning zone may be configured to clean the deposition head. Cleaning the deposition head may (i) improve reliability and reproducibility of printing at least the portion of the 3D object, and (ii) reduce wear and tear of the deposition head. The deposition head may be static or move relative to the cleaning zone while the cleaning zone cleans the deposition head. The cleaning zone may comprise a wiper, a nozzle configured to provide at least one cleaning solvent, or both. The wiper of the cleaning zone may be a blade (e.g., a doctor blade), a roller, or a rod. One or more wipers of the cleaning zone may come in contact with one or more wipers of the deposition head and remove any excess resin remaining on the one or more wipers of the deposition head. The one or more nozzles of the cleaning zone may dispense or jet the at least one cleaning solvent to the one or more wipers of the deposition head for cleaning. The one or more nozzles of the cleaning zone may be in fluid communication with at least one source of the at least one cleaning solvent. At least a portion of the mixture may be soluble in the at least one cleaning solvent. The cleaning zone may comprise a repository that can hold the excess mixture that is removed from the deposition head and/or the at least one cleaning solvent.

The system may comprise a repository (e.g., vat or container) adjacent to the platform. The repository may be configured to collect the mixture removed from the platform (e.g., from the print surface). The repository may be configured to hold any excess mixture that is removed from the print surface by the deposition head. After removing any excess mixture from the print surface, the deposition head may move and use at least one wiper to collect the excess mixture into the repository. The repository may be a recycling bin. The repository may be in fluid communication with the source of the mixture to recycle the collected excess mixture for printing. Alternatively or in addition to, the collected excess mixture may be removed for reprocessing. The system may comprise a sensor for detecting or determining one or more qualities of the mixture or a layer of the mixture deposited on the print surface. The sensor may be configured to move across the print surface and/or measure a thickness of at least a portion of the film of the mixture. The sensor may assess integrity of the film of the mixture before inducing polymerization of the polymeric precursors in the photoactive resin in the film of the mixture. The sensor may detect any variation in thickness across the film of the mixture. The sensor may detect any irregularities (e.g., defects, empty spots, solid particles, etc.) in the film of the mixture. The sensor may be configured to perform quality control after printing at least a portion (e.g., a layer) of the 3D object. The sensor may scan a remaining portion of the film (i.e., "silhouette") of the mixture after printing, and the controller that is operatively coupled to the sensor may determine if the previous printing process was successful or not. In some examples, the sensor may be an optical profilometer (e.g., an in-line profilometer), densitometer, or computer vision.

The system may comprise a motion stage adjacent to the open platform. The motion stage may be coupled to the deposition head and configured to direct movement of the deposition head across the open platform. In addition, the motion stage may be coupled to one or more other components of the system that move across the platform (e.g., an additional deposition head, a sensor, etc.). The motion stage may be connected to an actuator that is configured to direct movement of the motion stage. The actuator may be a mechanical, hydraulic, pneumatic, electro-mechanical, or magnetic actuator. The controller may be operatively coupled to the actuator to control movement of the motion stage. Alternatively or in addition to, the system may comprise an additional motion stage coupled to the open platform to direct movement of the open platform relative to other components of the system.

The system may comprise the optical source that provides the light through the print window for curing the at least the portion of the film of the mixture. The light of the optical source may comprise a first wavelength for curing the photoactive resin in a first portion of the film of the mixture. The first wavelength may activate the at least one photoinitiator of the photoactive resin, thereby initiating curing of the polymeric precursors into the polymeric material. The light may be a photoinitiation light, and the first portion of the film may be a photoinitiation layer. The optical source may provide an additional light having a second wavelength for inhibiting curing of the photoactive resin in a second portion of the film of the mixture. The first wavelength and the second wavelength may be different. The second wavelength may activate the at least one photoinhibitor of the photoactive resin, thereby inhibiting curing of the polymeric precursors into the polymeric material. The additional light may be a photoinhibition light, and the second portion of the film of the mixture may be a photoinhibition layer. In some examples, a dual-wavelength projector (e.g., a dual-wavelength laser) may be used as the optical source that provides both the photoinitiation light and the photoinhibition light.

The light of the optical source may comprise a first wavelength for curing the photoactive resin in a first portion of the film of the mixture. The first wavelength may activate the at least one photoinitiator of the photoactive resin, thereby initiating curing of the polymeric precursors into the polymeric material. The light may be a photoinitiation light, and the first portion of the film may be a photoinitiation layer. The light may be a patterned light. The system may further comprise an additional optical source comprising an additional light having a second wavelength for inhibiting curing of the photoactive resin in a second portion of the film of the mixture. The first wavelength and the second wavelength may be different. The second wavelength may activate the at least one photoinhibitor of the photoactive resin, thereby inhibiting curing of the polymeric precursors into the polymeric material. The additional light may be a photoinhibition light, and the second portion of the film of the mixture may be a photoinhibition layer. The additional light may be a flood light.

The optical source that directs the photoinitiation light may be a mask-based display, such as a liquid crystal display (LCD) device, or light emitting, such as a discrete LED array device. Alternatively, the optical source that directs the photoinitiation light may be a DLP device, including a digital micro-mirror device (DMD) for producing patterned light that can selectively illuminate and cure 3D printed structures. The initiation light directed from the DLP device may pass through one or more projection optics (e.g., a light projection lens) prior to illuminating through the print window and to the film of the mixture. The one or more projection optics may be integrated in the DLP device. Alternatively or in addition to, the one or more projection optics or may be configured between the DLP device and the print window. A relative position of the one or more projection optics relative to the DLP device and the print window may be adjustable to adjust an area of the photoinitiation layer in the film of the mixture. The area of the photoinitiation layer may be defined as a build area. In some examples, the one or more projection optics may be on a projection optics platform. The projection optics platform may be coupled to an actuator that directs movement of the projection optics platform. The controller may be operatively coupled to the actuator to control movement of the projection optics platform. The controller may direct the actuator (e.g., a screw-based mechanism) to adjust a relative position of the one or more projection optics to the DLP device and the print window during printing the 3D object.

The additional optical source that directs the photoinhibition light may comprise a plurality of light devices (e.g., a plurality of light emitting diodes (LEDs)). The light devices may be on a light platform. The light platform may be configured (i) move relative to the print window and (ii) yield a uniform projection of the photoinhibition light within the photoinhibition layer in the film of the mixture adjacent to the print window. In some examples, the position of the light platform may be independently adjustable with respect to a position of the optical source that directs the photoinitiation light. The light platform comprising the plurality of light devices may be arranged with respect to the print window such that a peak intensity of each of the plurality of light devices is directed at a different respective position (e.g., corner or other position) of the build area. In an example, the build area may have four corners and a separate beam of light (e.g., a separate LED) may be directed to each corner of the build area. The beams of photoinhibition light from the plurality of light devices may overlap to provide the uniform projection of the photoinhibition light within the photoinhibition layer. The light platform may be coupled to an actuator that directs movement of the light platform. The controller may be operatively coupled to the actuator to control movement of the light platform. The controller may direct the actuator (e.g., a screw-based mechanism) to adjust a relative position of the plurality of light devices to the print window during printing the 3D object. In some examples, the one or more projection optics to the DLP device (for the photoinitiation light) may be on the light platform.

Whether using one optical source or two optical sources, the photoinhibition light may be configured to create the photoinhibition layer in the film of the mixture adjacent to the print window. The photoinhibition light may be configured to form the photoinhibition layer in the film of the mixture adjacent to the transparent film that is covering the print window. Furthermore, the photoinitiation light may be configured to cure the photoactive resin in the photoinitiation layer that resides between the photoinhibition layer and the build head. The photoactive resin in the photoinitiation layer may be cured into at least a portion of the 3D structure. The photoinitiation light may be configured to cure the photoactive resin in the photoinitiation layer that resides between the photoinhibition layer and the at least the portion of the 3D structure adjacent to the build head.

A thickness of the photoinitiation layer, the photoinhibition layer, or both may be adjusted by adjusting an intensity and duration of the photoinitiation light, the photoinhibition light, or both. The thickness of the photoinitiation layer, the photoinhibition layer, or both may be adjusted to adjust the thickness of the printed layer of the at least the portion of the 3D object. Alternatively or in addition to, the thickness of the photoinitiation layer, the photoinhibition layer, or both may be adjusted by adjusting the speed at which the build head moves away in a direction away from the print window.

The system may comprise the controller to control various parts (e.g., actuators, sensors, etc.) of different components of the 3D printing system, as described elsewhere herein.

Computer Systems

The present disclosure provides computer systems that are programmed to implement methods of the disclosure. Computer systems of the present disclosure may be used to regulate various operations of 3D printing, such as, for example, (i) directing movement of one or more platforms (for holding a film of mixture) relative to a deposition unit and/or a building unit or (ii) directing movement of a plurality of wipers for mixing, collecting, and re-using any excess mixture for 3D printing.

Figure 17:
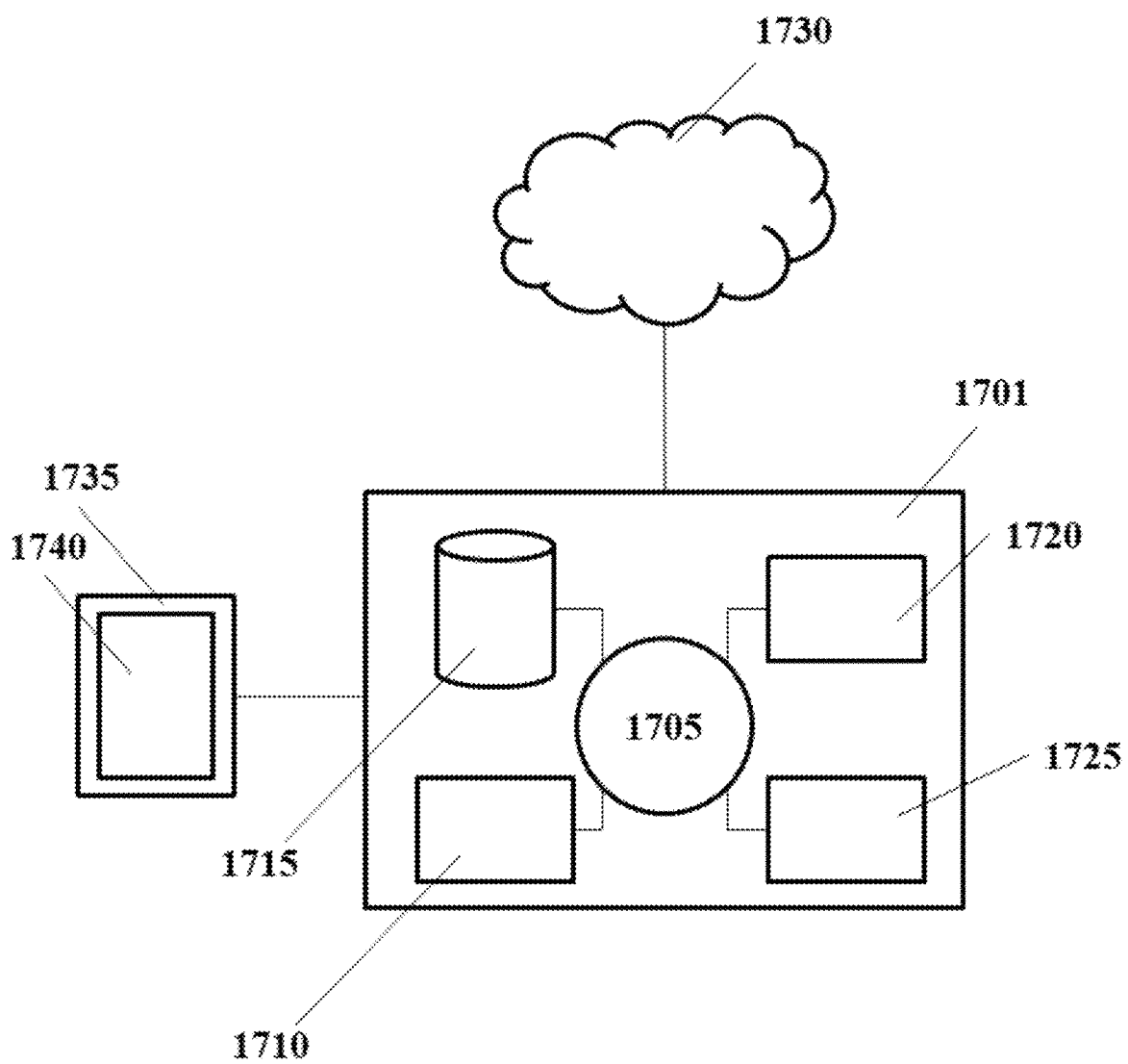
FIG. 17 shows a computer system that is programmed or otherwise configured to implement methods provided herein.

FIG. 17 shows a computer system 1701 that is programmed or otherwise configured to communicate with and regulate various aspects of a 3D printer of the present disclosure. The computer system 1701 can communicate with, for example, the light sources, build head, one or more deposition heads, one or more sources of one or more mixtures of the present disclosure, one or more first coupling units of the platform, one or more second coupling units of the build head, one or more actuators coupled to one or more of the coupling units, one or more fixtures coupled to the one or more coupling units, one or more film transfer units, one or more actuators operatively coupled to the film transfer units, one or more sensors for detecting the layer of the mixture prior to, during, and subsequent to printing at least a portion of the 3D object, a vacuum unit, and/or a laminator unit. The computer system 1701 may also communicate with the 3D printing mechanisms or one or more controllers of the present disclosure. The computer system 1701 can be an electronic device of a user or a computer system that is remotely located with respect to the electronic device. The electronic device can be a mobile electronic device.

The computer system 1701 includes a central processing unit (CPU, also "processor" and "computer processor" herein) 1705, which can be a single core or multi core processor, or a plurality of processors for parallel processing. The computer system 1701 also includes memory or memory location 1710 (e.g., random-access memory, read-only memory, flash memory), electronic storage unit 1715 (e.g., hard disk), communication interface 1720 (e.g., network adapter) for communicating with one or more other systems, and peripheral devices 1725, such as cache, other memory, data storage and/or electronic display adapters. The memory 1710, storage unit 1715, interface 1720 and peripheral devices 1725 are in communication with the CPU 1705 through a communication bus (solid lines), such as a motherboard. The storage unit 1715 can be a data storage unit (or data repository) for storing data. The computer system 1701 can be operatively coupled to a computer network ("network") 1730 with the aid of the communication interface 1720. The network 1730 can be the Internet, an internet and/or extranet, or an intranet and/or extranet that is in communication with the Internet. The network 1730 in some cases is a telecommunication and/or data network. The network 1730 can include one or more computer servers, which can enable distributed computing, such as cloud computing. The network 1730, in some cases with the aid of the computer system 1701, can implement a peer-to-peer network, which may enable devices coupled to the computer system 1701 to behave as a client or a server.

The CPU 1705 can execute a sequence of machine-readable instructions, which can be embodied in a program or software. The instructions may be stored in a memory location, such as the memory 1710. The instructions can be directed to the CPU 1705, which can subsequently program or otherwise configure the CPU 1705 to implement methods of the present disclosure. Examples of operations performed by the CPU 1705 can include fetch, decode, execute, and writeback.

The CPU 1705 can be part of a circuit, such as an integrated circuit. One or more other components of the system 1701 can be included in the circuit. In some cases, the circuit is an application specific integrated circuit (ASIC).

The storage unit 1715 can store files, such as drivers, libraries and saved programs. The storage unit 1715 can store user data, e.g., user preferences and user programs. The computer system 1701 in some cases can include one or more additional data storage units that are external to the computer system 1701, such as located on a remote server that is in communication with the computer system 1701 through an intranet or the Internet.

The computer system 1701 can communicate with one or more remote computer systems through the network 1730. For instance, the computer system 1701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1701 via the network 1730.

Methods as described herein can be implemented by way of machine (e.g., computer processor) executable code stored on an electronic storage location of the computer system 1701, such as, for example, on the memory 1710 or electronic storage unit 1715. The machine executable or machine readable code can be provided in the form of software. During use, the code can be executed by the processor 1705. In some cases, the code can be retrieved from the storage unit 1715 and stored on the memory 1710 for ready access by the processor 1705. In some situations, the electronic storage unit 1715 can be precluded, and machine-executable instructions are stored on memory 1710.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory)

or a hard disk. "Storage" type media can include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1701 can include or be in communication with an electronic display 1735 that comprises a user interface (UI) 1740 for providing, for example, (i) activate or deactivate a 3D printer for printing a 3D object, (ii) determining when to clean the deposition head, (iii) determine any defects in the film of the mixture, (iv) determining a pathway of a platform to move from a deposition unit to a building unit, or vice versa, (v) determining a type of multi-wiper configuration to utilize for removing, collecting, and/or flattening any excess mixture, and/or (vi) controlling movement of a belt system (e.g., continuous belt, roll-to-roll belt) of the 3D printing system disclosed herein. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1705. The algorithm can, for example, determine a volume of the mixture that must be dispensed into a pool of excess mixture for a subsequent printing step.

Methods and systems of the present disclosure may be combined with or modified by other methods and systems for 3D printing and further processing thereof (e.g., debinding, sintering, etc.), such as, for example, those described in U.S. Patent Publication No. 2016/0067921 ("THREE DIMENSIONAL PRINTING ADHESION REDUCTION USING PHOTOINHIBITION"), U.S. Patent Publication No. 2018/0348646 ("MULTI WAVELENGTH STEREO-LITHOGRAPHY HARDWARE CONFIGURATIONS"), Patent Cooperation Treaty Patent Publication No. 2018/213356 ("VISCOUS FILM THREE-DIMENSIONAL PRINTING SYSTEMS AND METHODS"), Patent Cooperation Treaty Patent Publication No. 2018/232175 ("METHODS AND SYSTEMS FOR STEREOLITHOG-RAPHY THREE-DIMENSIONAL PRINTING"), Patent Cooperation Treaty Patent Application No. PCT/US2019/068413 ("SENSORS FOR THREE-DIMENSIONAL PRINTING SYSTEMS AND METHODS"), and Patent Cooperation Treaty Patent Application No. 2020/236657 ("STEREOLITHOGRAPHY THREE-DIMENSIONAL PRINTING SYSTEMS AND METHODS"), each of which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for printing a three-dimensional (3D) object, comprising:
   at least one platform configured to hold a film of at least one mixture;
   a deposition unit comprising a nozzle in fluid communication with a source of said at least one mixture, wherein said deposition unit is configured to deposit said film onto said at least one platform;
   a building unit comprising a light source configured to provide a light sufficient for curing at least a portion of said film, to form at least a portion of said 3D object;
   a build head configured to hold said at least said portion of said 3D object; and a controller operatively coupled to said at least one platform, wherein said controller is configured to direct said at least one platform to move from said deposition unit to said building unit, or vice versa, along a plurality of non-overlapping paths, wherein said plurality of non-overlapping paths is disposed at different heights relative to each other.

2. The system of claim 1, wherein said build head is part of said building unit.

3. The system of claim 1, wherein said plurality of non-overlapping paths comprises a first path at height h1 and a second path at height h2, wherein h1 and h2 are different such that the first path and the second path do not intersect one another, wherein at least a portion of said first path is disposed over at least a portion of said second path.

4. The system of claim 3, wherein said at least one platform comprises a first platform and a second platform, wherein said controller is configured to direct (i) said first platform to move along said first path in a direction away from said deposition unit and towards said building unit and (ii) said second platform to move along said second path in a direction away from said building unit and towards said deposition unit.

5. The system of claim 4, wherein said first platform is configured to hold said film of said at least one mixture, wherein said second platform is configured to hold an additional film of said at least one mixture, and wherein said film and said additional film are usable for printing different portions of a same 3D object on said build head.

6. The system of claim 1, further comprising at least one actuator configured to direct said at least one platform to move along a vertical direction.

7. The system of claim 6, wherein said at least one actuator is not configured to move along said plurality of non-overlapping paths.

8. The system of claim 1, wherein said at least one mixture comprises a plurality of mixtures, and wherein said deposition unit is configured to deposit (i) a film of a first mixture of said plurality of mixtures onto a first platform of said at least one platform, and (ii) a film of a second mixture of said plurality of mixtures onto a second platform of said at least one platform.

9. The system of claim 1, wherein a spacing between said plurality of non-overlapping paths is greater than a thickness of said film of said at least one mixture.

10. The system of claim 1, further comprising at least one actuator configured to direct said at least one platform to move between said plurality of non-overlapping paths.

11. The system of claim 1, further comprising at least one sensor configured to (i) determine a profile of said film on said at least one platform, or (ii) subsequent to said curing, detect any excess mixture on said at least one platform.

12. The system of claim 11, wherein, in (i), said profile comprises a shape or a thickness of said film.

13. The system of claim 11, wherein said at least one sensor is disposed along at least one path of said plurality of non-overlapping paths.

14. The system of claim 1, wherein said deposition unit further comprises at least one wiper configured to move across said at least one platform to (i) spread said at least one mixture over said at least one platform to provide said film, or (ii) remove at least a portion of said film from said at least one platform.

\* \* \* \* \*